(12) United States Patent
Shahoian et al.

(10) Patent No.: US 8,059,104 B2
(45) Date of Patent: Nov. 15, 2011

(54) HAPTIC INTERFACE FOR TOUCH SCREEN EMBODIMENTS

(75) Inventors: Erik J. Shahoian, San Ramon, CA (US); Bruce M. Schena, Menlo Park, CA (US); Louis B. Rosenberg, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 1029 days.

(21) Appl. No.: 11/981,041

(22) Filed: Oct. 30, 2007

(65) Prior Publication Data

US 2008/0062143 A1    Mar. 13, 2008

Related U.S. Application Data

(63) Continuation of application No. 10/919,798, filed on Aug. 17, 2004, now Pat. No. 7,548,232, which is a continuation of application No. 09/917,263, filed on Jul. 26, 2001, now Pat. No. 6,822,635, and a continuation-in-part of application No. 09/487,737, filed on Jan. 19, 2000, now Pat. No. 6,429,846.

(60) Provisional application No. 60/274,444, filed on Mar. 9, 2001.

(51) Int. Cl.
*G09G 5/00*     (2006.01)

(52) U.S. Cl. ..................................... 345/173; 178/18.03

(58) Field of Classification Search .......... 345/156–179; 715/701, 702; 178/18.01–18.11
See application file for complete search history.

(56) References Cited

U.S. PATENT DOCUMENTS

| | | |
|---|---|---|
| 2,972,140 A | 2/1961 | Hirsch |
| 3,157,853 A | 11/1964 | Hirsch |
| 3,220,121 A | 11/1965 | Cutler |
| 3,497,668 A | 2/1970 | Hirsch |
| 3,517,446 A | 6/1970 | Corlyon et al. |
| 3,623,064 A | 11/1971 | Kagan |
| 3,875,488 A | 4/1975 | Crocker et al. |

(Continued)

FOREIGN PATENT DOCUMENTS

DE    19911416    11/2000

(Continued)

OTHER PUBLICATIONS

Adachi et al., "Sensory Evaluation of Virtual Haptic Push-Buttons," 1994, Suzuki Motor Corp., pp. 1-7.

(Continued)

*Primary Examiner* — Regina Liang
(74) *Attorney, Agent, or Firm* — Womble Carlyle Sandridge & Rice, PLLC

(57) ABSTRACT

A haptic feedback touch control used to provide input to a computer. A touch input device includes a planar touch surface that provides position information to a computer based on a location of user contact. The computer can position a cursor in a displayed graphical environment based at least in part on the position information, or perform a different function. At least one actuator is also coupled to the touch input device and outputs a force to provide a haptic sensation to the user. The actuator can move the touchpad laterally, or a separate surface member can be actuated. A flat E-core actuator, piezoelectric actuator, or other types of actuators can be used to provide forces. The touch input device can include multiple different regions to control different computer functions.

13 Claims, 19 Drawing Sheets

U.S. PATENT DOCUMENTS

| | | | |
|---|---|---|---|
| 3,902,687 A | 9/1975 | Hightower | |
| 3,903,614 A | 9/1975 | Diamond et al. | |
| 3,911,416 A | 10/1975 | Feder | |
| 3,919,691 A | 11/1975 | Noll | |
| 3,923,166 A | 12/1975 | Fletcher et al. | |
| 4,023,290 A | 5/1977 | Josephson | |
| 4,101,884 A | 7/1978 | Benton, Jr. | |
| 4,108,146 A | 8/1978 | Golden | |
| 4,108,164 A | 8/1978 | Hall, Sr. | |
| 4,127,752 A | 11/1978 | Lowthorp | |
| 4,160,508 A | 7/1979 | Salisbury | |
| 4,236,325 A | 12/1980 | Hall et al. | |
| 4,242,823 A | 1/1981 | Bruno | |
| 4,262,549 A | 4/1981 | Schwellenbach | |
| 4,333,070 A | 6/1982 | Barnes | |
| 4,334,280 A | 6/1982 | McDonald | |
| 4,398,889 A | 8/1983 | Lam et al. | |
| 4,414,537 A | 11/1983 | Grimes | |
| 4,414,984 A | 11/1983 | Zarudiansky | |
| 4,436,188 A | 3/1984 | Jones | |
| 4,464,117 A | 8/1984 | Forest | |
| 4,477,043 A | 10/1984 | Repperger | |
| 4,484,179 A | 11/1984 | Kasday | |
| 4,484,191 A | 11/1984 | Vavra | |
| 4,513,235 A | 4/1985 | Acklam et al. | |
| 4,542,375 A | 9/1985 | Alles et al. | |
| 4,545,023 A | 10/1985 | Mizzi | |
| 4,550,221 A | 10/1985 | Mabusth | |
| 4,557,275 A | 12/1985 | Dempsey, Jr. | |
| 4,560,983 A | 12/1985 | Williams | |
| 4,581,491 A | 4/1986 | Boothroyd | |
| 4,584,625 A | 4/1986 | Kellogg | |
| 4,599,070 A | 7/1986 | Hladky et al. | |
| 4,603,284 A | 7/1986 | Perzley | |
| 4,604,016 A | 8/1986 | Joyce | |
| 4,689,449 A | 8/1987 | Rosen | |
| 4,692,756 A | 9/1987 | Clark | |
| 4,706,294 A | 11/1987 | Ouchida | |
| 4,708,656 A | 11/1987 | De Vries et al. | |
| 4,713,007 A | 12/1987 | Alban | |
| 4,715,235 A | 12/1987 | Fukui et al. | |
| 4,757,453 A | 7/1988 | Nasiff | |
| 4,758,165 A | 7/1988 | Tieman et al. | |
| 4,763,356 A | 8/1988 | Day, Jr. et al. | |
| 4,771,344 A | 9/1988 | Fallacaro et al. | |
| 4,772,205 A | 9/1988 | Chlumsky et al. | |
| 4,782,327 A | 11/1988 | Kley et al. | |
| 4,791,416 A | 12/1988 | Adler | |
| 4,794,384 A | 12/1988 | Jackson | |
| 4,794,392 A | 12/1988 | Selinko | |
| 4,795,296 A | 1/1989 | Jau | |
| 4,800,721 A | 1/1989 | Cemenska et al. | |
| 4,821,030 A | 4/1989 | Batson et al. | |
| 4,823,634 A | 4/1989 | Culver | |
| 4,837,734 A | 6/1989 | Ichikawa et al. | |
| 4,839,838 A | 6/1989 | Labiche et al. | |
| 4,851,820 A | 7/1989 | Fernandez | |
| 4,853,874 A | 8/1989 | Iwamoto et al. | |
| 4,861,269 A | 8/1989 | Meenen, Jr. | |
| 4,868,549 A | 9/1989 | Affinito et al. | |
| 4,871,992 A | 10/1989 | Peterson | |
| 4,885,565 A | 12/1989 | Embach | |
| 4,891,764 A | 1/1990 | McIntosh | |
| 4,896,554 A | 1/1990 | Culver | |
| 4,906,843 A | 3/1990 | Jones et al. | |
| 4,914,624 A | 4/1990 | Dunthorn | |
| 4,926,879 A | 5/1990 | Sevrain et al. | |
| 4,930,770 A | 6/1990 | Baker | |
| 4,934,694 A | 6/1990 | McIntosh | |
| 4,935,728 A | 6/1990 | Kley | |
| 4,949,119 A | 8/1990 | Moncrief et al. | |
| 4,961,038 A | 10/1990 | MacMinn | |
| 4,977,298 A | 12/1990 | Fujiyama | |
| 4,983,901 A | 1/1991 | Lehmer | |
| 5,004,391 A | 4/1991 | Burdea | |
| 5,007,300 A | 4/1991 | Siva | |
| 5,019,761 A | 5/1991 | Kraft | |
| 5,022,384 A | 6/1991 | Freels | |
| 5,022,407 A | 6/1991 | Horch et al. | |
| 5,035,242 A | 7/1991 | Franklin et al. | |
| 5,038,089 A | 8/1991 | Szakaly | |
| 5,044,956 A | 9/1991 | Behensky et al. | |
| 5,065,145 A | 11/1991 | Purcell | |
| 5,076,517 A | 12/1991 | Ferranti et al. | |
| 5,078,152 A | 1/1992 | Bond | |
| 5,095,303 A | 3/1992 | Clark et al. | |
| 5,103,404 A | 4/1992 | McIntosh | |
| 5,107,080 A | 4/1992 | Rosen | |
| 5,107,262 A | 4/1992 | Cadoz et al. | |
| 5,116,180 A | 5/1992 | Fung et al. | |
| 5,121,091 A | 6/1992 | Fujiyama | |
| 5,133,076 A | 7/1992 | Hawkins et al. | |
| 5,139,261 A | 8/1992 | Openiano | |
| 5,143,505 A | 9/1992 | Burdea et al. | |
| 5,146,566 A | 9/1992 | Hollis, Jr. et al. | |
| 5,159,159 A | 10/1992 | Asher | |
| 5,165,897 A | 11/1992 | Johnson | |
| 5,172,092 A | 12/1992 | Nguyen et al. | |
| 5,175,459 A | 12/1992 | Danial et al. | |
| 5,184,319 A | 2/1993 | Kramer | |
| 5,184,868 A | 2/1993 | Nishiyama | |
| 5,185,561 A | 2/1993 | Good et al. | |
| 5,186,629 A | 2/1993 | Rohen | |
| 5,186,695 A | 2/1993 | Mangseth et al. | |
| 5,189,355 A | 2/1993 | Larkins et al. | |
| 5,193,963 A | 3/1993 | McAffee et al. | |
| 5,197,003 A | 3/1993 | Moncrief et al. | |
| 5,203,563 A | 4/1993 | Loper, III | |
| 5,212,473 A | 5/1993 | Louis | |
| 5,220,260 A | 6/1993 | Schuler | |
| 5,223,658 A | 6/1993 | Suzuki | |
| 5,223,776 A | 6/1993 | Radke et al. | |
| 5,235,868 A | 8/1993 | Culver | |
| 5,237,327 A | 8/1993 | Saitoh et al. | |
| 5,240,417 A | 8/1993 | Smithson et al. | |
| 5,262,777 A | 11/1993 | Low et al. | |
| 5,264,768 A | 11/1993 | Gregory et al. | |
| 5,270,710 A | 12/1993 | Gaultier et al. | |
| 5,271,290 A | 12/1993 | Fischer | |
| 5,275,174 A | 1/1994 | Cook | |
| 5,275,565 A | 1/1994 | Moncrief | |
| 5,283,970 A | 2/1994 | Aigner | |
| 5,286,203 A | 2/1994 | Fuller et al. | |
| 5,296,871 A | 3/1994 | Paley | |
| 5,299,810 A | 4/1994 | Pierce | |
| 5,302,132 A | 4/1994 | Corder | |
| 5,309,140 A | 5/1994 | Everett | |
| 5,313,230 A | 5/1994 | Venolia et al. | |
| 5,316,017 A | 5/1994 | Edwards et al. | |
| 5,334,027 A | 8/1994 | Wherlock | |
| 5,341,459 A | 8/1994 | Backes | |
| 5,354,162 A | 10/1994 | Burdea et al. | |
| 5,355,148 A | 10/1994 | Anderson | |
| 5,376,948 A | 12/1994 | Roberts | |
| 5,381,080 A | 1/1995 | Schnell et al. | |
| 5,389,849 A | 2/1995 | Asano et al. | |
| 5,389,865 A | 2/1995 | Jacobus et al. | |
| 5,396,266 A | 3/1995 | Brimhall | |
| 5,398,044 A | 3/1995 | Hill | |
| 5,399,091 A | 3/1995 | Mitsumoto | |
| 5,405,152 A | 4/1995 | Katanics et al. | |
| 5,414,337 A | 5/1995 | Schuler | |
| 5,432,531 A | 7/1995 | Calder et al. | |
| 5,436,622 A | 7/1995 | Gutman et al. | |
| 5,437,607 A | 8/1995 | Taylor | |
| 5,450,613 A | 9/1995 | Takahara et al. | |
| 5,451,924 A | 9/1995 | Massimino et al. | |
| 5,457,479 A | 10/1995 | Cheng | |
| 5,459,382 A | 10/1995 | Jacobus et al. | |
| 5,461,711 A | 10/1995 | Wang et al. | |
| 5,466,213 A | 11/1995 | Hogan | |
| 5,471,571 A | 11/1995 | Smith et al. | |
| 5,473,235 A | 12/1995 | Lance et al. | |
| 5,473,344 A | 12/1995 | Bacon et al. | |
| 5,491,477 A | 2/1996 | Clark et al. | |
| 5,506,605 A | 4/1996 | Paley | |
| 5,512,919 A | 4/1996 | Araki | |

| Patent | Date | Inventor |
|---|---|---|
| 5,513,100 A | 4/1996 | Parker et al. |
| 5,521,336 A | 5/1996 | Buchanan et al. |
| 5,530,455 A | 6/1996 | Gillick et al. |
| 5,542,672 A | 8/1996 | Meredith |
| 5,547,382 A | 8/1996 | Yamaski |
| 5,557,365 A | 9/1996 | Ohsawa |
| 5,562,707 A | 10/1996 | Prochazka et al. |
| 5,563,632 A | 10/1996 | Roberts |
| 5,565,887 A | 10/1996 | McCambridge et al. |
| 5,575,761 A | 11/1996 | Hajianpour |
| 5,576,727 A | 11/1996 | Rosenberg et al. |
| 5,577,981 A | 11/1996 | Jarvik |
| 5,580,251 A | 12/1996 | Gilkes et al. |
| 5,583,407 A | 12/1996 | Yamaguchi |
| 5,587,937 A | 12/1996 | Massie et al. |
| 5,589,828 A | 12/1996 | Armstrong |
| 5,589,854 A | 12/1996 | Tsai |
| 5,591,082 A | 1/1997 | Jensen et al. |
| 5,596,347 A | 1/1997 | Robertson et al. |
| 5,600,777 A | 2/1997 | Wang et al. |
| 5,619,180 A | 4/1997 | Massimino et al. |
| 5,625,576 A | 4/1997 | Massie et al. |
| 5,629,594 A | 5/1997 | Jacobus et al. |
| 5,638,060 A | 6/1997 | Kataoka et al. |
| 5,642,469 A | 6/1997 | Hannaford et al. |
| 5,643,087 A | 7/1997 | Marcus et al. |
| 5,644,516 A | 7/1997 | Podwalny et al. |
| 5,656,901 A | 8/1997 | Kurita |
| 5,666,138 A | 9/1997 | Culver |
| 5,666,473 A | 9/1997 | Wallace |
| 5,670,755 A | 9/1997 | Kwon |
| 5,690,582 A | 11/1997 | Ulrich et al. |
| 5,691,747 A | 11/1997 | Amano |
| 5,691,898 A | 11/1997 | Rosenberg et al. |
| 5,694,013 A | 12/1997 | Stewart et al. |
| 5,699,059 A | 12/1997 | Hiller |
| 5,709,219 A | 1/1998 | Chen et al. |
| 5,714,978 A | 2/1998 | Yamanaka |
| 5,719,561 A | 2/1998 | Gonzales |
| 5,721,566 A | 2/1998 | Rosenberg et al. |
| 5,724,106 A | 3/1998 | Autry et al. |
| 5,724,278 A | 3/1998 | Ohgose et al. |
| 5,729,249 A | 3/1998 | Yasutake |
| 5,731,804 A | 3/1998 | Rosenberg |
| 5,732,347 A | 3/1998 | Bartle et al. |
| 5,734,373 A | 3/1998 | Rosenberg |
| 5,736,978 A | 4/1998 | Hasser et al. |
| 5,739,811 A | 4/1998 | Rosenberg et al. |
| 5,742,278 A | 4/1998 | Chen et al. |
| 5,745,715 A | 4/1998 | Pickover et al. |
| 5,748,185 A | 5/1998 | Stephan et al. |
| 5,754,023 A | 5/1998 | Roston et al. |
| 5,755,577 A | 5/1998 | Gillio |
| 5,757,358 A | 5/1998 | Osga |
| 5,760,764 A | 6/1998 | Martinelli |
| 5,766,016 A | 6/1998 | Sinclair |
| 5,767,457 A | 6/1998 | Gerpheide et al. |
| 5,767,839 A | 6/1998 | Rosenberg |
| 5,769,640 A | 6/1998 | Jacobus et al. |
| 5,771,037 A | 6/1998 | Jackson |
| 5,781,172 A | 7/1998 | Engel et al. |
| 5,784,052 A | 7/1998 | Keyson |
| 5,785,630 A | 7/1998 | Bobick et al. |
| 5,790,108 A | 8/1998 | Salcudean et al. |
| 5,791,992 A | 8/1998 | Crump et al. |
| 5,802,353 A | 9/1998 | Avila et al. |
| 5,804,780 A | 9/1998 | Bartha |
| 5,805,140 A | 9/1998 | Rosenberg et al. |
| 5,805,165 A | 9/1998 | Thorne, III et al. |
| 5,805,416 A | 9/1998 | Friend et al. |
| 5,805,601 A | 9/1998 | Takeda et al. |
| 5,808,601 A | 9/1998 | Leah et al. |
| 5,808,603 A | 9/1998 | Chen |
| 5,821,921 A | 10/1998 | Osborn et al. |
| 5,823,876 A | 10/1998 | Unbehand |
| 5,825,308 A | 10/1998 | Rosenberg |
| 5,828,197 A | 10/1998 | Martin |
| 5,828,364 A | 10/1998 | Siddiqui |
| 5,831,408 A | 11/1998 | Jacobus et al. |
| 5,832,386 A | 11/1998 | Nojima et al. |
| 5,835,080 A | 11/1998 | Beeteson et al. |
| 5,844,392 A | 12/1998 | Peurach et al. |
| 5,844,506 A | 12/1998 | Binstead |
| 5,877,748 A | 3/1999 | Redlich |
| 5,880,714 A | 3/1999 | Rosenberg et al. |
| 5,884,029 A | 3/1999 | Brush, II et al. |
| 5,887,995 A | 3/1999 | Holehan |
| 5,889,236 A | 3/1999 | Gillespie et al. |
| 5,889,670 A | 3/1999 | Schuler et al. |
| 5,896,125 A | 4/1999 | Niedzwiecki |
| 5,897,437 A | 4/1999 | Nishiumi et al. |
| 5,903,257 A | 5/1999 | Nishiumi et al. |
| 5,907,615 A | 5/1999 | Kaschke |
| 5,912,661 A | 6/1999 | Siddiqui |
| 5,914,705 A | 6/1999 | Johnson et al. |
| 5,914,708 A | 6/1999 | Lagrange et al. |
| 5,917,906 A | 6/1999 | Thornton |
| 5,929,846 A | 7/1999 | Rosenberg et al. |
| 5,942,733 A | 8/1999 | Allen et al. |
| 5,943,044 A | 8/1999 | Martinelli et al. |
| 5,944,151 A | 8/1999 | Jakobs et al. |
| 5,953,413 A | 9/1999 | Peyer et al. |
| 5,956,016 A | 9/1999 | Kuenzner et al. |
| 5,956,484 A | 9/1999 | Rosenberg et al. |
| 5,959,613 A | 9/1999 | Rosenberg et al. |
| 5,973,689 A | 10/1999 | Gallery |
| 5,977,867 A | 11/1999 | Blouin |
| 5,982,304 A | 11/1999 | Selker et al. |
| 5,982,352 A | 11/1999 | Pryor |
| 5,984,785 A | 11/1999 | Takeda et al. |
| 5,986,643 A | 11/1999 | Harvill et al. |
| 5,988,902 A | 11/1999 | Holehan |
| 5,990,869 A | 11/1999 | Kubica et al. |
| 5,999,168 A | 12/1999 | Rosenberg et al. |
| 6,001,014 A | 12/1999 | Ogata et al. |
| 6,004,134 A | 12/1999 | Marcus et al. |
| 6,005,551 A | 12/1999 | Osborne et al. |
| 6,008,800 A | 12/1999 | Pryor |
| 6,018,711 A | 1/2000 | French-St. George |
| 6,020,876 A | 2/2000 | Rosenberg et al. |
| 6,024,576 A | 2/2000 | Bevirt et al. |
| 6,028,531 A | 2/2000 | Wanderlich |
| 6,028,593 A | 2/2000 | Rosenberg et al. |
| 6,037,927 A | 3/2000 | Rosenberg |
| 6,061,004 A | 5/2000 | Rosenberg |
| 6,067,081 A | 5/2000 | Hahlganss et al. |
| 6,071,194 A | 6/2000 | Sanderson et al. |
| 6,072,475 A | 6/2000 | van Ketwich et al. |
| 6,081,536 A | 6/2000 | Gorssuch et al. |
| 6,084,587 A | 7/2000 | Tarr et al. |
| 6,088,017 A | 7/2000 | Tremblay et al. |
| 6,088,019 A | 7/2000 | Rosenberg |
| 6,094,565 A | 7/2000 | Alberth et al. |
| 6,100,874 A | 8/2000 | Schena et al. |
| 6,102,803 A | 8/2000 | Takeda et al. |
| 6,110,130 A | 8/2000 | Kramer |
| 6,111,577 A | 8/2000 | Zilles et al. |
| 6,118,435 A | 9/2000 | Fujita et al. |
| 6,125,264 A | 9/2000 | Watanabe et al. |
| 6,125,385 A | 9/2000 | Wies et al. |
| 6,128,006 A | 10/2000 | Rosenberg |
| 6,131,097 A | 10/2000 | Peurach et al. |
| 6,140,987 A | 10/2000 | Stein et al. |
| 6,147,422 A | 11/2000 | Delson et al. |
| 6,147,674 A | 11/2000 | Rosenberg et al. |
| 6,151,332 A | 11/2000 | Gorsuch et al. |
| 6,154,201 A | 11/2000 | Levin et al. |
| 6,160,489 A | 12/2000 | Perry et al. |
| 6,161,126 A | 12/2000 | Wies et al. |
| 6,166,723 A | 12/2000 | Schena et al. |
| 6,169,540 B1 | 1/2001 | Rosenberg et al. |
| 6,171,191 B1 | 1/2001 | Ogata et al. |
| 6,178,157 B1 | 1/2001 | Berg et al. |
| 6,184,868 B1 | 2/2001 | Shahoian |
| 6,198,206 B1 | 3/2001 | Saarmaa et al. |
| 6,215,778 B1 | 4/2001 | Lomp et al. |
| 6,218,966 B1 | 4/2001 | Goodwin et al. |
| 6,219,032 B1 | 4/2001 | Rosenberg et al. |

| Patent Number | Date | Inventor |
|---|---|---|
| 6,219,034 B1 | 4/2001 | Elbing et al. |
| 6,236,647 B1 | 5/2001 | Amalfitano |
| 6,239,790 B1 | 5/2001 | Martinelli et al. |
| 6,243,080 B1 | 6/2001 | Molne |
| 6,262,717 B1 | 7/2001 | Donohue et al. |
| 6,262,718 B1 | 7/2001 | Findlay et al. |
| 6,292,174 B1 | 9/2001 | Mallett et al. |
| 6,300,936 B1 | 10/2001 | Braun et al. |
| 6,307,465 B1 | 10/2001 | Kayma et al. |
| 6,323,846 B1 | 11/2001 | Westerman et al. |
| 6,326,901 B1 | 12/2001 | Gonzales |
| 6,332,075 B1 | 12/2001 | Verdonk |
| 6,337,678 B1 | 1/2002 | Fish |
| 6,359,550 B1 | 3/2002 | Brisebois et al. |
| 6,373,463 B1 | 4/2002 | Beeks |
| 6,388,655 B1 | 5/2002 | Leung |
| 6,388,999 B1 | 5/2002 | Gorsuch et al. |
| 6,411,198 B1 | 6/2002 | Hirai et al. |
| 6,411,276 B1 | 6/2002 | Braun et al. |
| 6,414,674 B1 | 7/2002 | Kamper et al. |
| 6,415,138 B2 | 7/2002 | Sirola et al. |
| 6,418,323 B1 | 7/2002 | Bright et al. |
| 6,422,941 B1 | 7/2002 | Thorner et al. |
| 6,424,356 B2 | 7/2002 | Chang et al. |
| 6,429,846 B2 | 8/2002 | Rosenberg et al. |
| 6,435,794 B1 | 8/2002 | Springer |
| 6,438,390 B1 | 8/2002 | Awan |
| 6,438,392 B1 | 8/2002 | Toba |
| 6,441,599 B1 | 8/2002 | Kropidlowski |
| 6,445,284 B1 | 9/2002 | Cruz-Hernandez et al. |
| 6,447,069 B1 | 9/2002 | Terris et al. |
| 6,448,977 B1 | 9/2002 | Braun et al. |
| 6,469,695 B1 | 10/2002 | White |
| 6,473,069 B1 | 10/2002 | Gerpheide |
| 6,487,421 B2 | 11/2002 | Hess et al. |
| 6,509,892 B1 | 1/2003 | Cooper et al. |
| 6,518,958 B1 | 2/2003 | Mayajima et al. |
| 6,525,749 B1 * | 2/2003 | Moran et al. ................ 345/173 |
| 6,529,122 B1 | 3/2003 | Magnussen et al. |
| 6,535,201 B1 | 3/2003 | Cooper et al. |
| 6,563,487 B2 | 5/2003 | Martin |
| 6,574,489 B1 | 6/2003 | Uriya |
| 6,606,508 B2 | 8/2003 | Becker et al. |
| 6,610,936 B2 | 8/2003 | Gillespie et al. |
| 6,626,358 B1 | 9/2003 | Breimesser et al. |
| 6,628,195 B1 | 9/2003 | Coudon |
| 6,636,197 B1 | 10/2003 | Goldenbert et al. |
| 6,636,202 B2 | 10/2003 | Ishmael, Jr. et al. |
| 6,639,581 B1 | 10/2003 | Moore |
| 6,639,582 B1 | 10/2003 | Schrader |
| 6,647,145 B1 | 11/2003 | Gay |
| 6,671,618 B2 | 12/2003 | Hoisko |
| 6,680,729 B1 | 1/2004 | Shahoian et al. |
| 6,690,955 B1 | 2/2004 | Komiyama |
| 6,697,043 B1 | 2/2004 | Shahoian |
| 6,710,518 B2 | 3/2004 | Morton et al. |
| 6,723,937 B2 | 4/2004 | Englemann et al. |
| 6,727,916 B1 | 4/2004 | Ballard |
| 6,792,294 B1 | 9/2004 | Kushita |
| 6,819,922 B1 | 11/2004 | Janz |
| 6,822,635 B2 | 11/2004 | Shahoian et al. |
| 6,834,373 B2 | 12/2004 | Dieberger |
| 6,850,150 B1 | 2/2005 | Ronkainen |
| 6,850,781 B2 | 2/2005 | Goto |
| 6,859,819 B1 | 2/2005 | Rosenberg et al. |
| 6,876,847 B2 | 4/2005 | Kudoh |
| 6,882,713 B2 | 4/2005 | Sakai et al. |
| 6,885,876 B2 | 4/2005 | Aaltonen et al. |
| 6,940,497 B2 | 9/2005 | Vincent et al. |
| 6,944,482 B2 | 9/2005 | Engstrom et al. |
| 6,963,839 B1 | 11/2005 | Osterman et al. |
| 6,982,696 B1 | 1/2006 | Shahoian |
| 7,009,595 B2 | 3/2006 | Roberts et al. |
| 7,061,466 B1 | 6/2006 | Moore |
| 7,096,045 B2 | 8/2006 | Yoshinaga |
| 7,103,389 B2 | 9/2006 | Shibata |
| 7,113,177 B2 | 9/2006 | Franzen |
| 7,127,271 B1 | 10/2006 | Fuisaki |
| 7,149,208 B2 | 12/2006 | Mattaway et al. |
| 7,151,528 B2 | 12/2006 | Taylor et al. |
| 7,171,191 B2 | 1/2007 | Olson |
| 7,184,765 B1 | 2/2007 | Birnie et al. |
| 7,215,329 B2 | 5/2007 | Yoshikawa et al. |
| 7,218,310 B2 | 5/2007 | Tierling |
| 7,225,000 B2 | 5/2007 | Katayanagi |
| 7,289,796 B2 | 10/2007 | Kudoh |
| 7,312,790 B2 | 12/2007 | Sato et al. |
| 7,328,020 B2 | 2/2008 | Masuda et al. |
| 7,336,260 B2 | 2/2008 | Martin et al. |
| 7,336,977 B2 | 2/2008 | Katayanagi |
| 7,369,115 B2 | 5/2008 | Cruz-Hernandez et al. |
| 7,373,120 B2 | 5/2008 | Messel et al. |
| 7,424,272 B2 | 9/2008 | Horiguchi |
| 7,533,342 B1 | 5/2009 | Vialle et al. |
| 7,728,820 B2 | 6/2010 | Rosenberg et al. |
| 2001/0036832 A1 | 11/2001 | McKay |
| 2001/0044328 A1 | 11/2001 | Tsukamoto |
| 2002/0012323 A1 | 1/2002 | Petite et al. |
| 2002/0039914 A1 | 4/2002 | Hama et al. |
| 2002/0044155 A1 | 4/2002 | Becker |
| 2002/0107936 A1 | 8/2002 | Amon |
| 2002/0111737 A1 | 8/2002 | Hoisko |
| 2002/0130904 A1 | 9/2002 | Becker et al. |
| 2002/0149561 A1 | 10/2002 | Fukumoto et al. |
| 2002/0149570 A1 | 10/2002 | Knowles et al. |
| 2002/0177471 A1 | 11/2002 | Kaaresoja |
| 2002/0193125 A1 | 12/2002 | Smith et al. |
| 2002/0194246 A1 | 12/2002 | Moskowitz et al. |
| 2003/0002682 A1 | 1/2003 | Smith et al. |
| 2003/0006892 A1 | 1/2003 | Church |
| 2003/0016211 A1 | 1/2003 | Woolley |
| 2003/0022701 A1 | 1/2003 | Gupta |
| 2003/0038776 A1 | 2/2003 | Rosenberg et al. |
| 2003/0045266 A1 | 3/2003 | Staskal et al. |
| 2003/0048260 A1 | 3/2003 | Matusis |
| 2003/0058265 A1 | 3/2003 | Robinson et al. |
| 2003/0067440 A1 | 4/2003 | Rank |
| 2003/0071795 A1 | 4/2003 | Baldauf et al. |
| 2003/0076298 A1 | 4/2003 | Rosenberg |
| 2003/0078071 A1 | 4/2003 | Uchiyama |
| 2003/0095105 A1 | 5/2003 | Vaananen |
| 2003/0128191 A1 | 7/2003 | Strasser et al. |
| 2003/0128192 A1 | 7/2003 | Van Os |
| 2003/0174121 A1 | 9/2003 | Poupyrev et al. |
| 2003/0184574 A1 | 10/2003 | Phillips et al. |
| 2003/0236729 A1 | 12/2003 | Epstein et al. |
| 2004/0059790 A1 | 3/2004 | Austin-Lane |
| 2004/0067780 A1 | 4/2004 | Eiden |
| 2004/0203656 A1 | 10/2004 | Andrew et al. |
| 2004/0204049 A1 | 10/2004 | Hsu et al. |
| 2005/0017947 A1 | 1/2005 | Shahoian et al. |
| 2005/0052430 A1 | 3/2005 | Shahoian et al. |
| 2005/0134561 A1 | 6/2005 | Tierling et al. |
| 2006/0248183 A1 | 11/2006 | Barton |
| 2007/0229478 A1 | 10/2007 | Rosenberg et al. |
| 2008/0068350 A1 | 3/2008 | Rosenberg et al. |

FOREIGN PATENT DOCUMENTS

| | | |
|---|---|---|
| EP | 0062664 | 10/1982 |
| EP | 0085518 | 8/1983 |
| EP | 0265011 | 4/1988 |
| EP | 0349086 | 1/1990 |
| EP | 0607580 | 7/1994 |
| EP | 0626634 | 11/1994 |
| EP | 0556999 B1 | 5/1998 |
| EP | 0875819 | 11/1998 |
| EP | 1182851 | 2/2002 |
| JP | 63164127 | 10/1988 |
| JP | 01-003664 | 7/1990 |
| JP | 02-109714 | 1/1992 |
| JP | 520226 | 3/1993 |
| JP | 04-007371 | 8/1993 |
| JP | 6018341 | 1/1994 |
| JP | 6139018 | 5/1994 |
| JP | 06-265991 | 9/1994 |
| JP | 05-193862 | 1/1995 |
| JP | 764723 | 3/1995 |
| JP | 07113703 | 5/1995 |

| | | |
|---|---|---|
| JP | 07266263 | 10/1995 |
| JP | U 2511577 | 7/1996 |
| JP | 10-105337 | 4/1998 |
| JP | 11299305 | 2/1999 |
| JP | 1185400 | 3/1999 |
| JP | 11338629 | 12/1999 |
| JP | 2001-350592 | 12/2001 |
| JP | 2002-259059 A | 9/2002 |
| WO | 9200559 | 1/1992 |
| WO | 9520788 | 8/1995 |
| WO | WO 95/32459 | 11/1995 |
| WO | WO 96/28777 | 9/1996 |
| WO | WO 97/12357 | 4/1997 |
| WO | 9718546 | 5/1997 |
| WO | WO 97/20305 | 6/1997 |
| WO | WO 97/21160 | 6/1997 |
| WO | WO 97/31333 | 8/1997 |
| WO | WO 98/08159 | 2/1998 |
| WO | WO 98/24183 | 6/1998 |
| WO | WO 98/58323 | 12/1998 |
| WO | 9940504 | 8/1999 |
| WO | WO 00/03319 | 1/2000 |
| WO | WO 00/21071 | 4/2000 |
| WO | 0041788 | 7/2000 |
| WO | WO 02/03172 | 1/2002 |
| WO | WO 02/12991 | 4/2002 |
| WO | WO 02/27645 | 4/2002 |
| WO | WO 02/31807 | 4/2002 |
| WO | WO 02/059869 | 8/2002 |
| WO | WO 02/078810 | 10/2002 |
| WO | WO 2004/052193 | 6/2004 |
| WO | WO 2004/053644 | 6/2004 |
| WO | WO 2004/053671 | 6/2004 |
| WO | WO 2004/053829 | 6/2004 |
| WO | WO 2004/053830 | 6/2004 |

OTHER PUBLICATIONS

Adelstein, "A Virtual Environment System for the Study of Human Arm Tremor," Ph.D. Dissertation, Dept. of Mechanical Engineering, MIT, Jun. 1989.

Adelstein, "Design and Implementation of a Force Reflecting Manipulandum for Manual Control research," DSC-vol. 42, Advances in Robotics, Edited by H. Kazerooni, pp. 1-12, 1992.

Adelstein, et al., "A High Performance Two-Degree-of-Freedom Kinesthetic Interface," MIT, 1992, pp. 108-112.

Akamatsu et al., "Multimodal Mouse: A Mouse-Type Device with Tactile and Force Display," 1994, Presence vol. 3, pp. 73-80.

Atkinson et al., "Computing with Feeling,", Comput. & Graphics, vol. 2, 1977, pp. 97-103.

Aukstakalnis et al., "Silicon Mirage: The Art and Science of Virtual Reality," ISBN 0-938151-82-7, pp. 129-180, 1992.

Baigrie, "Electric Control Loading—A Low Cost, High Performance Alternative," Proceedings, pp. 247-254, Nov. 6-8, 1990.

Batter et al., "Grope-1: A computer Display to the sense of Feel," Proc IFIP Congress, 1971, pp. 759-763.

Bejczy, "Generalization of Bilateral Force-Reflecting Control of Manipulators," Proceedings Of Fourth CISM-IFToMM, Sep. 8-12, 1981.

Bejczy, "Sensors, Controls, and Man-Machine Interface for Advanced Teleoperation," Science, vol. 208, No. 4450, pp. 1327-1335, 1980.

Bejczy et al., "A Laboratory Breadboard System For Dual-Arm Teleoperation," SOAR '89 Workshop, JSC, Houston, TX, Jul. 25-27, 1989.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy, et al., "Universal Computer Control System (UCCS) For Space Telerobots," CH2413-3/87/0000/0318501.00 1987 IEEE, 1987.

Bejezy et al., "The Phantom Robot: Predictive Displays for Teleoperation with Time Delay," IEEE CH2876, Jan. 1990, pp. 546-550.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Brooks, Jr. et al., "Project GROPE, Haptic Displays for Scientific Visualization,", Computer Graphics, vol. 24, #4, 1990, pp. 177-184.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Buttolo et al., "Pen-based force Display for Precision Manipulation in Virtual Environments," IEEE 0-8186-7084-3, 1995, pp. 217-224.

Calder, "Design of A Force-Feedback Touch-Introducing Actuator For Teleoperator Robot Control," Bachelor of Science Thesis, MIT, Jun. 23, 1983.

Caldwell et al., "Enhanced Tactile Feedback (Tele-Taction) Using a Multi-Functional Sensory System," 1050-4729/93, pp. 955-960, 1993.

Chang "Audio-Haptic Feedback in Mobile Phones", Proceedings of AMC CHI 2005 Conference on Human Factors in Computing Systems, Apr. 2-7, 2005, Portland, Oregon, pp. 1264-1267, 2005.

Colgate et al., "Implementation of Stiff Virtual Walls in Force-Reflecting Interfaces," Northwestern University, IL, 1993., pp. 1-8.

Dennerlein et al., "Vibrotactile Feedback for Industrial Telemanipulators," 1997, Sixth Annual Symp. On Haptic Interfaces for Virtual Env. And Teleoperator Systems, ASME IMECE, Dallas, pp. 1-7.

Dennerlein, Jack et al., "Commercialization of Vibrotactile Feedback for Telemanipulation and Virtual Environments," 1997, Phase I Final Report for ONR Contract N00014-96-C-0325 (not published or publicly available).

Durlach, Nathaniel I. et al, "Virtual REALITY: Scientific and Technological Challenges", National Academy Press, Washington, DC 1995 pp. 160-205.

Ellis et al., Design & Evaluation of a High-Performance Prototype Planar Haptic Interface, Dec. 1993, Advances in Robotics, 55-64.

Erikson, Carl "Polygonal Simplificatin: An Overview", Dept. of Computer Science, TR96-016 1996, pp. 1-32.

Fischer, et al., "Specification and Design of Input Devices for Teleoperation," IEEE CH2876, Jan. 1990, pp. 540-545.

Fokumoto, "Active Click: Tactile Feedback for Touch Panels," ACM CHI2001 Extended Abstracts, pp. 121-122, Apr. 2001.

Fukuhara et al, Voice Café: Conversation Support System in a Gourp, 2001, IOS Press, pp. 334 and 335.

Gobel et al., "Tactile Feedback Applied to Computer Mice," International Journal of Human-Computer Interaction, vol. 7, No. 1, pp. 1-24, 1995.

Gotow et al., "Controlled Impedance Test Apparatus for Studying Human Interpretation of Kinesthetic Feedback," WA11-11:00, pp. 332-337.

Gotow et al., "Perception of Mechanical Properties at the Man—Machine Interface," IEEE CH2503-1, 1987, pp. 688-690.

Hannaford et al., "Force-Feedback Cursor Control," NASA Tech Briefs, vol. 13, No. 11, 1989, pp. 1-7.

Hannaford et al., "Performance Evaluation of a 6-Axis Generalized Force-Reflecting Teleoperator," IEEE Transactions on Systems, Man, and Cybernetics, vol. 21, No. 3, 1991, pp. 621-623, 631-633.

Hardman, Lynda et al "Do You Have the Time? Composition and Linking in Time-based Hypermedia", Proceedings of the 10th ACM Conference of Hypertext and Hypermedia, Feb. 1999, pp. 189-196.

Hasser, C., "Tactile Feedback for a Force-Reflecting Haptic Display," School of Eng., Univ. of Dayton, Dayton, OH, 1995, pp. 1-98.

Hasser, C. et al., "Tactile Feedback with Adaptive Controller for a Force-Reflecting Haptic Display," Parts 1 and 2, IEEE 0-7803-3131-1, 1996, pp. 526-533.

Hirota et al., "Development of Surface Display," IEEE 0-7803-1363-1, 1993, pp. 256-262.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

Howe et al., "Task Performance w/ a dextrous Teleoperated Hand System," Proc. of SPIE, vol. 1833, 1992, pp. 1-9.

IBM Technical Disclosure Bulletin, "Mouse Ball-Actuating Device With Force and Tactile Feedback," vol. 32, No. 9B, Feb. 1990.

Iwata, "Pen-based Haptic Virtual Environment," 0-7803-1363-1/93 IEEE, pp. 287-292, 1993.

Iwata, Hiroo, "Artificial Reality with Force-feedback: Development of Desktop Virtual Space with Compact Master Manipulator," Computer Graphics, vol. 24, No. 4, Aug. 1990, pp. 165-170.

Jackson, K. M., "Linerity of Radio-Frequency Transducers", Medical and Biological Engineering and Computer, Jul. 1977, pp. 446-449.

Jacobsen et al., "High Performance, Dextrous Telerobotic Manipulator With Force Reflection," InterventiorVROV '91 Conference & Exposition, Hollywood, Florida, May 21-23, 1991.

Jones et al., "A perceptual analysis of stiffness," ISSN 0014-4819 Springer International (Springer-Verlag); Experimental Brain Research, vol. 79, No. 1, pp. 150-156, 1990.

Kelley et al., "MagicMouse: Tactile and Kinesthetic Feedback in the Human—Computer Interface using an Electromagnetically Actuated Input/Output Device," Oct. 19, 1993 University of British Columbia pp. 1-27.

Kelley et al., "On the Development of a Force-Feedback Mouse and its Integration into a graphical user Interface," Nov. 1994, Engineering Congress and Exhibition, pp. 1-8.

Kilpatrick et al., "The Use of Kinesthetic Supplement in an Interactive Graphics System," University of North Carolina, 1976, pp. 1-172.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Kontarinis et al., "Tactile Display of Vibratory Information in Teleoperation and Virtual Environments," PRESENCE, 4(4):387-402, 1995.

Kotoku, "A Predictive Display with Force Feedback and its Application to Remote Manipulation System with Transmission Time Delay," Proc. of IEEE/RSJ Int'l Conf. On Intelligent Robots and Systems, Jul. 1992.

Kotoku, et al., "Environment Modeling for the Interactive Display (EMID) Used in Telerobotic Systems," IEEE/RSJ Int'l Workshop on Intelligent Robots and Systems, Nov. 1991, pp. 999-1004.

Lake, "Cyberman from Logitech," GameBytes, 1994.

"Cyberman Technical Specification," Logitech Cyberman SWIFT Supplement, Apr. 5, 1994.

MacLean, Karon et al "An Architecture For Haptic Control Of Media," in: The Proceedings of the ASMA Dynamic SySTEMS and Control Division: 1999 International Mechanical Engineering Congress and Exposition, Eighth Annual Symposium on Haptic Interfaces for Virtual Environment and Teleoperator Systems, Nov. 14-19, 1999, pp. 1-10.

Marcus, "Touch Feedback in Surgery," Proceedings of Virtual Reality and Medicine The Cutting Edge, Sep. 8-11, 1994.

McAffee et al, Teleoperator Subsystem/Telerobot Demonstrator: Force Reflecting Hand Controller Equipment Manual, JPL D-5172, pp. 1-50, A1-A36, B1-B5, C1-C36, Jan. 1988.

Millman et al., "Design of a 4 Degree of Freedom Force-Reflecting Manipulandum with a Specified Force/Torque Workspace," IEEE CH2969-4, 1991, pp. 1488-1493.

Minsky, "Computational Haptics: The Sandpaper System for Synthesizing Texture for a Force-Feedback Display," Ph.D. Dissertation, MIT, Jun. 1995.

Minsky et al., "Feeling & Seeing:Issues in Force Display," ACM089791-351-5, 1990, pp. 235-242, 270.

Munch et al., "Intelligent Control for Haptic Displays," Eurographics '96, vol. 15, No. 3, 1996, pp. 217-226.

Noll, "Man-Machine Tactile," SID Journal, Jul./Aug. 1972 Issue.

Ouh-Young, "Force Display in Molecular Docking," Order No. 9034744, p. 1-369, 1990.

Ouh-Young, "A Low-Cost Force Feedback Joystick and Its Use in PC Video Games," IEEE Transactions on Consumer Electronics, vol. 41, No. 3, Aug. 1995.

Ouh-Young et al., "The Development of A Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Ouh-Young et al., "Creating an Illusion of Feel: Control Issues in Force Display," Univ. of N. Carolina, 1989, pp. 1-14.

Ouh-young, et al., Using a Manipulator for Force Display in Molecular Docking, IEEE CH2555, 1988, pp. 1824-1829.

Patrick et al., "Design and Testing of A Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Patrick, "Design, Construction, and Testing of a Fingertip Tactile Display for Interaction with Virtual and Remote Environments," Master of Science Thesis, MIT, Nov. 8, 1990.

Payette et al., "Evaluation of a Force Feedback (Haptic) Computer Printing Device in Zero Gravity," Oct. 17, 1996, ASME Dynamics Systems, vol. 58 pp. 547-553.

Pimentel et al., Virtual Reality: through the new looking glass, 2nd Edition; McGraw-Hill, ISBN 0-07-050167-X, pp. 41-202, 1994.

Ramstein et al., "The Pantograph: A Large Workspace Haptic Device for a Multimodal Human—Computer Interaction," Computer—Human Interaction, CHI 1994, pp. 1-3.

Rosenberg, "Virtual Fixtures: Perceptual Overlays Enhance Operator Performance in Telepresence Tasks," Ph.D. Dissertation, Stanford University, Jun. 1994.

Rosenberg, L., "Virtual fixtures as tools to enhance operator performance in telepresence environments," SPIE Manipulator Technology, 1993, pp. 1-12.

Rosenberg et al., "A Force Feedback Programming Primer," Immersion Corp., 1997, pp. 1-176.

Rosenberg et al., "Commercially Viable force feedback Controller for Individuals with Neuromotor Disabilities," Armstrong Laboratory, AL/CF-TR-1997-0016, 1996, pp. 1-33.

Rosenberg et al., "Perceptual Decomposition of Virtual Haptic Surfaces," Proc. IEEE Symposium on Research Frontiers in Virtual Reality, 1993, pp. 1-8.

Rosenberg et al., "The use of force feedback to enhance graphical user interfaces," Stereoscopic Displays & Virtual Reality Systems, 1996, pp. 243-248.

Rosenberg, "Perceptual Design of a Virtual Rigid Surface Contact," Armstrong Laboratory AL/CF-TR-1995-0029, 1993, pp. 1-45.

Rosenberg, "Virtual Haptic Overlays Enhance Performance in Telepresence Tasks," Dept. of Mech. Eng., Stanford Univ., 1994.

Rosenberg, et al., "The Use of Force Feedback to Enhance Graphical User Interfaces," Proc. SPIE 2653, 1996, pp. 243-248.

Russo, "Controlling Dissipative Magnetic Particle Brakes in Force Reflective Devices," DSC-vol. 42, Advances in Robotics, pp. 63-70, ASME 1992.

Russo, "The Design and Implementation of a Three Degree of Freedom Force Output Joystick," MIT Libraries Archives Aug. 14, 1990, pp. 1-131, May 1990.

Scannell, "Taking a Joystick Ride," Computer Currents, Boston Edition, vol. 9, No. 11, Nov. 1994.

Schmult et al., "Application Areas for a Force-Feedback Joystick," 1993, Advances in Robotics, vol. 49, pp. 47-54.

Safe Flight Instruments Corporation, Coaxial Control Shaker, Part No. C-25502, Jul. 1, 1967.

"Component Maintenance Manual with Illustrated Parts List, Coaxial Shaker Part No. C-25502", Safe Flight Instrument Corporation, Revised Jan. 28, 2002 (3 pages).

"Technical Manual Overhaul Instructions With Parts Breakdown, Coaxial Control Shaker Part No. C-25502", Safe Flight Instrument Corporation, revised Jul. 15, 1980 (23 pages).

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Force Feedback Touch Panel, Represented by CSC Division, Sales Department, SIXIK Corporation, Tokyo, Japan, www.smk.co.jp.

SMK Corporation, "Multi-Functional Touch Panel, Force-Feedback Type, Developed: A Touch Panel Providing a Clicking Feeling," http://www.smk.co.jp/whatsnew_e/628csc_e.html, Sep. 30, 2002.

Snibbe, Scott S., "Haptic Techniques for Media Control," In Proceeding of the 14th Annual ACM Symposium on User Interface Software and Technology, 2001, pp. 1-10.

Snow et al., "Model-X Force-Reflecting-Hand-Controller," NT Control No. MPO-17851; JPL Case No. 5348, pp. 1-4, Jun. 15, 1989.

Stanley et al., "Computer Simulation of Interacting Dynamic Mechanical Systems Using Distributed Memory Parallel Processors," DSC-vol. 42, Advances in Robotics, pp. 55-61, ASME 1992.

Su et al., "The Virtual Panel Architectures: A 3D Gesture Framework," University of Maryland, pp. 387-393.

Tadros, "Control System Design for a Three Degree of Freedom Virtual Environment Simulator Using Motor/Brake Pair Actuators", MIT Archive © Massachusetts Institute of Technology, pp. 1-88, Feb. 1990.

Tan et al., "Manual Resolution of Compliance When Work and Force Cues are Minimized," DSC-vol. 49, Advances in Robotics, Mechatronics, and Haptic Interfaces, ASME 1993, pp. 99-104.

Terry et al., "Tactile Feedback In A Computer Mouse," Proceedings of Fourteenth Annual Northeast Broengineenng Conference, University of New Hampshire, Mar. 10-11, 1988.

Wiker, Steven F., "Teletouch Display Development: Phase 1 Report," Naval Ocean Systems Center, Technical Report 1230, Jul. 1988, 66 pages.

Winey III, "Computer Stimulated Visual & Tactile Feedback as an Aid to Manipulator & Vehicle Control," MIT, 1981, pp. 1-79.

Yamakita et al., "Tele-Virtual Reality of Dynamic Mechanical Model," Proc. of IEEE/RSJ Int'l Conf. On Intelligent Robots and Systems, Jul. 1992, pp. 1103-1110.

Yokokoji, et al., "What You Can See is What You Can Feel—Development of a Visual/Haptic Interface to Virtual Environment," Proc. VRAIS 1996.

Yokokoji et al., "What you can see is what you can feel," IEEE 0-8186-7295-1, 1996, pp. 46-54.

IPRP PCT/US2005/036861 mailed Feb. 23, 2006.
ISR/WO—PCT/US03/038862 dated Apr. 12, 2004.
ISR/WO—PCT/US03/038868 dated Sep. 27, 2004.
ISR/WO—PCT/US03/038899 dated Apr. 19, 2004.
ISR/WO—PCT/US03/038900 dated Apr. 14, 2004.
ISR/WO—PCT/US03/038961 dated Apr. 5, 2004.
ISR/WO—PCT/US06/35645—dated Jun. 23, 2008.
ISR/WO—PCT/US06/45644 dated Sep. 13, 2007.
ISR/WO—PCT/US09/041099 dated Jan. 2, 2002.
ISR/WO—PCT/US2005/036861 mailed Feb. 23, 2006.

Bliss, James C., "Optical-to-Tactile Image Conversion for the Blind," IEEE Transactions on Man-Machine Systems, vol. MMS-11, No. 1, 1970, pp. 58-65.

Bolanowski, S.J. et al., "Four Channels Mediate the Mechanical Aspects of Touch," J. Acoust. Soc. Am. 84 vol. 84 (5), Nov. 1988, pp. 1680-1694.

Eberhardt, Silvio P. et al., "OMAR—A Haptic Display for Speech Perception by Deaf and Deaf-Blind Individuals," IEEE 1993, pp. 195-201.

Eberhardt, Silvio P. et al., "Inducing Dynamic Haptic Perception by the Hand: System Description and Some Results," Proceedings of ASME Dynamic Systems and Control, vol. DSC-55-1, No. 1, 1994, pp. 345-351.

Frisken-Gibson, Sarah F. et al, "A 64-Solenoid, Four-Level Fingertip Search Display for the Blind," IEEE Transactions on Biomedical Engineering, vol. BME-34, No. 12, Dec. 1987, pp. 963-965.

Goldstein, Moise H. et al., "Tactile Aids for the Profoundly Deaf Child," 77 J. Acoust. Soc. Am 77 (1), Jan. 1985, pp. 258-265.

Johnson, David A., "Shape-Memory Alloy Tactical Feedback Actuator," Tini Allow Company, Inc., Aug. 1990, 2 pages, pp. i-33.

Kaczmarek, Kurt A. et al, "Electrotactile and Vibrotactile Displays for Sensory Substitution Systems", IEEE Transactions on Biomedical Engineering, vol. 38, No. 1, Jan. 1991, pp. 1-16.

Kaczmarek, K. A. et al. "Tactile Displays," in: Virtual Environments and Advanced Interface Design, New York: Oxford University Press, 1995, pp. 349-414.

Peine, W.J., "Tactile Shape Displays for Small Scale Shape Feedback," http://www.hrl.harvard.edu/~peine/display.html, 1998, pp. 1-2.

Rabinowitz, W. M. et al., "Multidimensional Tactile Displays: Identification of Vibratory Intensity, Frequency, and Contactor Area," J. Acoust. Soc. Am. 82 (4), Oct. 1987, pp. 1243-1252.

Ramstein, Christophe, "Combining Haptic and Braille Technologies: Design Issues and Pilot Study," Assets '96, 2nd Annual ACM Conference on Assistive Technologies, ACM SIGRAPH, Apr. 1996, pp. 37-44.

SMK, "Force Feedback Touch Panel," SMK Corporation, For Reference, 1 page.

Wiker, Steven F. et al., "Development of Tactile Mice for Blind Access to Computers: Importance of Stimulation Locus, Object Size, and Vibrotactile Display Resolution," Proceedings of the Human Factors Society 35th Annual Meeting, 1991, pp. 708-712.

Definition of "avatar", 2001, Hargrave's Communications Dictionary.

* cited by examiner

HAPTIC INTERFACE FOR TOUCH SCREEN EMBODIMENTS

CROSS REFERENCE TO RELATED APPLICATIONS

This application is a continuation of U.S. patent application Ser. No. 10/919,798 filed Aug. 17, 2004 which is a continuation of U.S. patent application Ser. No. 09/917,263 filed Jul. 26, 2001 which is a continuation-in-part of U.S. patent application Ser. No. 09/487,737, entitled "Haptic Feedback for Touchpads and Other Touch Controls," filed Jan. 19, 2000. The 09/917,263 application claims the benefit of U.S. Provisional Application No. 60/274,444, filed Mar. 9, 2001, entitled, "Haptic Interface for Laptop Computers and Other Portable Devices."

TECHNICAL FIELD

The subject matter relates generally to the interfacing with computer and mechanical devices by a user, and more particularly to devices used to interface with computer systems and electronic devices and which provide haptic feedback to the user.

BACKGROUND

Humans interface with electronic and mechanical devices in a variety of applications, and the need for a more natural, easy-to-use, and informative interface is a constant concern. In the context herein, humans interface with computer devices for a variety of applications. One such application is interacting with computer-generated environments such as games, simulations, and application programs. Computer input devices such as mice and trackballs are often used to control a cursor within a graphical environment and provide input in these applications.

In some interface devices, force feedback or tactile feedback is also provided to the user, collectively known herein as "haptic feedback". For example, haptic versions of joysticks, mice, gamepads, steering wheels, or other types of devices can output forces to the user based on events or interactions occurring within the graphical environment, such as in a game or other application program.

In portable computer or electronic devices, such as laptop computers, mice typically too large a workspace to be practical. As a result, more compact devices such as trackballs are often used. Currently, a more popular device for portable computers are "touchpads," which are small rectangular, planar pads provided near the keyboard of the computer. The touchpad senses the location of a pointing object by any of a variety of sensing technologies, such as capacitive sensors or pressure sensors that detect pressure applied to the touchpad. The user contacts the touchpad most commonly with a fingertip and moves his or her finger on the pad to move a cursor displayed in the graphical environment. In other embodiments, the user can operate a stylus in conjunction with the touchpad by pressing the stylus tip on the touchpad and moving the stylus.

One problem with existing touchpads is that there is no haptic feedback provided to the user. The user of a touchpad is therefore not able to experience haptic sensations that assist and inform the user of targeting and other control tasks within the graphical environment. The touchpads of the prior art also cannot take advantage of existing haptic-enabled software run on the portable computer.

Overview

The subject matter is directed to a haptic feedback planar touch control used to provide input to a computer system. The control can be a touchpad provided on a portable computer, or can be a touch screen found on a variety of devices. The haptic sensations output on the touch control enhance interactions and manipulations in a displayed graphical environment or when controlling an electronic device.

More specifically, a haptic feedback touch control for inputting signals to a computer and for outputting forces to a user of the touch control. The control includes a touch input device including an approximately planar touch surface operative to input a position signal to a processor of said computer based on a location of user contact on the touch surface. One or more actuators are coupled to the touch input device which can output a force to laterally move the touch input device approximately parallel to its surface to provide a haptic sensation to the user contacting it. The computer can position a cursor in a graphical environment displayed on a display device based on the position signal. The touch input device can be a separate touchpad or included as a touch screen. The user can contact the touch surface with a finger or other object, such as a stylus. Two actuators can move the touch input device in orthogonal directions parallel to the touch surface.

In another embodiment, a haptic feedback touch control for inputting signals to a computer and for outputting forces to a user includes a touch input device including an approximately planar touch surface which inputs a position signal to a computer processor, a surface member located adjacent to the touch input device, where the user can contact the surface when pressing the touch input device, and an actuator coupled to the surface member. The actuator outputs a force on the surface member to provide a haptic sensation to the user. The surface member can be translated laterally, approximately in a plane parallel to the surface of the touch input device; for example, the surface member can be positioned over the touch input device and approximately coextensive with the surface of the touch input device. Or, the surface member can be positioned to a side of the touch input device such that the user touches the touch input device with one finger and touches the surface member with a different finger or palm for example, the surface member can be positioned over a physical button that is located adjacent to said touch input device. Contact or inertial forces can be output on the surface member.

In another aspect, an actuator providing a linear force output includes a ferromagnetic piece including a center pole located between two side poles, a coil wrapped around the center pole, a magnet adjacent to the center pole and side poles, and a backing plate coupled to the magnet, where the backing plate and magnet move with respect to the ferromagnetic piece when current is flowed in the coil. Rollers can be positioned between the ferromagnetic piece and backing plate to allow the motion. A flexure can reduce the relative motion between plate and ferromagnetic piece in undesired directions and provide a spring centering force.

In another aspect, a haptic touch device includes a piezoelectric transducer coupled to a ground and including a metal diaphragm coupled to a ceramic element and a planar sensing element, such as a touchpad. A spacer is provided between the piezoelectric transducer and the planar sensing element, the metal diaphragm contacting the spacer. A spring element provides a spring restoring force to the planar sensing element.

In another aspect, a method for providing haptic feedback to a touch input device includes receiving a position signal from the touch input device indicating a contact location on a surface where said user is pressing, and determining in which of a plurality of regions on the surface the contact location is positioned. Force information is provided to cause an actuator to output a force to the user, the force associated with the user moving an object on or over the surface of the touch input device. A function can be associated with the region in which the contact location is positioned, such as rate control function of a value or moving a displayed cursor. The can be output when the user moves the object over a boundary to the contacted region from a different region of the touch input device.

An embodiment advantageously provides haptic feedback to a planar touch control device of a computer, such as a touchpad or touch screen. The haptic feedback can assist and inform the user of interactions and events within a graphical user interface or other environment and ease cursor targeting tasks. Furthermore, this allows portable computer devices having such touch controls to take advantage of existing haptic feedback enabled software. The haptic touch devices disclosed herein are also inexpensive, compact and consume low power, allowing them to be easily incorporated into a wide variety of portable and desktop computers and electronic devices.

These and other advantages will become apparent to those skilled in the art upon a reading of the following specification and a study of the several figures of the drawing.

DETAILED DESCRIPTION OF EXAMPLE EMBODIMENTS

Figure 1:
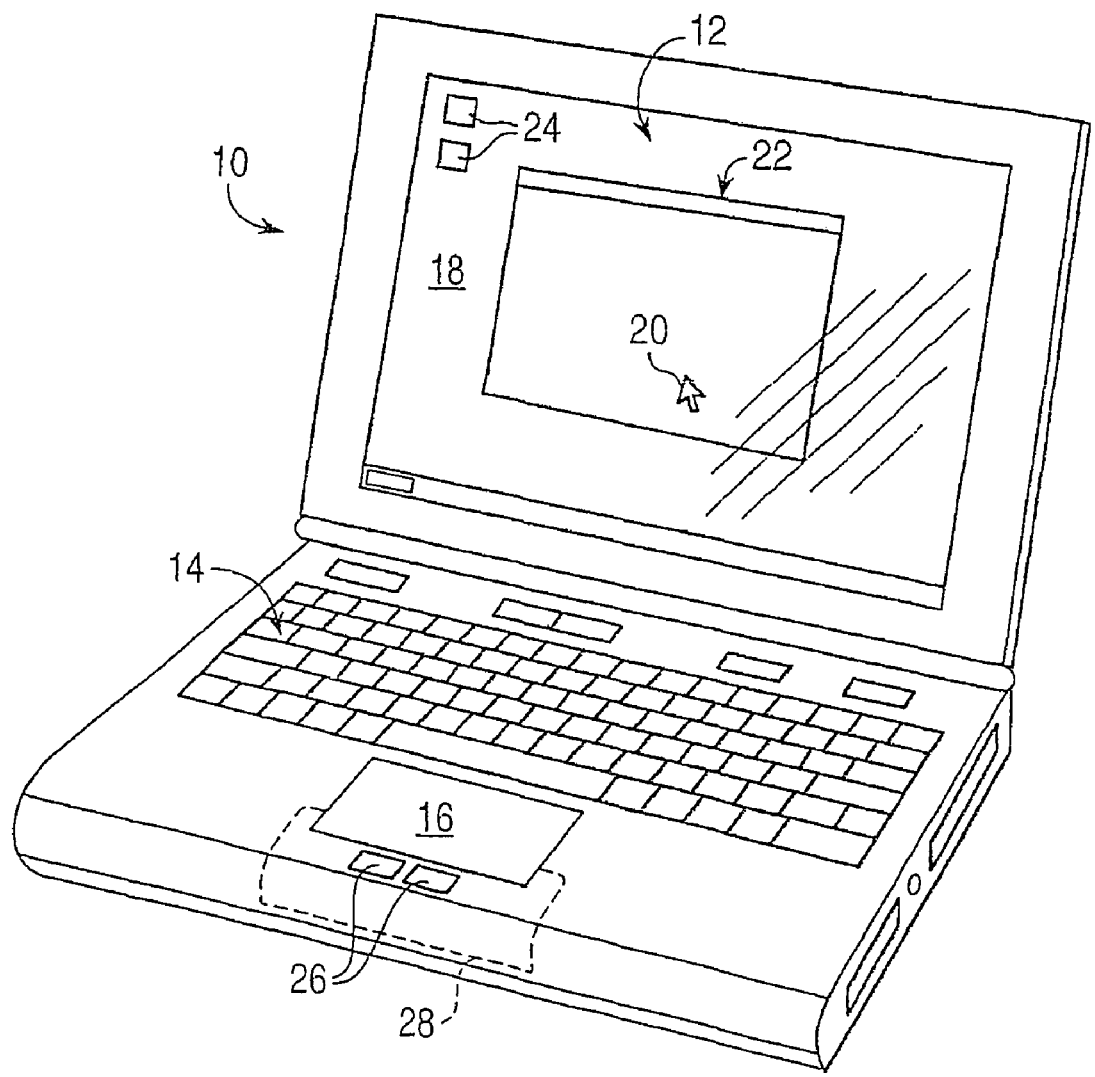
FIG. 1 is a perspective view of a laptop computer device including a haptic touchpad.

FIG. 1 is a perspective view of a portable computer 10 including a haptic touchpad. Computer 10 can be a portable or "laptop" computer that can be carried or otherwise transported by the user and may be powered by batteries or other portable energy source in addition to other more stationary power sources. Computer 10 preferably runs one or more host application programs with which a user is interacting via peripherals.

Computer 10 may include the various input and output devices as shown, including a display device 12 for outputting graphical images to the user, a keyboard 14 for providing character or toggle input from the user to the computer, and a touchpad 16. Display device 12 can be any of a variety of types of display devices; flat-panel displays are most common on portable computers. Display device 12 can display a graphical environment 18 based on application programs and/or operating systems that are running on the CPU of computer 10, such as a graphical user interface (GUI), that can include a cursor 20 that can be moved by user input, as well as windows 22, icons 24, and other graphical objects well known in GUI environments. Other graphical environments or images may also be displayed, e.g. a game, movie or other presentation, spreadsheet or other application program, etc.

Other devices may also be incorporated or coupled to the computer 10, such as storage devices (hard disk drive, DVD-ROM drive, etc.), network server or clients, game controllers, etc. In alternate embodiments, the computer 10 can take a wide variety of forms, including computing devices that rest on a tabletop or other surface, stand-up arcade game machines, other portable devices or devices worn on the person, handled or used with a single hand of the user, etc. For example, host computer 10 can be a video game console, personal computer, workstation, a television "set top box" or a "network computer", or other computing or electronic device.

Touchpad device 16 preferably appears externally to be similar to the touchpads of the prior art. In many embodiments disclosed herein, such a pad 16 includes a planar, rectangular smooth surface that can be positioned below the keyboard 14 on the housing of the computer 10, as shown, or may be positioned at other areas of the housing. When the user operates the computer 10, the user may conveniently place a fingertip or other object on the touchpad 16 and move the fingertip to correspondingly move cursor 20 in the graphical environment 18.

In operation, the touchpad 16 inputs coordinate data to the main microprocessor(s) of the computer 10 based on the sensed location of an object on (or near) the touchpad. As with many touchpads of the prior art, touchpad 16 can be capacitive, resistive, or use a different type of sensing. Some existing touchpad embodiments are disclosed, for example, in U.S. Pat. Nos. 5,521,336 and 5,943,044. Capacitive touchpads typically sense the location of an object on or near the surface of the touchpad based on capacitive coupling between capacitors in the touchpad and the object. Resistive touchpads are typically pressure-sensitive, detecting the pressure of a finger, stylus, or other object against the pad, where the pressure causes conductive layers, traces, switches, etc. in the pad to electrically connect. Some resistive or other types of touchpads can detect the amount of pressure applied by the user and can use the degree of pressure for proportional or variable input to the computer 10. Resistive touchpads typically are at least partially deformable, so that when a pressure is applied to a particular location, the conductors at that location are brought into electrical contact. Such deformability can be useful since it can potentially amplify the magnitude of output forces such as pulses or vibrations on the touchpad. Forces can be amplified if a tuned compliant suspension is provided between an actuator and the object that is moved, as described in provisional application No. 60/157,206. Capacitive touchpads and other types of touchpads that do not require significant contact pressure may be better suited in some embodiments since excessive pressure on the touchpad may in some cases interfere with the motion of the touchpad for haptic feedback. Other types of sensing technologies can also be used in the touchpad. Herein, the term "touchpad" preferably includes the surface of the touchpad 16 as well as any sensing apparatus included in the touchpad unit.

Touchpad 16 can operate similarly to existing touchpads, where the speed of the fingertip on the touchpad correlates to the distance that the cursor is moved in the graphical environment. For example, if the user moves his or her finger quickly across the pad, the cursor is moved a greater distance than if the user moves the fingertip more slowly. If the user's finger reaches the edge of the touchpad before the cursor reaches a desired destination in that direction, then the user can simply move his or her finger off the touchpad, reposition the finger away from the edge, and continue moving the cursor. This is an "indexing" function similar to lifting a mouse off a surface to change the offset between mouse position and cursor. Furthermore, many touchpads can be provided with particular regions that are each assigned to particular functions that can be unrelated to cursor positioning. Such an embodiment is described in greater detail below with respect to FIG. 18. In some embodiments the touchpad 16 may also allow a user to "tap" the touchpad (rapidly touch and remove the object from the pad) in a particular location to provide a command. For example, the user can tap or "double tap" the pad with a finger while the controlled cursor is over an icon to select that icon.

In an embodiment, the touchpad 16 is provided with the ability to output haptic feedback such as tactile sensations to the user who is physically contacting the touchpad 16. Various embodiments detailing the structure of the haptic feedback touchpad are described in greater detail below. Some embodiments may move a device housing or separate moving surface, not the touchpad itself.

Using one or more actuators coupled to the touchpad 16 or an associated surface, a variety of haptic sensations can be output to the user who is contacting the touchpad (or housing or separate surface). For example, jolts, vibrations (varying or constant amplitude), and textures can be output. Forces output to the user can be at least in part based on the location of the finger on the pad or the state of a controlled object in the graphical environment of the host computer 10, and/or independent of finger position or object state. Such forces output to the user are considered "computer-controlled" since a microprocessor or other electronic controller is controlling the magnitude and/or direction of the force output of the actuator(s) using electronic signals.

In other embodiments, the touchpad 16 can be provided in a separate housing that is connected to a port of the computer 10 via a cable or via wireless transmission and which receives force information from and sends position information to the computer 10. For example, Universal Serial Bus (USB), Firewire, or a standard serial bus can connect such a touchpad to the computer 10.

One or more buttons 26 can also be provided on the housing of the computer 10 to be used in conjunction with the touchpad 16. The user's hands have easy access to the buttons, each of which may be pressed by the user to provide a distinct input signal to the host computer 12. Typically, each button 26 corresponds to a similar button found on a mouse input device, so that a left button can be used to select a graphical object (click or double click), a right button can bring up a context menu, etc. In some embodiments, one or more of the buttons 26 can be provided with tactile feedback as described in U.S. Pat. No. 6,184,868 and application Ser. No. 09/467, 309. Other features of these disclosures may also be used.

Furthermore, in some embodiments, one or more moveable portions 28 of the housing of the computer device 10 can be included which is contacted by the user when the user operates the touchpad 16 and which can provide haptic feedback. Having a moveable portion of a housing for haptic feedback is described in U.S. Pat. Nos. 6,184,868 and 6,088, 019. In some embodiments, both the housing can provide haptic feedback (e.g., through the use of an eccentric rotating mass on a motor coupled to the housing) and the touchpad 16 can provide separate haptic feedback. This can allow the host to control two different tactile sensations simultaneously to the user; for example, a vibration of a low frequency can be conveyed through the housing to the user and a higher frequency vibration can be conveyed to the user through the touchpad 16. Each other button or other control provided with haptic feedback can also provide tactile feedback independently from the other controls.

The host, application program(s) and/or operating system preferably displays graphical images of the environment on display device 12. The software and environment running on the host computer 12 may be of a wide variety. For example, the host application program can be a word processor, spreadsheet, movie, video or computer game, drawing program, operating system, graphical user interface, simulation, Web page or browser that implements HTML or VRML instructions, scientific analysis program, virtual reality training program or application, or other application program that utilizes input from the touchpad 16 and outputs force feedback commands to the touchpad 16. For example, many games and other application programs include force feedback functionality and may communicate with the touchpad 16 using a standard protocol/drivers such as I-Force®, FEELit®, or Touchsense™ available from Immersion Corporation of San Jose, Calif.

The touchpad 16 can include circuitry necessary to report control signals to the microprocessor of the host computer 10 and to process command signals from the host's microprocessor. For example, appropriate sensors (and related circuitry) are used to report the position of the user's finger on the touchpad 16. The touchpad device also includes circuitry that receives signals from the host and outputs tactile sensations in accordance with the host signals using one or more actuators. Some touchpads may be integrated with a printed circuit board (PCB) that includes some of these components and circuitry. In some embodiments, a separate, local microprocessor can be provided for the touchpad 16 to both report touchpad sensor data to the host and/or to carry out force commands received from the host, such commands including, for example, the type of haptic sensation and parameters describing the commanded haptic sensation. Alternatively, the touchpad microprocessor can simply pass streamed data from the main processor to the actuators. The term "force information" can include both commands/parameters and/or streamed data. The touchpad microprocessor can implement haptic sensations independently after receiving a host command by controlling the touchpad actuators; or, the host processor can maintain a greater degree of control over the haptic sensations by controlling the actuators more directly. In other embodiments, logic circuitry such as state machines provided for the touchpad 16 can handle haptic sensations as directed by the host main processor. Architectures and control methods that can be used for reading sensor signals and providing haptic feedback, for a device are described in greater detail in U.S. Pat. No. 5,734,373 and copending application Ser. Nos. 09/669,029, 09/565,207, 09/376,649, and 09/687,744.

In existing touchpad, embodiments, such as those manufactured by Synaptics Corp., particular characteristics and features are provided. The standard surface material for a touchpad is textured Mylar, and typically any non-conductive object can be used on the touchpad surface and be detected, though textured surfaces are better when a user's finger is used to point. The touchpad can also sense through thin overlays. There is typically space available for the additional of haptic feedback components; for example, on a 40.times.60 touchpad, over half of the board can be available for haptic circuitry.

Many touchpads include a "palm check" feature, which allows the laptop to sense whether the user is contacting the touchpad with a finger or with a palm or other part of the hand. Since the user may only be resting his or her palm and not be intending to provide input, the palm check feature would ignore input that is determined to be provided by a user's palm. Basically, the palm check feature computes the contact area made by the conductive object (finger, palm, arm, etc.). If the contact area exceeds a certain threshold, the contact is rejected. This feature can be turned off in many embodiments.

Figure 2:
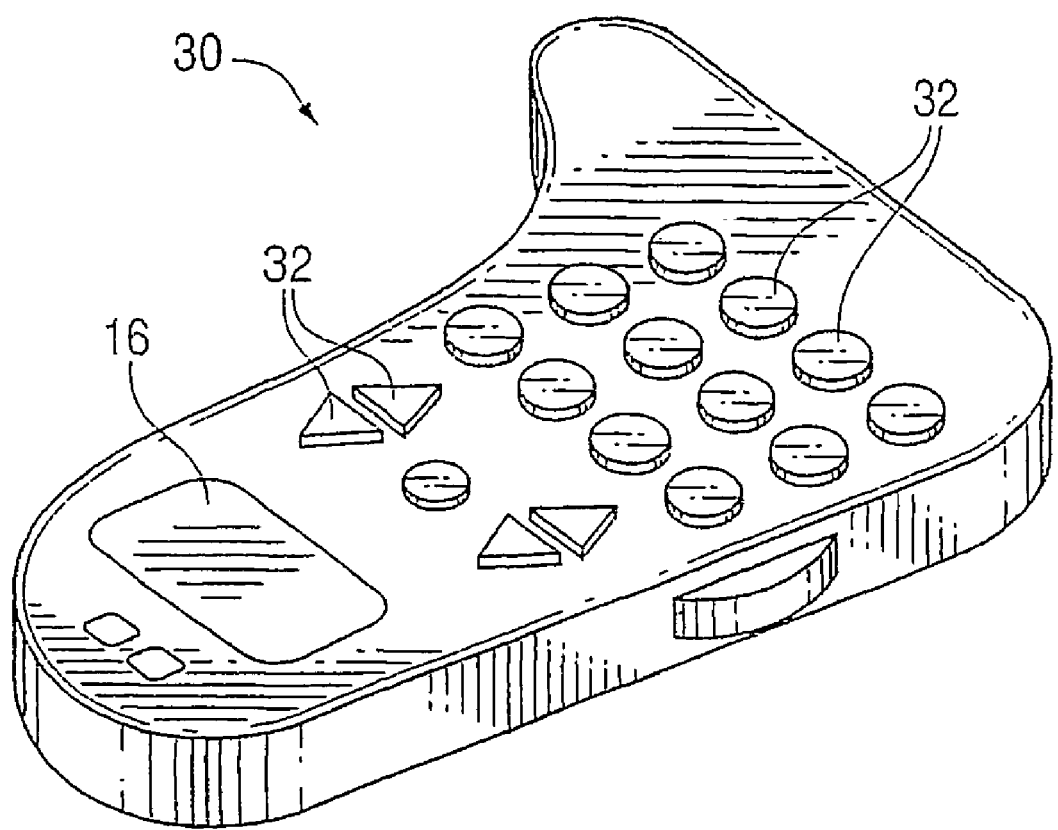
FIG. 2 is a perspective view of a remote control device including a touchpad.

FIG. 2 is a perspective view of another embodiment of a device 30 which can include the active touchpad 16. The device can be a handheld remote control device 30, which the user grasps in one hand and manipulates controls to access the functions of an electronic device or appliance remotely by a user (such as a television, video cassette recorder or DVD player, audio/video receiver, Internet or network computer connected to a television, etc.). For example, several buttons 32 can be included on the remote control device 30 to manipulate functions of the controlled apparatus. A touchpad 16 can also be provided to allow the user to provide more sophisticated directional input. For example, a controlled apparatus may have a selection screen in which a cursor may be moved, and the touchpad 16 can be manipulated to control the cursor in two dimensions. The touchpad 16 includes the ability to output haptic sensations to the user as described herein, based on a controlled value or event. For example, a volume level passing a mid-point or reaching a maximum level can cause a pulse to be output to the touchpad and to the user.

In one application, the controlled apparatus can be a computer system such as Web-TV from Microsoft Corp. or other computing device which displays a graphical user interface and/or web pages accessed over a network such as the Internet. The user can control the direction of the cursor by moving a finger (or other object) on the touchpad 16. The cursor can be used to select and/or manipulate icons, windows, menu items, graphical buttons, slider bars, scroll bars, or other graphical objects in a graphical user interface or desktop interface. The cursor can also be used to select and/or manipulate graphical objects on a web page, such as links, images, buttons, etc. Other force sensations associated with graphical objects are described below with reference to FIG. 18.

Figure 3:
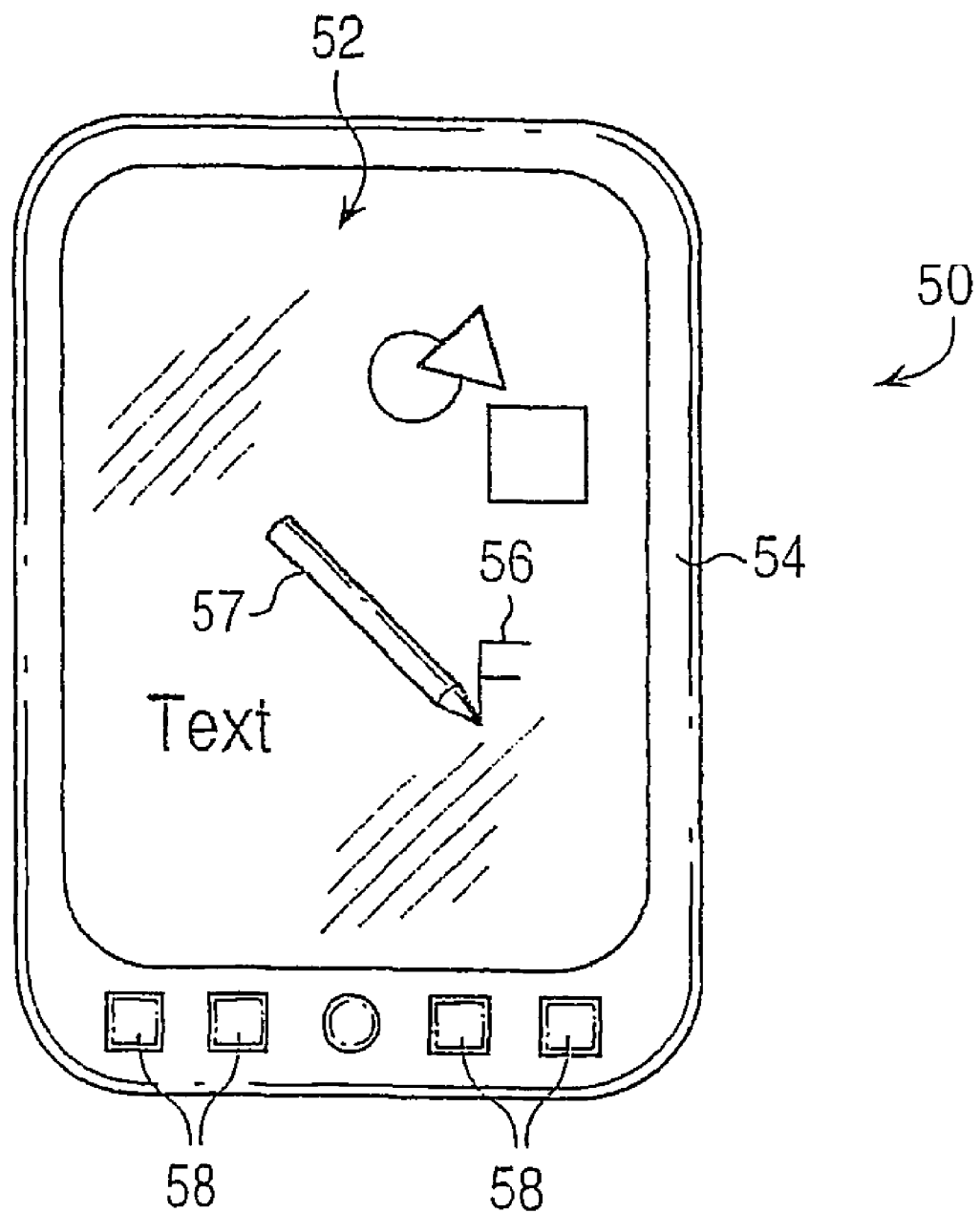
FIG. 3 is a top plan view of a haptic touchscreen embodiment.

FIG. 3 is a top plan view of another computer device embodiment 50 that can include any of the embodiments of haptic devices. Device 50 is in the form of a portable computer device such as "personal digital assistant" (PDA), a "pen-based" computer, "web pad," "electronic book", or similar device (collectively known as a "personal digital assistant" (PDA) herein). Those devices which allow a user to input information by touching a display screen or readout in some fashion are relevant, as well as devices allowing button input. Such devices can include the Palm Pilot from 3Com Corp. or similar products, pocket-sized computer devices from Casio, Hewlett-Packard, or other manufacturers, E-books, cellular phones or pagers having touch screens, laptop computers With touch screens, etc.

In one embodiment of a device 50, a display screen 52 positioned adjacent a housing 54 may cover a large portion of the surface of the computer device 50. Screen 52 is preferably a flat-panel display as is well known to those skilled in the art and can display text, images, animations, etc.; in some embodiments screen 52 is as functional as any personal computer screen. Display screen 52 can be a "touch screen" that includes sensors which allow the user to input information to the computer device 50 by physically contacting the screen 50 (i.e. it is another form of planar "touch device" similar to the touchpad 16 of FIG. 1). For example, a transparent sensor film can be overlaid on the screen 50, where the film can detect pressure from an object contacting the film. The sensor devices for implementing touch screens are well known to those skilled in the art.

The user can select graphically-displayed buttons or other graphical objects by pressing a finger or a stylus to the screen 52 at the exact location where the graphical object is displayed. Furthermore, some embodiments allow the user to "draw" or "write" on the screen by displaying graphical "ink" images 56 at locations where the user has pressed a tip of a stylus, such as stylus 57, or a finger or other object. Handwritten characters can be recognized by software running on the device microprocessor as commands, data, or other input. In other embodiments, the user can provide input additionally or alternatively through voice recognition, where a microphone on the device inputs the user's voice which is translated to appropriate commands or data by software running on the device. Physical buttons 58 can also be included in the housing of the device 50 to provide particular commands to the device 50 when the buttons are pressed. Many PDA's are characterized by the lack of a standard keyboard for character input from the user; rather, an alternative input mode is used, such as using a stylus to draw characters on the screen, voice recognition, etc. However, some PDA's also include a fully-functional keyboard as well as a touch screen, where the keyboard is typically much smaller than a standard-sized keyboard. In yet other embodiments, standard-size laptop computers with standard keyboards may include flat-panel touch-input display screens, and such screens (similar to screen 12 of FIG. 1) can be provided with haptic feedback.

In some embodiments, the touch screen 52 may provide haptic feedback to the user similarly to the touchpad 16 described in previous embodiments. One or more actuators can be coupled to the touchscreen, or movable surfaces near the touchscreen, in a manner similar to the embodiments described below. The user can experience the haptic feedback through a finger or a held object such as a stylus 57 that is contacting the screen 52.

The touch screen 52 can be coupled to the housing 54 of the device 50 by one or more spring or compliant elements, such as helical springs, leaf springs, flexures, or compliant material (foam, rubber, etc.), to allow motion of the screen approximately along the z-axis, thereby providing haptic feedback. The screen can also be provided with flexures or other couplings allowing side-to-side (x and/or y) motion, similar to the appropriate embodiments described below.

Figure 4:
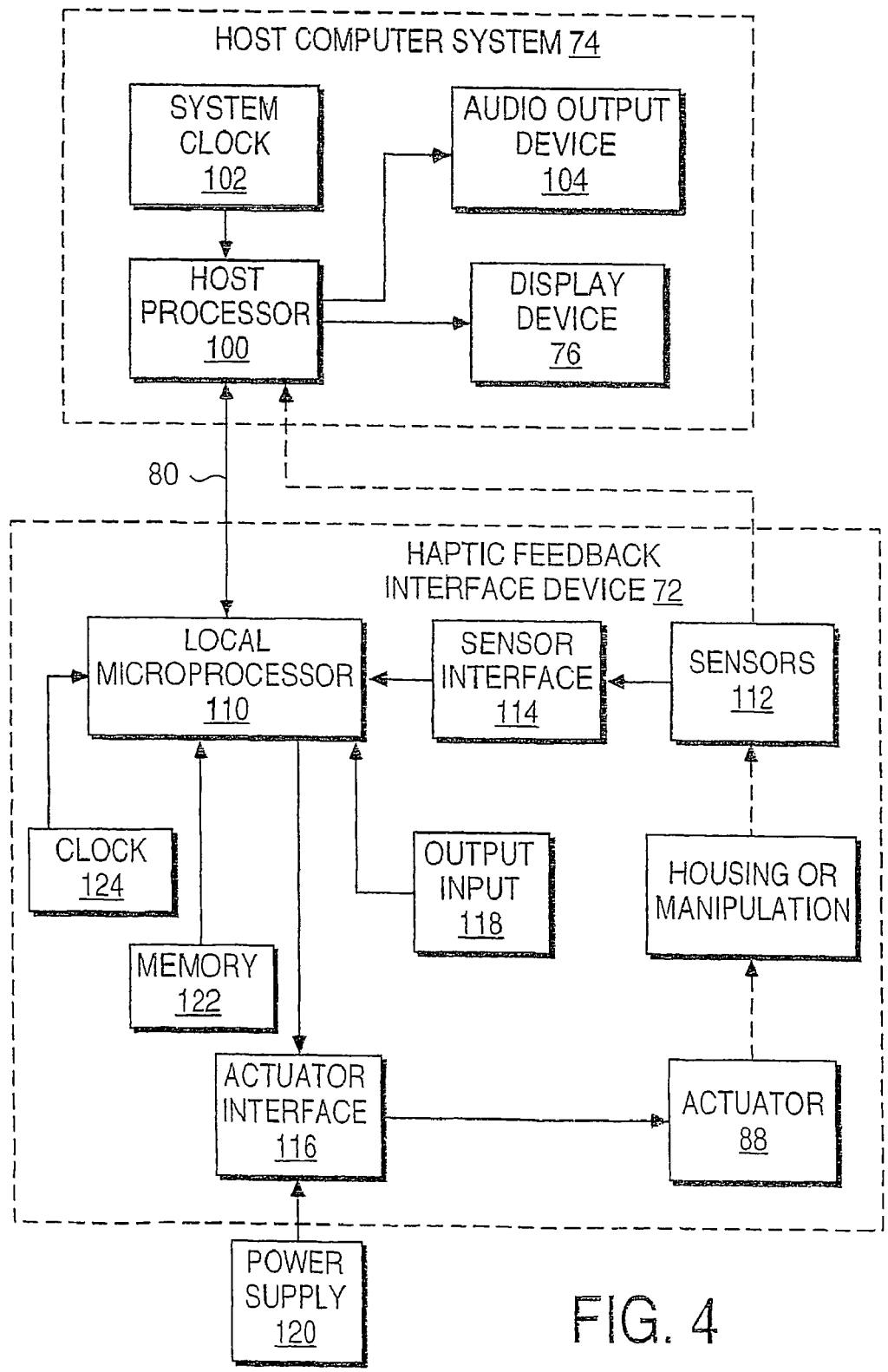
FIG. 4 is a block diagram of a haptic system suitable for use.

FIG. 4 is a block diagram illustrating a haptic feedback system suitable for use with any of the described embodiments. The haptic feedback system includes a host computer system 14 and interface device 12.

Host computer system 14 preferably includes a host microprocessor 100, a clock 102, a display screen 26, and an audio output device 104. The host computer also includes other well known components, such as random access memory (RAM), read-only memory (ROM), and input/output (I/O) electronics (not shown).

As described above, host computer 14 can be a personal computer such as a laptop computer, and may operate under any well-known operating system. Alternatively, host computer system 14 can be one of a variety of home video game console systems commonly connected to a television set or other display, such as systems available from Nintendo, Sega, Sony, or Microsoft. In other embodiments, host computer system 14 can be an appliance, "set top box" or other electronic device to which the user can provide input. Computer 14 can also be a portable, hand-held computer such as a PDA, or can be a vehicle computer, stand-up arcade game, workstation, etc.

Host computer 14 preferably implements a host application program with which a user is interacting via interface device 12 which includes haptic feedback functionality. For example, the host application program can be a video game, word processor or spreadsheet, Web page or browser that implements HTML or VRML instructions, scientific analysis program, movie player, virtual reality training program or application, or other application program that may utilize input of mouse 12 and which outputs haptic feedback commands to the device 12. Herein, for simplicity, operating systems such as Windows™, MS-DOS, MacOS, Unix, Palm OS, etc. are also referred to as "application programs." Herein, computer 14 may be referred as providing a "graphical environment," which can be a graphical user interface, game, simulation, or other visual environment and can include graphical objects such as icons, windows, game objects, etc. Suitable software drivers which interface such software with computer input/output (I/O) devices are available from Immersion Corporation of San Jose, Calif.

Display device 26 can be included in host computer 14 and can be a standard display screen (LCD, CRT, plasma, flat panel, etc.), 3-D goggles, or any other visual output device. Audio output device 104, such as speakers, is preferably coupled to host microprocessor 100 to provide sound output to user. Other types of peripherals can also be coupled to host processor 100, such as storage devices (hard disk drive, CD ROM drive, floppy disk drive, etc.) other input and output devices.

Interface device 12 is coupled to the computer 14 by a bus 20, which communicates signals between device 12 and computer 14 and may also, in some embodiments, provide power to the device 12. In other embodiments, signals can be sent between device 12 and computer 14 by wireless transmission/reception. In some embodiments, the power for the actuator can be supplemented or solely supplied by a power storage device provided on the device, such as a capacitor or one or more batteries. The bus 20 is preferably bidirectional to send signals in either direction between host 14 and device 12. Bus 20 can be a serial interface bus, such as an RS232 serial interface, RS-422, Universal Serial Bus (USB), MIDI, or other protocols well known to those skilled in the art; or a parallel bus or wireless link.

Device 12 may be a separate device from host 14 with its own housing, or may be integrated with the host computer housing, as in the laptop computer of FIG. 1. Device 12 can include or be associated with a dedicated local microprocessor 110. Processor 110 is considered local to device 12, where "local" herein refers to processor 110 being a separate microprocessor from any host processors in host computer system 14. "Local" also may refer to processor 110 being dedicated to haptic feedback and sensor I/O of device, 12. Microprocessor 110 can be provided with software instructions (e.g., firmware) to wait for commands or requests from computer host 14, decode the command or request, and handle/control input and output signals according to the command or request. In addition, processor 110 can operate independently of host computer 14 by reading sensor signals and calculating appropriate forces from those sensor signals, time signals, and stored or relayed instructions selected in accordance with a host command. Suitable microprocessors for use as local microprocessor 110 include lower-end microprocessors as well as more sophisticated force feedback processors such as the Immersion Touchsense Processor. Microprocessor 110 can include one microprocessor chip, multiple processors and/or co-processor chips, and/or digital signal processor (DSP) capability.

Microprocessor 110 can receive signals from sensor 112 and provide signals to actuator 18 in accordance with instructions provided by host computer 14 over bus 20. For example, in a local control embodiment, host computer 14 provides high level supervisory commands to microprocessor 110 over bus 20 (such as a command identifier and one or more parameters characterizing the tactile sensation), and microprocessor 110 decodes the commands and manages low level force control loops to sensors and the actuator in accordance with the high level commands and independently of the host computer 14. This operation is described in greater detail in U.S. Pat. Nos. 5,739,811 and 5,734,373. In the host control loop, force commands are output from the host computer to microprocessor 110 and instruct the microprocessor to output a force or force sensation having specified characteristics. The local microprocessor 110 reports data to the host computer, such as locative data that describes the position of the device in one or more provided degrees of freedom. The data can also describe the states of buttons, switches, etc. The host computer uses the locative data to update executed programs. In the local control loop, actuator signals are provided from the microprocessor 110 to an actuator 18 and sensor signals are provided from the sensor 112 and other input devices 118 to the microprocessor 110. Herein, the term "tactile sensation" refers to either a single force or a sequence of forces output by the actuator 18 which provide a sensation to the user. For example, vibrations, a single jolt, or a texture sensation are all considered tactile sensations. The microprocessor 110 can process inputted sensor signals to determine appropriate output actuator signals by following stored instructions. The microprocessor may use sensor signals in the local determination of forces to be output on the user object, as well as reporting locative data derived from the sensor signals to the host computer.

In yet other embodiments, other hardware instead of microprocessor 110 can be provided locally to device 12 to provide functionality similar to microprocessor 110. For example, a hardware state machine incorporating fixed logic can be used to provide signals to the actuator 18 and receive sensor signals from sensors 112, and to output tactile signals.

In a different, host-controlled embodiment, host computer 14 can provide low-level force commands over bus 20, which are directly transmitted to the actuator 18 via microprocessor 110 or other circuitry if there is no microprocessor 110. Host computer 14 thus directly controls and processes all signals to and from the device 12, e.g. the host computer directly controls the forces output by actuator 18 and directly receives sensor signals from sensor 112 and input devices 118. Other embodiments may employ a "hybrid" organization where some types of forces (e.g. closed loop effects) are controlled purely by the local microprocessor, while other types of effects (e.g., open loop effects) may be controlled by the host.

Local memory 122, such as RAM and/or ROM, is preferably coupled to microprocessor 110 in device 12 to store instructions for microprocessor 110 and store temporary and other data. In addition, a local clock 124 can be coupled to the microprocessor 110 to provide timing data.

Sensors 112 sense the position or motion (e.g. an object on a touchpad) in desired degrees of freedom and provides signals to microprocessor 110 (or host 14) including information representative of the position or motion. Sensors suitable for detecting motion include capacitive or resistive sensors in a touchpad, contact sensors in a touchscreen, etc. Other types of sensors can also be used. Optional sensor interface 114 can be used to convert sensor signals to signals that can be interpreted by the microprocessor 110 and/or host computer system 14.

Actuator(s) 18 transmits forces to the housing, manipulandum, buttons, or other portion of the device 12 in response to signals received from microprocessor 110 and/or host computer 14. Device 12 preferably includes one or more actuators which are operative to produce forces on the device 12 (or a component thereof) and haptic sensations to the user. The actuator(s) are "computer-controlled"; e.g., the force output from the actuators is ultimately controlled by signals originating from a controller such as a microprocessor, ASIC, etc. Many types of actuators can be used, including rotary DC motors, voice coil actuators, moving magnet actuators, E core actuators, pneumatic/hydraulic actuators, solenoids, speaker voice coils, piezoelectric actuators, passive actuators (brakes), etc. Some preferred actuator types are described below. Actuator interface 116 can be optionally connected between actuator 18 and microprocessor 110 to convert signals from microprocessor 110 into signals appropriate to drive actuator 18. Interface 116 can include power amplifiers, switches, digital to analog controllers (DACs), analog to digital controllers (ADCs), and other components, as is well known to those skilled in the art.

In some of the implementations herein, the actuator has the ability to apply short duration force sensation on the housing or manipulandum of the device, or via moving an inertial mass. This short duration force sensation can be described as a "pulse." The "pulse" can be directed substantially along a particular direction in some embodiments. In some embodiments the magnitude of the "pulse" can be controlled; the sense of the "pulse" can be controlled, either positive or negative biased; a "periodic force sensation" can be applied and can have a magnitude and a frequency, e.g. the periodic sensation can be selectable among a sine wave, square wave, saw-toothed-up wave, saw-toothed-down, and triangle wave; an envelope can be applied to the period signal, allowing for variation in magnitude over time. The wave forms can be "streamed" from the host to the device, as described in copending application Ser. No. 09/687,744, or can be conveyed through high level commands that include parameters such as magnitude, frequency, and duration.

Other input devices 118 can be included in device 12 and send input signals to microprocessor 110 or to host 14 when manipulated by the user. Such input devices include buttons, dials, switches, scroll wheels, knobs, or other controls or mechanisms. Power supply 120 can optionally be included in device 12 coupled to actuator interface 116 and/or actuator 18 to provide electrical power to the actuator. Alternatively, power can be drawn from a power supply separate from device 12, or power can be received across bus 20. Also, received power can be stored and regulated by device 12 (and/or host 14) and thus used when needed to drive actuator 18 or used in a supplementary fashion.

The interface device 12 can be any of a variety of types; some embodiments are described further below. The touchpads or touchscreen described herein can be provided on a variety of types of devices, such as gamepads, joysticks, steering wheels, touchpads, spherical controllers, finger pads, knobs, track balls, remote control device, cell phone, personal digital assistant, etc.

Specific Embodiments

The specification presents a variety of embodiments in which haptic feedback is provided to a user of a laptop computer or other portable computing device, and/or to the user of any computing device having a touchpad or similar input device.

Some embodiments are based on displacing the skin of a user's finger when it is in contact with a touchpad. These embodiments deliver high fidelity sensations while offering a good correlation between input and output right at the user's fingertip. Actuator and linkage solutions are described to drive any of the translation embodiments. Other embodiments are based on the stimulation of palm surfaces of the user that are normally in contact with the laptop computer 10. These surfaces can provide haptic sensations based on inertially coupled forces or translation of the palm surfaces. Translations of surfaces in plane with the upper surface of the touchpad or laptop (i.e. in the X and/or Y axes) are as effective at conveying haptic information as vibrations or displacements in the Z axis (those normal to the touchpad or laptop upper surface). This can be important when the volumetric constraints of a laptop are considered.

In many of the embodiments described herein, it is also advantageous that contact of the user is detected by a touch input device. Since haptic feedback need only be output when the user is contacting the touch device, this detection allows haptic feedback to be stopped (actuators "turned off") when no objects are contacting the touch input device. This feature can conserve battery power for portable devices. If a local touch device microprocessor (or similar circuitry) is being used in the computer, such a microprocessor can turn off actuator output when no user contact is sensed, thus alleviating the host processor of additional computational burden until touch is again detected, when the actuator output is resumed.

In many preferred embodiments, haptics are added to a laptop computer or other device in a way that does not force the user to relearn how to control the laptop or force the manufacturer to stretch design and manufacturing too far from existing designs to provide the haptic content. For example, in laptop embodiments, as the user moves his or her finger across the touchpad, a cursor displayed on the laptop screen is correspondingly moved. Haptic effects can be output on the touchpad or other laptop component contacted by the user when the cursor interacts with a graphical object or area, when an event occurs, etc. In other applications, haptic effects can be output when events or interactions occur in a game or other application running on the laptop.

Other embodiments and descriptions of touchpads, devices, applications, and other component is suitable for use are described in copending patent application Ser. No. 09/487,737, filed Jan. 19, 2000. Many types of actuators, sensors, linkages, amplification transmissions, etc. can be used.

A touchpad surface, as manufactured currently, typically is coupled to a printed circuit board (PCB) that includes necessary electronics and standard connections for connecting and operating the touchpad in a laptop. Thus, when forces are applied to the touchpad, they are also applied to the PCB that is often directly coupled to the touchpad, e.g. underneath the touchpad.

The embodiments herein are designed with particular guidelines and characteristics. For example, the particular haptic experiences that feel compelling in a certain embodiment, the location where the tactile content is focused or located physically, the spatial correlation of the haptic feedback with the pointing of the user's finger on the touchpad, e.g. the feedback can be right under the finger, or originate somewhere in the case/housing of the laptop, the required force strength and power for compelling feedback, the way the user interacts with the device and effect on quality and content of the feedback (angle of finger contact, etc), and which actuators and mechanisms that can fit into the laptop form factor/housing are most desirable.

Preferably, existing haptic feedback software and drivers can be used with the embodiments described herein, such as TouchSense software from Immersion Corp. A standardized module, such as a particular touchpad, that works for many different types of products is desirable, such as PDAs, laptops, cell phones, and remote controls.

The focus of these inventive embodiments is primarily on tactile feedback implementations, not kinesthetic force feedback embodiments. As described herein, there are two basic classes of tactile feedback as applied: inertial haptic feedback and moving contact haptic feedback. Inertial feedback is generated using inertially coupled vibrations and is based on moving an inertial mass that is coupled to the housing/user through a compliant flexure, where the mass motions cause inertial vibrations in a surface contacted by the user. Moving contact feedback relates to directly moving a surface or member, with respect to an earth ground, against the user and usually is generated by creating small displacements of the user's skin.

The distinction between inertial and moving contact feedback can be made in terms of the actual mechanism used to provide information to the user. Both inertial and tactile stimulation cause displacement of the hand or finger tissue; the inertial feedback is coupled through some enclosure by the transmissibility of that enclosure and the compliance of whatever holds the enclosure (e.g., a mouse pad plus the user's hand for an inertial feedback mouse). Moving contact feedback refers to a mechanism that is more direct in how it stimulates the user's tissue. Examples would be tactile dots or surfaces that shear the skin of the finger to cause sensation by locally deforming the finger or palm tissue. This distinction is made for the purposes of classifying two types of embodiments described below: inertial and surface translation.

A novel actuator, referred to as Flat-E herein, is described below and can be used in all of the embodiments herein and represents a class of very low profile, power efficient, high performance, planar actuators. A Flat-E actuator can achieve acceptable performance levels and approach the limited volume and form factor required for laptop and other device applications.

Inertial Embodiments

These embodiments move an inertial mass to cause inertial haptic feedback to the user, which is typically transmitted through an enclosure or mechanism such as a housing or other surface. In many cases, inertial mass does not impact any surfaces in its travel, although such impacts can alternatively be used to provide additional haptic effects.

Figure 5:
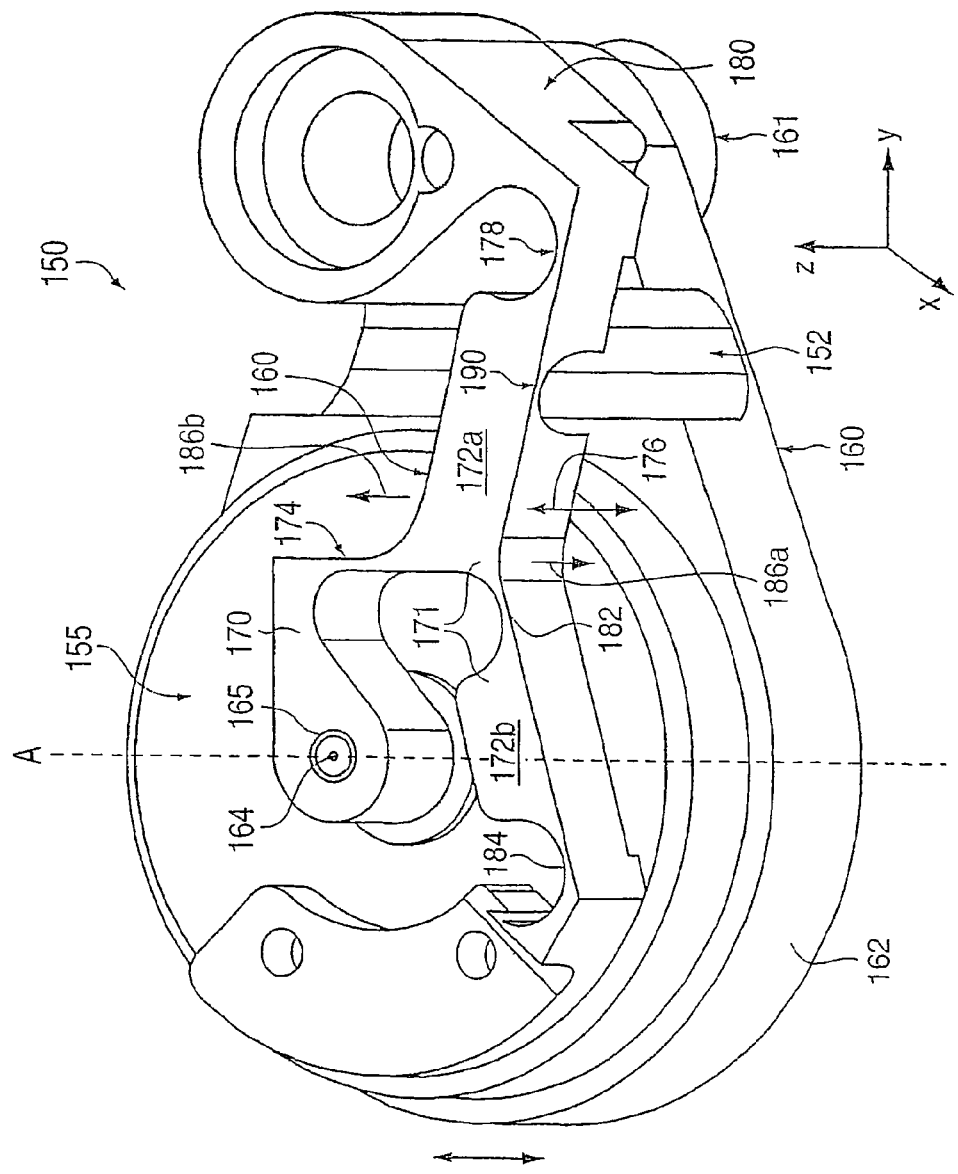
FIG. 5 is a perspective view of one embodiment of an actuator assembly suitable for use in an inertial embodiment.

FIG. 5 is a perspective view of one embodiment 150 of an actuator assembly that can be used to provide inertial haptic sensations for touchpads and housings of devices. Embodiments of an actuator assembly (or "inertial harmonic drive") are described in copending application Ser. No. 09/585,741. Actuator assembly 150 includes a grounded flexure 160 and an actuator 155. The flexure 160 can be a single, unitary piece made of a material such as polypropylene plastic ("living hinge" material) or other flexible material. Flexure 160 can be grounded to the housing of the device 12, for example, at portion 161.

Actuator 155 is coupled to the flexure 160. The housing of the actuator is coupled to a receptacle portion 162 of the flexure 160 which houses the actuator 155 as shown. A rotating shaft 164 of the actuator is coupled to the flexure 160 in a bore 165 of the flexure 160 and is rigidly coupled to a central rotating member 170. The rotating shaft 164 of the actuator is rotated about an axis A which also rotates member 170 about axis A. Rotating member 170 is coupled to a first portion 172a of an angled member 171 by a flex joint 174. The flex joint 174 preferably is made very thin in the dimension it is to flex so that the flex joint 174 will bend when the rotating portion 170 moves the first portion 172a approximately linearly. The first portion 172a is coupled to the grounded portion 180 of the flexure by a flex joint 178 and the first portion 172a is coupled to a second portion 172b of the angled member by flex joint 182. The second portion 172b, in turn, is coupled at its other end to the receptacle portion 162 of the flexure by a flex joint 184.

The angled member 171 that includes first portion 172a and second portion 172b moves linearly along the x-axis as shown by arrow 176. In actuality, the portions 172a and 172b move only approximately linearly. When the flexure is in its origin position (rest position), the portions 172a and 172b are preferably angled as shown with respect to their lengthwise axes. This allows the rotating member 170 to push or pull the angled member 171 along either direction as shown by arrow 176.

The actuator 155 is operated in only a fraction of its rotational range when driving the rotating member 170 in two directions, allowing high bandwidth operation and high frequencies of pulses or vibrations to be output. A flex joint 192 is provided in the flexure portion between the receptacle portion 162 and the grounded portion 180. The flex joint 192 allows the receptacle portion 162 (as well as the actuator 155, rotating member 170, and second portion 172b) to move approximately linearly in the z-axis in response to motion of the portions 172a and 172b. A flex joint 190 is provided in the first portion 172a of the angled member 171 to allow the flexing about flex joint 192 in the z-direction to more easily occur.

By quickly changing the rotation direction of the actuator shaft 164, the actuator/receptacle can be made to oscillate along the z-axis and create a vibration on the housing with the actuator 155 acting as an inertial mass. Preferably, enough space is provided above and below the actuator to allow its range of motion without impacting any surfaces or portions of the housing. In addition, the flex joints included in flexure 160, such as flex joint 192, act as spring members to provide a restoring force toward the origin position (rest position) of the actuator 155 and receptacle portion 172. In some embodiments, the stops can be included in the flexure 160 to limit the motion of the receptacle portion 122 and actuator 110.

Other embodiments can provide other types of actuator assemblies to provide inertial sensations, such as a flexure that moves a separate inertial mass instead of the actuator itself. Or, an eccentric mass coupled to a rotating shaft of an actuator can be oscillated to provide rotational inertial tactile sensations to the housing. The eccentric mass can be unidirectionally driven or bidirectionally driven. Other types of actuator assemblies may also be used, as disclosed in U.S. Pat. No. 6,184,868, such as a linear voice coil actuator, solenoid, moving magnet actuator, etc.

In one embodiment, an actuator assembly such as described above may be coupled to any of various locations of a laptop housing or other device housing and used to vibrate parts of the housing, relying on the transmission of vibrations through the product housing by the remotely mounted actuator module. The actuator assembly can; be attached to different areas of the laptop housing or components to provide inertial haptic feedback when the inertial mass is oscillated.

The experience of the user may vary depending on the precise location of the actuator assembly on the laptop and with different tactile effects that are output. Locations for the coupling of the actuator assembly include the housing bottom, side, or front, a surface engaged by the user's palm when operating the device, an area adjacent to the touchpad or touchscreen, or coupled to the touchpad or touchscreen. An effective location may be the touchpad itself (e.g. coupling the actuator assembly to the bottom of the touchpad). In some embodiments, if the touchpad is rectangular, more compliance may be achieved along the long axis of the touchpad.

In general, haptic content is received by the user over a limited frequency range by attaching the actuator assembly to several locations on the laptop. Some locations or specific surfaces of the laptop or other device may act merely as sounding boards, turning mechanical vibrations into more sound than tactile signal. Performance can depend on the compliance of the surface and actuator mounting. In some embodiments, higher force levels may be required to generate vibrations from the housing that will propagate effectively to the touchpad or touchscreen.

In many cases, the output of several types of haptic effects can be faint and muddy to the user, and effects having predominantly higher frequencies may be more perceptible. One effective tactile effect for this embodiment is a relatively high frequency "ringing" effect. Sympathetic vibrations in the laptop case and the touchpad may amplify these vibrations. An actuator designed to resonate at a certain ideal frequency may be used to present a wide spectrum of frequencies by amplitude modulation techniques. For example, a compelling 25 Hz square wave can be generated by modulating a 250 Hz natural frequency generated by a tuned resonant actuator such as a large piezo ceramic resonator (see FIGS. 8a-8b). Such modulation schemes may rely on the actuator being tuned to the environment it lives in and the object it must drive. Some type of vibration isolation system can be used in some embodiments to keep the energy confined to the haptic module as opposed to allowing the energy to dissipate off into sympathetic modes in other portions of the laptop computer or other device.

Figure 6:
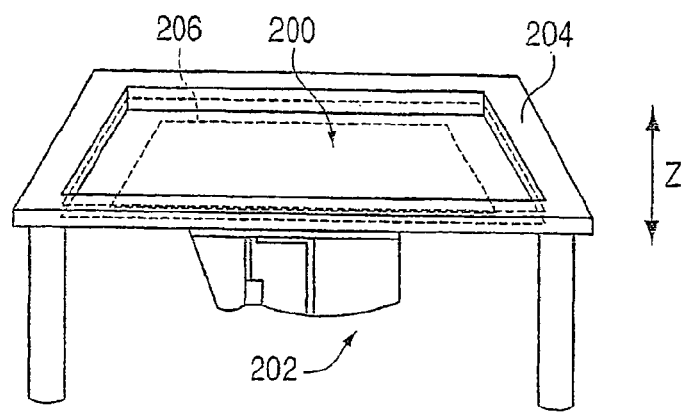
FIG. 6 is a perspective view of the actuator assembly of FIG. 5 coupled to a touchpad.

FIG. 6 is a perspective view of another embodiment, in which a touchpad module can be suspended in a compliant support structure and can be coupled to a harmonic source and vibrated along the Z-axis. In this example, the touchpad 200 can be moved with an actuator assembly 202 that moves the touchpad surface in the Z-axis, perpendicular to the surface of the touchpad. The touchpad can be coupled to the laptop housing 204 by one or more layers or supports of foam, rubber, or other compliant material, where a strip 206 of foam provided around the perimeter of the touchpad between the touchpad 200 and the housing 204 as shown in FIG. 6. The actuator assembly 202 can be coupled to the bottom of the touchpad assembly (or to another location) so that when the inertial mass is oscillated, the oscillations transfer to the touchpad and allow it move in the Z-direction with respect to the laptop housing 204. For example, the actuator assembly can be bonded directly to the bottom of the touchpad PCB. A floating assembly of a touchpad and a bezel (surface surrounding the touchpad) can alternatively be moved, as opposed to just moving the touchpad module in the Z-axis.

In another embodiment, a stand-alone touchpad device can be used, where the touchpad is housed in a separate housing and communicates with the laptop or other device via wires or transmissions. In one embodiment, the stand-alone touchpad device can be attached to a palm pad (or other member), with the actuator assembly coupled to the pad. When the inertial mass of the actuator assembly is oscillated, the inertial sensations are transmitted through the member to the touchpad, i.e. this effectively provides inertial coupling from the actuator assembly to the touchpad surface. A foam layer (or other compliant layer) can be coupled between the pad and ground to provide compliance and allow the pad and touchpad to move inertially. This embodiment may feel more compelling than the embodiments in which the actuator assembly is mounted to the laptop near or on the built-in touchpad, possibly due to the compliance of the foam which can allow stronger sensations to be output.

The entire touchpad can be provided with haptic sensations as a single unitary member; or, in other embodiments, individually-moving portions of the pad can each be provided with its own haptic feedback actuator and related transmissions so that haptic sensations can be provided for only a particular portion. For example, some embodiments may include a touchpad having different portions that may be flexed or otherwise moved with respect to other portions of the touchpad.

Figure 7:
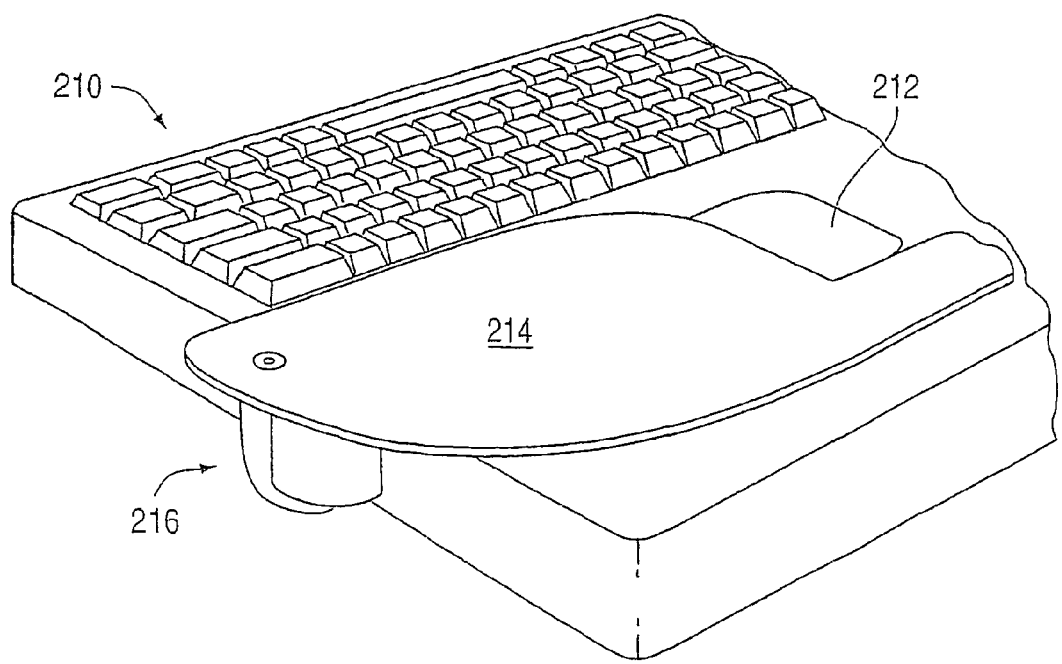
FIG. 7 is a perspective view of a separate palm surface providing inertial tactile sensations adjacent to a touchpad.

In another embodiment, the surface around or adjacent to the touchpad is coupled to harmonic vibration source (e.g., actuator assembly) and vibrates in one or more axes. For example, palm rest surfaces may be driven by an inertial actuator assembly housed in the laptop. FIG. 7 is a perspective view of one example of an inertially-driven palm rest surface. A laptop computer 210 includes a touchpad 212 that functions like a typical touchpad. A palm rest surface 214, is positioned adjacent to the touchpad 212, where the surface 214 can be attached to the laptop housing on a layer of resilient open cell foam or other compliant material. In some embodiments, the surface 214 can be textured with divots and/or bumps to allow a stronger contact by the user to the surface. An actuator assembly 216 is coupled to the palm rest surface 214; in the embodiment shown, the assembly 216 is coupled to the underside of the surface 214. The assembly can be any of the actuator assemblies described above. For example, the actuator assembly 216 can provide z-axis oscillations to the palm rest surface 214.

The user preferably rests a palm and/or some fingers on the palm rest surface 214 while the user is using the touchpad 212 with a pointing finger(s). Thus, the user is able to feel haptic sensations through the palm rest surface while operating the touchpad. Alternatively, one hand of the user is used to point and operate the touchpad, while the other hand rests on the palm surface 214 and senses haptic feedback. The palm surfaces are implemented as practically unavoidable contact surfaces and consequently a user is not likely to miss very many haptic events while using the touchpad. In some embodiments, how hard the user rests the palms on the surface can make a slight difference in perceived magnitude over the useful bandwidth; and may be a result of stiffness and mass of the particular device used. The stiffness of the coupling of the palm surface with the housing can be adjusted for a particular feel in different embodiments.

In a related embodiment, the actuator assembly can be mounted in different areas. For example, the actuator assembly can be attached to the bottom of an extension of a palm rest surface made of textured material mounted on a layer of resilient open cell foam or other compliant material.

In other embodiments, the palm surface can be translated in the X and/or Y directions, similarly to the touchpad translation described below. The inertial actuator assembly could be used to force the translation, or a different type of actuator, e.g. high actuator authority and fairly high stiffness in the translation mode to avoid unintentional hard stop limiting distortion, etc. The translating palm surface can be suitable for a flat actuator so that the assembly can be integrated into the laptop housing; flat actuators are described below.

Figure 8A:
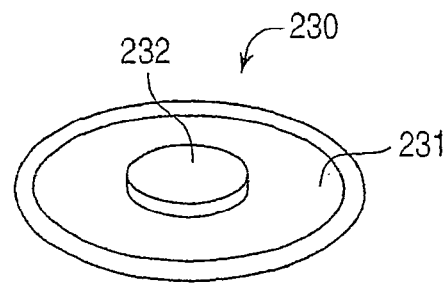
FIG. 8a is a perspective view of a piezoelectric transducer suitable for use in providing inertial sensations.

FIG. 8a is a perspective view of an actuator that can be used in another embodiment of an inertial haptic feedback device. In this embodiment, a higher frequency mechanical oscillator, mechanically coupled to the touchpad, is modulated. One example of such an implementation may include a large-diameter commercially available thin piezoelectric transducer 230, e.g., 60 mm in diameter with natural frequencies of 300 to 400 Hz when supported peripherally. The piezoelectric transducer preferably includes a thin diaphragm (sheet) of metal 231. One embodiment may include an added mass 232 at the ceramic center of the piezo diaphragm in order to add inertial mass and lower the natural frequency to achieve stronger inertial tactile sensations from the oscillating mass. The outer periphery of transducer 230 can be grounded and the mass 232 can oscillate normal to the disc surface to create inertial haptic sensations to the housing to which the transducer is attached.

Actuator 230 can function as a harmonic oscillator that runs at a relatively high frequency that transmits sensations to the hand or part of the laptop to which it is attached. Amplitude modulation (envelope control) may be used to produce a wider haptic spectrum than the single fundamental drum mode. Large diameter piezo drivers are available, for example, from Kingstate of Taiwan. Differently sized discs can also be used.

To provide the desired haptic sensations, a large piezo buzzer should provide large sustainable displacements (accelerations) of the mass and the carrier frequency (the frequency at which it oscillates) should be modulated with the haptic signal. Some electronics may be needed to operate this type of actuator. A high voltage supply can be generated from 5 volts. An oscillation circuit, e.g., self exciting, can drive the element. There can be a gating feature to start and stop the oscillation as well as a proportional control to allow modulation of the amplitude of the output. An all-digital implementation may be provided by gating the oscillator on and off.

Figure 8B:
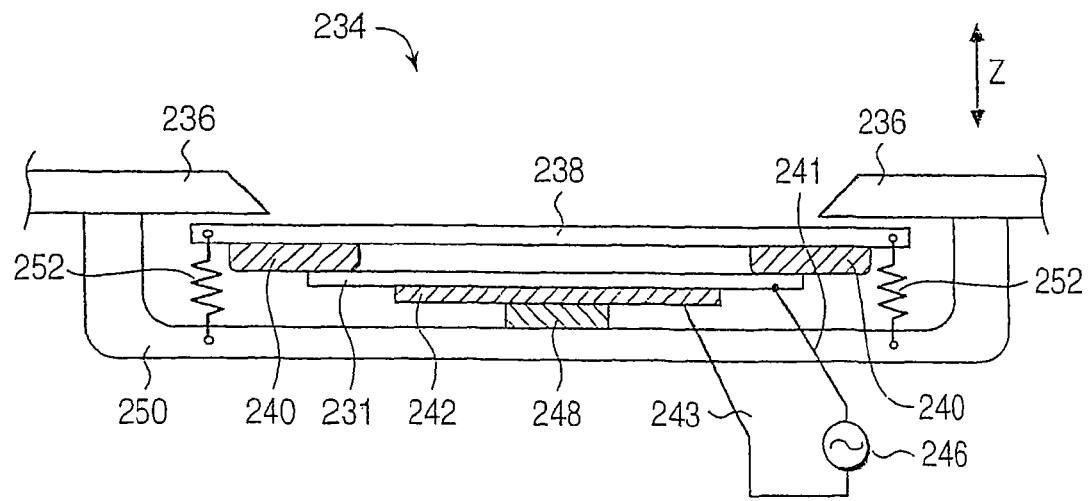
FIG. 8b is a side elevational view of a piezoelectric transducer and structure for providing haptic sensations with a touch device.

FIG. 8b is a side elevational view of another embodiment 234 of a piezoelectric transducer providing haptic feedback, where the transducer applies (non-inertial) vibrations directly to the touchpad (or touchscreen) along the z-axis (also see parent application Ser. No. 09/487,737). A housing 236 of the laptop can include bezels which overlay a touchpad member 238, which the user physically contacts to provide input to a computer. The touchpad member 238 can include the required electronics to interface the touchpad with other electronic components. The touchpad member 238 can rest on a spacer 240 having a particular mass chosen to allow efficient haptic output. The spacer 240 rests on the edge of a piezo metal diaphragm 231, which is part of the piezo transducer, and where an electrical lead 241 is coupled between the diaphragm 231 and a signal source 246. The piezo ceramic element 242, also part of the piezo transducer, is coupled to the metal diaphragm 231 and an electrical lead 243 is coupled between the element 242 and the signal source 246. A conductive electrode is plated on the ceramic element 242. A contact pad 248 is positioned between the element 242 and a bottom housing 250, where the contact pad is rigidly coupled to both ceramic element 242 and housing 250. The contact pad 248 is made small so that the diaphragm 231 will have increased bending, resulting in greater acceleration and stronger haptic effects. The bottom housing 250 can include a printed circuit board (PCB), for example. One or more pre-loaded spring elements 252 couple the touchpad member 238 to the bottom housing 250, e.g. leaf springs, helical springs, etc.

In operation, the piezo transducer moves along the z-axis when an oscillating current from signal source 246 is flowed through the diaphragm 231 and the ceramic element 242. Thus, spacer 240 is provided only at the edges of the diaphragm 231 to allow the inner portion of the diaphragm and the ceramic element 242 to move, and the ceramic element pushes against the bottom housing 250, causing the diaphragm 231 to push against the spacer 240, which in turn pushes against the touchpad element 238. This pushes the touchpad element up, and the spring elements 252 provide a spring return force on the touchpad so that it will return to its neutral position. When the piezo transducer similarly moves in the opposite direction, as directed by the oscillating signal, this moves the touchpad element 238 down toward the bottom housing 250. The touchpad element thus oscillates along the z-axis and provides haptic sensations to the user contacting the touchpad element.

In some embodiments, the components of the touchpad embodiment 234 can be chosen to provide more effective haptic sensations. For example, if the piezo transducer oscillates at close to a natural frequency of the mechanical system (including the transducer itself), then stronger forces and more effective haptic sensations can be output. The natural frequency of this moving mechanical system can be approximately expressed as the square root of the expression k1 plus k2 divided by m, as shown below:

$$f_n \approx \sqrt{(k1+k2/m)}$$

where fn is the natural frequency, k1 is the spring constant of the metal diaphragm 231 of the piezo transducer, k2 is the spring constant of the spring elements 252, and m is the total mass of the spacer 240, the touchpad 238, and the parts of the suspension attached to the touchpad. This mass, as well as the spring constants, can be selected to provide a desirable low natural frequency, such as about 120 Hz or less, which tends to cause effective haptic sensations. The spacer 240 can allow multiple piezo transducers, e.g. positioned side by side, to be positioned against the bottom housing 250, so that the multiple transducers can be driven in unison for stronger haptic effects or at different times to provide sensations at particular locations of the touchpad element 238.

One way to provide the drive signal is to provide an initial oscillating carrier signal at or near the natural frequency fn, modulate the carrier signal with an effect envelope, if applicable (e.g. shape the amplitude to a desired configuration to provide a desired frequency or effect), and drive an amplifier with the modulated signal, which in turn drives the piezo transducer. A sine wave carrier signal, as opposed to square wave or other types, used in such an embodiment tends to produce quieter haptic effects in the described embodiment of FIG. 8b, which is often more desirable. Some ways of producing lower frequencies with a high frequency oscillation are described in copending patent application Ser. No. 09/908,184, filed Jul. 17, 2001, entitled, "Providing Enhanced Haptic Feedback Effects."

In an alternate embodiment, the piezoelectric transducer and spacer can be reversed in orientation so that the spacer 240 contacts the bottom housing 250, the diaphragm 231 rests on the spacer 240, the ceramic element 242 is positioned above the diaphragm, and the ceramic element directly impacts the touchpad element 238 or a pad coupled to the touchpad member when it is oscillated by the driving signal. In yet other embodiments, the ceramic element can be directly coupled to the touchpad element, but in general less strong and effective haptic effects are the result.

Surface Translation Embodiments

These embodiments translate a surface that is in contact with the user to provide haptic feedback to the user. The user feels the translating surface in shear with his or her skin, creating an immediate sensation. This type of haptic feedback is based on either surface motion in-plane without interactions with fixed surfaces or relative motion between adjacent surfaces that are in contact with the users finger or hand. Both translation of a surface in contact with or adjacent to the touchpad module surface (FIGS. 9-12), as well as displacement of the touchpad surface itself (FIGS. 13-14) are embodiments described below, as well as actuators that may be used for either application (FIGS. 15-17). Moving-surface embodiments described in U.S. Pat. No. 5,184,868 can also be applied.

Small (<1 mm) displacements between adjacent surfaces provide good signal transmission into finger tissue. Enhanced surfaces may have a physical surface texture (bumps, roughness, etc.) and will be shaped to engage the user for any position or orientation. The advantage of this approach is that it is easy to feel the forces over a wide range of physical orientations and finger positions in many embodiments, small lateral translations (displacements under the finger tip between 0.25 mm to 0.5 mm) are often more effective than remote inertial vibrations or even out-of-plane (z-axis) vibrations right under the touchpad, e.g., inertial coupling can have a more remote and disconnected feeling in some embodiments. Translating a surface above a touchpad or the touchpad itself typically requires less volume and consumes less power than moving the same touchpad surface in the Z axis, since a large mass is not being accelerated for surface translation. Surface translation approaches are often less sensitive to the orientation or manner in which the user's finger approaches the touchpad, as well.

Separate Surface Translation

Displacing a separate surface member positioned on top of a touchpad module is very effective at providing well-correlated feedback. The feedback feels sufficiently synchronized that clear surfaces may be translated above visual displays, as in PDAs or touch screens. Translation of other surfaces to the side or otherwise adjacent to the touchpad can also be performed in other embodiments.

Figure 9:
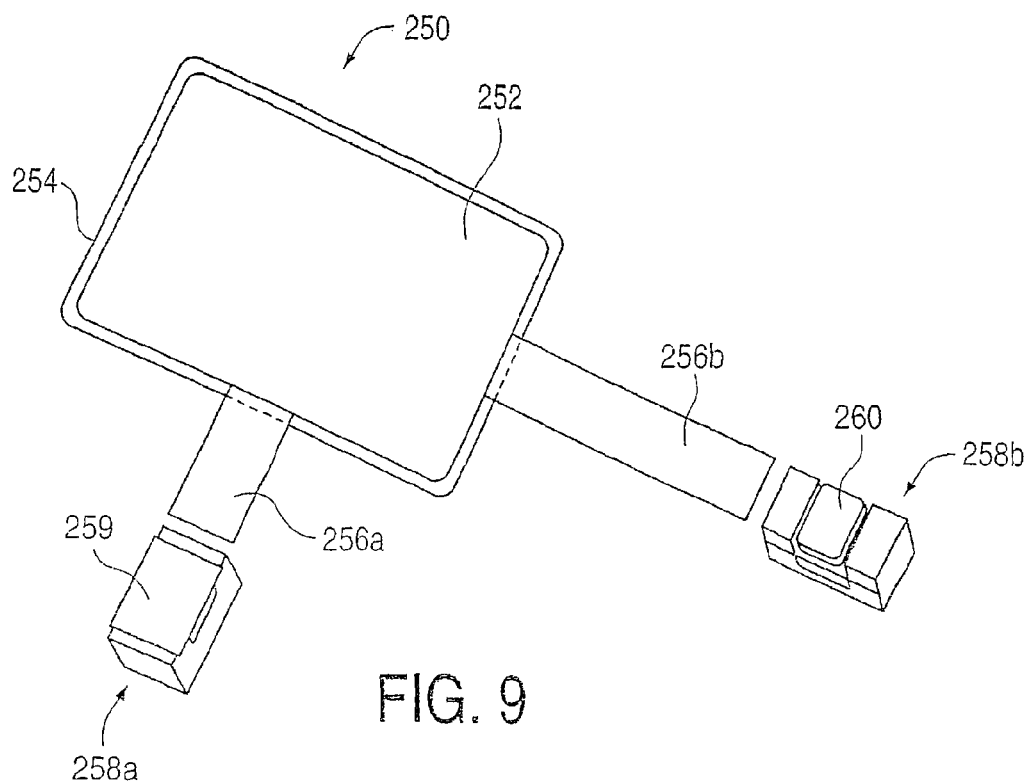
FIG. 9 is a perspective view of one embodiment of a translating surface member driven by linear actuators.

FIG. 9 is a perspective view of a first separate surface translation embodiment 250 in which a separate thin surface that is in sliding contact with the touchpad module is moved laterally under the finger. A translating surface member ("surface") 252 is positioned on top of and covering the fixed touchpad 254. Extension members 256a and 256b which are coupled to the translating surface 252 can be extended approximately perpendicularly in the x- and y-directions away from the touchpad 254. An actuator 258a and 258b can be coupled to each associated extension member 256a and 256b, respectively. In the described embodiment, the actuators 258 are linear actuators outputting a linear force on the associated extension member 256, thereby moving the translating surface in the direction of the output force. For example, the actuators can be "E" core actuators similar to those described in application Ser. No. 09/608,130. The two pole magnet 259 is not shown on the actuator 258b to reveal the coil 260 under the ferromagnetic piece 382.

The sliding surface 252 can be any of a variety of stiff or substantially stiff materials; for example, Kapton (polyamid) flexible printed circuit board material can be used. The extension members 256 can incorporate a stiffener section to prevent buckling. The sliding surface 252 can be a textured surface that provides a friction force to engage the user skin tissue in contact with the surface. A region on the top of the moving surface 252 can include the texture having sufficient surface roughness to provide purchase on the skin without feeling rough to touch. On the underside of the moving surface, a low friction coating can be included to promote sliding between surface 252 and touchpad 254. This underside component can be very thin, for example, less than 0.010 inches (0.25 mm) thick.

The user points to and contacts the moving surface 252 just as if it were the touchpad 254 itself The surface 252 is made thin enough so that the touchpad 254 can detect all the contact of the user to the surface 252 as if the user were touching the location of the touchpad directly underneath the location touched on the surface 252.

In some embodiments, the actuators can be located relatively far from the moving surface (e.g., >10 cm) and in these cases the stiffer extension members 256 may need to transmit tension and compression with as little friction or out-of-plane movement as possible. Fiber laminations of glass or carbon can perform this function, for example.

In some moving magnet actuator embodiments, thin rare earth magnetic pieces can be laminated to the moving surface 252 to act as the moving magnets. A high level of integration can be achieved, for example, if the moving magnet pieces are on the order of <1 mm in thickness and the "E" core and coil are located below the distal segments of the extensions 256, e.g., mounted directly to the touchpad PCB itself. The coil wires can be soldered directly to the touchpad PCB.

Figure 10:
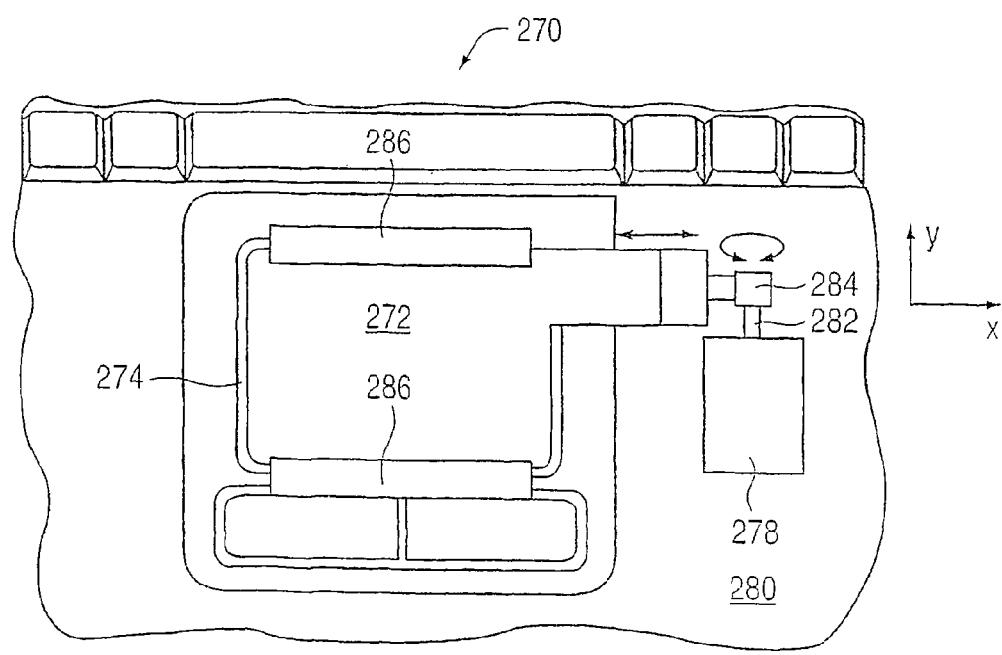
FIG. 10 is a top plan view of another embodiment of a translating surface member driven by a rotary actuator.

FIG. 10 is a top plan view of another translating surface embodiment 270 in which a separate moving tactile surface is positioned above, and in sliding contact with, the touchpad. This surface is translated relative to the touchpad by a high bandwidth actuator through a high fidelity mechanical linkage.

In this embodiment, a translating surface 272 is positioned over a touchpad 274, similar to the embodiment of FIG. 9. An extension member 276 can protrude in a direction (x-direction here) towards a rotary actuator 278, which is this example is grounded to the laptop housing 280. The actuator 278 can be a DC rotary motor having a rotatable shaft 282 that is coupled to a coupling linkage 284 that is in turn coupled to the extension member 276. For example, a portion of the linkage from the actuator assembly 150 described above can be used. When the actuator 278 rotates the shaft 282 in either direction, the linkage converts the rotation to surface 272 translation in a corresponding direction (left or right). For example, a displacement of about +/−1 mm can be achieved. The user feels the surface translation when moving a finger over the surface 272. Motor rotation can result in very clean high fidelity translation in the X axis. A DC motor design may work in a laptop given spare volume out at the sides or locations in the front of the enclosure or housing. A similar extension, linkage and motor can be provided in the y-direction to move the surface 272 in that direction. The input of the user is detected on the touchpad through the moving tactile surface.

The thin surface can be trimmed to fit inside the touchpad area with a small border all around. A rectangular extension can be cut out of a larger lamination to provide a fairly rigid strip that is driven with an actuator. This strip should be wide enough to allow the actuator to push on it in operation without the strip buckling.

As in the embodiment of FIG. 9, a smooth surface can be provided on the underside of surface 272 that contacts the touchpad to provide a smooth low-friction sliding interface with the touchpad plastic covering that the user's finger normally touches. The top side of the moving surface 272 can be made frictional to allow a good user grip, e.g. a texture like fine sandpaper. This can provide an excellent contact surface because it provides some mechanical bonding with the finger surface, but is not rough enough to feel rough to touch. Other embodiments can use a variety of types of friction surfaces. Other embodiments may also use flatter actuators, such as moving magnet actuators or voice coil actuators.

Two strips 286 of plastic or other material can be attached to the bezel surrounding the touchpad (i.e: the rim of the housing opening for the touchpad) and covering the edges of the surface 272 in order to constrain the moving surface 272 and keep it flat against and parallel to the touchpad 274.

The embodiments of FIGS. 9 and 10 can provide compelling haptic sensations. Adding a surface above the touchpad does not substantially interfere with the sensor operation of the touchpad. A user can concurrently point and receive haptic feedback through motion of this surface relative to the fixed touchpad. The perceived correlation of the imparted feedback with movement is good. It is simple for the user to point and navigate a cursor or other object (i.e., provide input to the laptop or other electronic device) when touching and moving a finger over the translation surface above the touchpad. In some embodiments, the moving surface can be held above, not in close contact with, the touchpad and so some compression by the user may be required to take the free play out and come into proximity with the sensor array.

When moving a cursor over displayed scroll bars and around on the desktop GUI displayed by the laptop, the user feels distinct, high fidelity effects that are well correlated spatially with the cursor. The character of the correlation may be different depending on whether the user moves a finger or object in the x- or the y-axis. The actuator in the shown embodiment 270 moves the surface 272 in the x-axis. Consequently, moving the cursor up and down over icons, the user may feel pops or similar tactile effects as unidirectional if the user does not concentrate on or observe that the motion of the surface 272 is perpendicular to the cursor motion.

Motion of the user's finger in the translated direction—the x-axis in the example of FIG. 10—tends to be more compelling. For example, as the user drags a finger in the x-direction to move a cursor from one displayed radio button to the next, the surface 272 may lead the user into the next button and can feel like a detent even though very small motions of the surface are being generated. A surface translation force opposing the direction of motion can be effective, e.g. if the user is moving left onto an icon, a translation force directed to the right feels crisp and natural. If haptic feedback is allowed in only one axis, the y-axis may be a better choice in some embodiments because there may be more vertically-oriented content on a GUI desktop and in applications.

A short, distinct pulse can provide excellent transitions when moving the cursor from one object to another, such as between graphical buttons. Vibrations can be conveyed to the user in surface translation embodiments by oscillating the actuator driving the surface, e.g. with a sine or other periodic wave, and thereby oscillating the translating surface in opposite directions.

The user also may naturally tend to take his or her finger off of the touchpad between motions that control the cursor, and an inherent spring centering of the motor and linkage can return the moving surface 252 or 272 to a neutral (origin) position, ready for the next interaction. The controlled cursor is not moved while the feedback apparatus has moved back to the neutral origin position, since only the surface above the touchpad moves and does not provide input to the computer through the touchpad like a user's finger. This subtlety is more readily provided in this embodiment than if the touchpad surface itself were translated, as in other embodiments described herein.

Motion in a particular direction allows the surface translation embodiments to act in some embodiments as a relative pointing device with local pseudo-kinesthetic feedback. Tactile feedback is still the primary type of haptic feedback provided in such an embodiment, but the small displacements of the surface can be dramatically perceived as directed spring forces acting in such a way that they feel like detent "slopes" that force the user's finger in a direction, even though they are just pops.

The overall stiffness of the actuator can affect results. If the user presses too strongly on the moving surface, then the user may move the surface while dragging/pointing the finger and this can run the actuator out of its spring center. A preferred embodiment has a forceful but stiff actuator, one that the user can barely back-drive by pressing strongly.

Having particular amount of travel or compliance on the moving surface, e.g. about 2 mm, is desirable in some embodiments. There is a strong spring centering from the motor and linkage, and moving the cursor between two objects, such as buttons in a GUI, can be very realistic because the user may perceive true kinesthetic force feedback until finger pressure is decreased and the finger is moved quickly across the screen in a relative mode. The haptic effects which are output are simple tactile pops, and no actual kinesthetic springs are providing force in the X or Y directions. However, the user senses that his or her finger is being pulled into an adjacent object, e.g. the next button.

It should be noted that kinesthetic force feedback is possible in a different embodiment. For example, if the user keeps his or her finger in one place on the moving surface, and the moving surface has a large enough displacement, forces can be output in the degrees of freedom of motion of the moving surface, providing kinesthetic force feedback. The sensor of the touchpad can be used as the sensor indicating the position of the finger/moving surface for computation of the force, such as a spring force having a magnitude dependent on the distance that is moved from an origin of the spring. Thus, such an embodiment would be a dual mode haptic system, including both tactile and kinesthetic modes.

Some embodiments of the moving surface may allow sliding by the user, while others may be very stiff with little sliding. In many embodiments, if the maximum permitted movement of the surface is enough to allow traversal between two adjacent graphical targets, then the kinesthetic mode can be effective and user may not notice that he or she is moving the surface—it feels natural. Some embodiments can provide translation and forces in two axes (X and Y), allowing this kinesthetic directed feedback (real springs) in all directions of the touchpad.

Haptic effects may not feel the same if the user is not moving his or her finger or object on the touchpad. There is often content and value in the correspondence of touchpad motion with the haptic effect (e.g., a detent pop effect). For example, it is effective when the user finger is moving and receiving the pop effect when the finger translates the moving surface to the transition point between the icons or buttons.

Many of the advantages described above for separate translating surfaces are also applicable to translating the touchpad surface, described in detail below.

Figure 11:
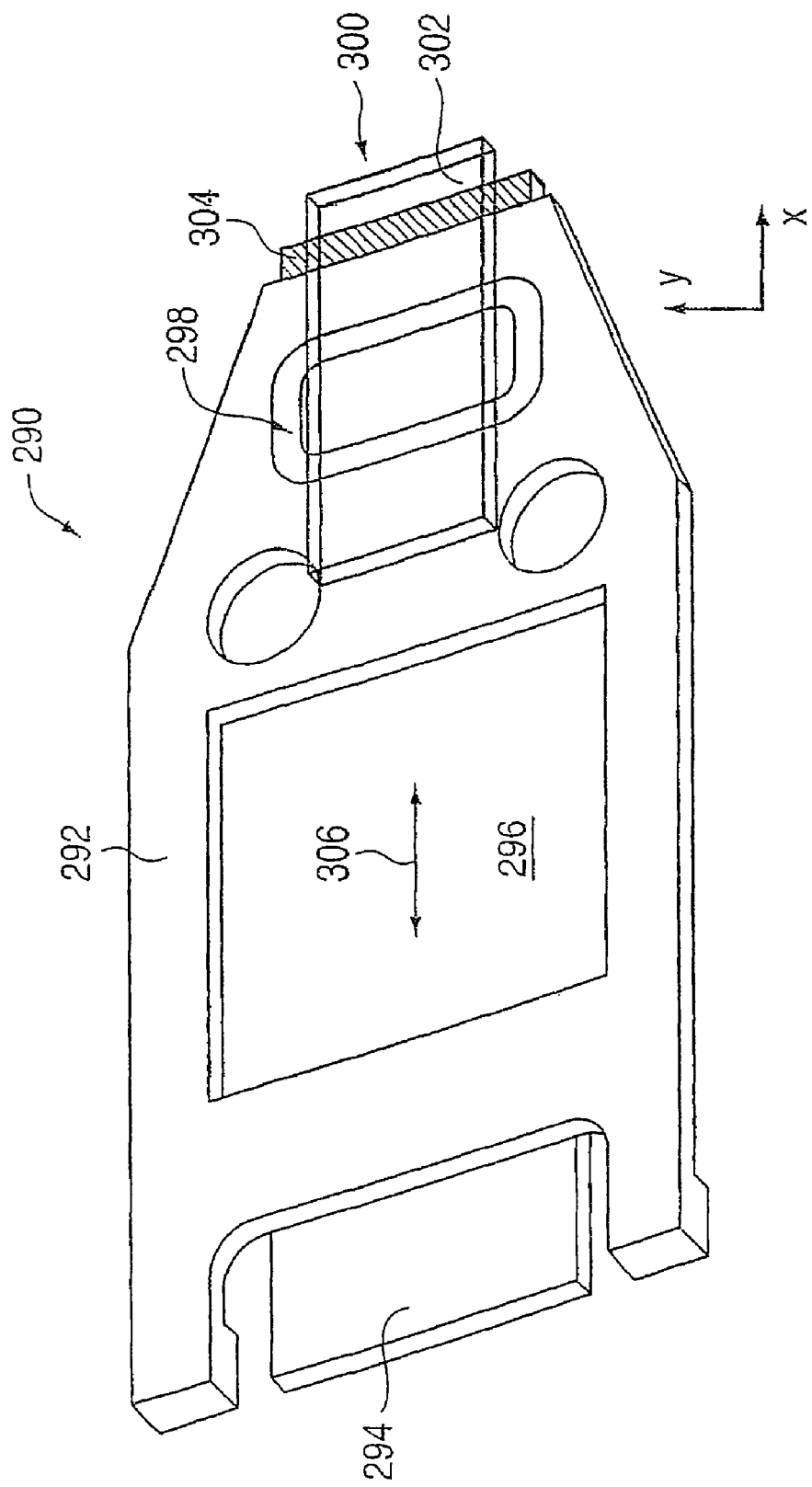
FIG. 11 is a perspective view of another embodiment of a translating surface member driven by a voice coil actuator.

FIG. 11 is a perspective view of another embodiment 290 of a separate translating surface and moving coil actuator. In this embodiment, a frame 292 is positioned over the touchpad 294 of the device. Frame 292 includes a thin surface portion 296 which is located directly above the touchpad 294 and is thin enough to allow the user's contact on the portion 296 to be detected by the touchpad 294 underneath. Frame 292 also includes an integrated voice coil 298 which is part of a voice coil actuator 300. The coil 298 can be wire traces that are molded into the frame 292, which can be a PCB. The other parts of the actuator 300 include a stationary two-pole magnet 302 positioned over the coil 298 and grounded to the laptop housing, and a backing plate 304 made of steel, positioned on the other side of frame 292 and grounded to the housing, and used for a flux return path. The steel subassembly can be attached to the touchpad PCB itself, for example.

Thus, the magnetic fields of the magnet 302 and the current flowing through coil 298 interact to cause a linear force on the frame 298, which causes the frame and portion 296 to move as indicated by arrow 306. This provides haptic sensations to the user similarly to the separate translating surface embodiments described above. The housing can surround the entire frame except for an opening surrounding the portion 296 of the frame 292. In some embodiments, wires from the coil 298 can be connected to the touchpad PCB using a separate flex circuit finger that branches off of the moving frame 292.

Figure 12:
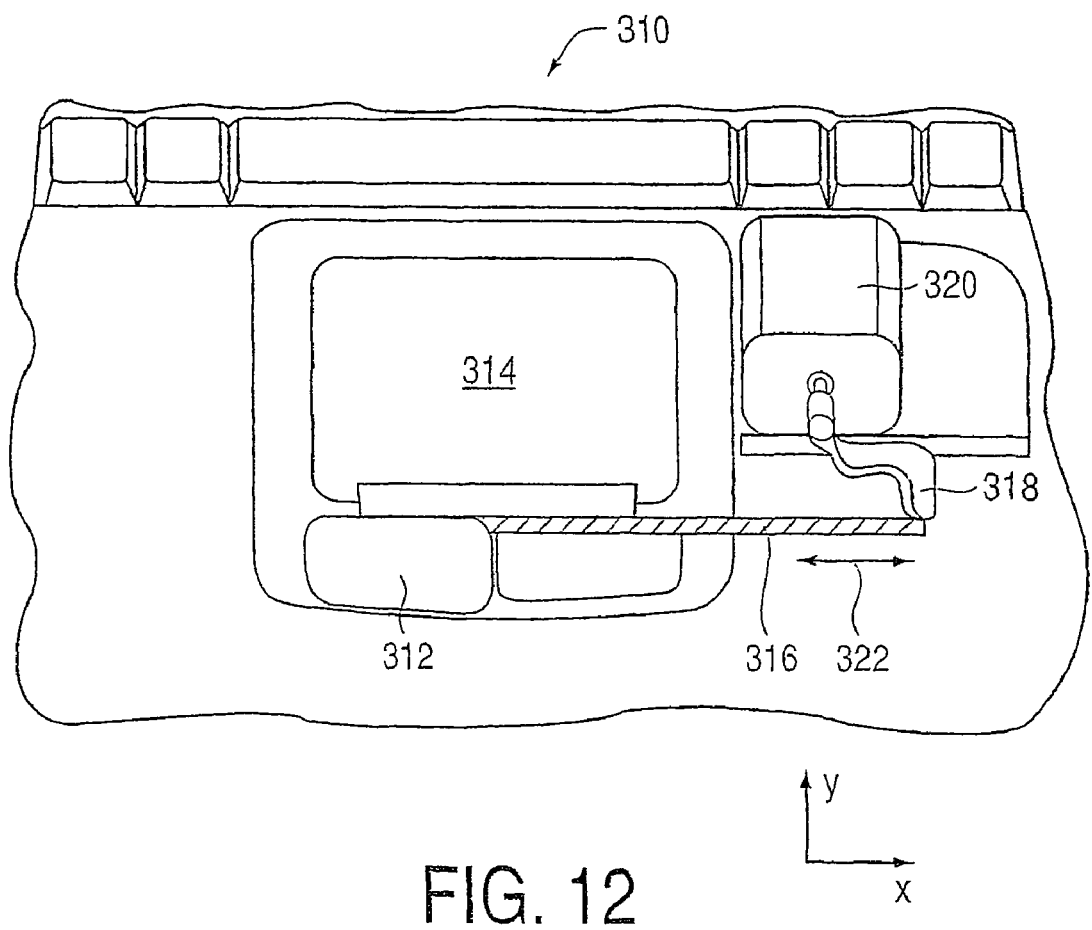
FIG. 12 is a perspective view of an embodiment of a translating surface adjacent to a touchpad.

FIG. 12 is a perspective view of another embodiment 310 of a separate translating surface. In this embodiment, a surface surrounding the touchpad is translated in x- and/or y-direction with respect to the touchpad surface. Thumb surface 312 is positioned at the bottom side of the touchpad 314 and is rigidly coupled to a link member 295. Link member 316 is coupled to a flexible link 318, which is coupled to the rotatable shaft of an actuator 320 that is grounded to the laptop housing. When the actuator 320 rotates the shaft, the flexible link 318 moves the link member 316 linearly as indicated by arrow 322, which moves the thumb surface 312 linearly along the x-axis. The thumb surface 312 is shown in sliding contact with a standard button (not shown) which is directly underneath the surface 312.

The user can rest his or her thumb, palm, or finger on the thumb surface 312 while operating the touchpad in order to feel the haptic sensations. To press the button located underneath the thumb surface 312, the user simply presses down on the surface 312. Overall, the sensations tend to be similar to the sensations for the other translating surfaces described above. In other embodiments, the link member 316 can be much longer to allow desired placement of the actuator 320 in the housing of the laptop or other device.

One disadvantage is that there is no feedback to the user unless the user has a thumb, finger, or palm on the thumb surface area. The user may have to reach for other buttons to type and then lose the haptic experience. A larger surface 312 or palm pad extension can be used in embodiments in which it may be difficult to keep the user's thumb on the surface 312 while using the same hand to point with the touchpad.

Touchpad Translation

These embodiments translate the touchpad surface itself rather than moving a separate surface. The user feels the translating touchpad moving laterally, in shear with his or her skin, creating an immediate sensation. The touchpad can be moved relative to a fixed surround, such as a laptop housing.

Figure 13:
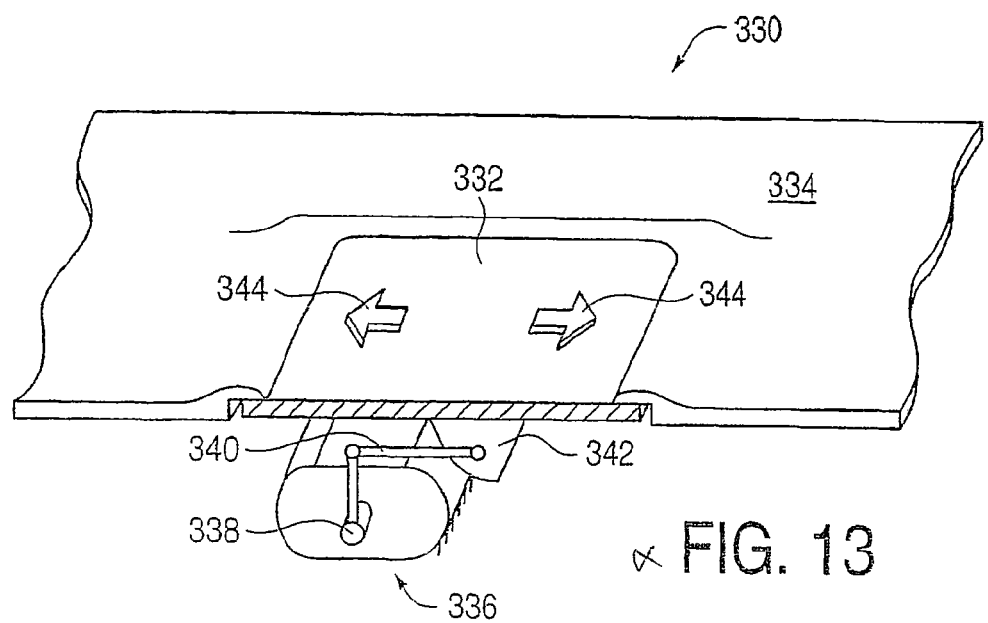
FIG. 13 is a perspective view of an embodiment of a touchpad translated in one direction by a rotary actuator.

FIG. 13 is a perspective view of one embodiment 330 providing a translating touchpad surface. Touchpad 332 is moved relative to a housing 334, such as a laptop or PDA housing, by an actuator 336. In the described embodiment, the actuator 336 is a rotary actuator, such as a DC motor, having a rotating shaft 338 that is coupled to a linkage 340. The linkage 340 is coupled to a bracket 342 at its other end, where the bracket 342 is coupled to the underside of the touchpad 332 module. The linkage includes joints and/or flexibility/compliance to allow the rotational motion of the shaft 338 to be converted to linear force on the bracket 342, thereby causing the touchpad 332 to move laterally as shown by arrows 344. For example, the linkage can be made of polypropylene, similar to the linkages of the actuator assembly of FIG. 5. The laptop housing can serve as a constraining structure for the moving touchpad module.

For example, a standard DC motor can be used for actuator 336 and a polypropylene linkage assembly for linkage 340. In one embodiment, the haptic feedback components can reside where optional components for the laptop are normally placed, such as an optional disc drive.

In other embodiments, the actuator 338 can be located remotely from the touchpad 332, e.g., wherever space is available in the housing as opposed to directly underneath the touchpad as illustrated in FIG. 13. Linkages can be used to locate the actuator(s) remotely from the touchpad, as shown in FIG. 14 below.

Translating the entire touchpad in one or two axes may be one good overall haptics approach. Very small displacements (0.2 mm<.times.<0.5 mm) of the touchpad are desired to provide useful haptics. The power consumption for this embodiment when evaluated within a practical magnitude range can be less than the consumption of currently available inertial mice interface devices, which can receive all needed power over the interface to the host computer, such as USB.

Some advantages are apparent in this type of embodiment. Feedback experience is direct, well correlated with pointing, and precise. Implementation can be flexible and unobtrusive, and addition of haptic components does not alter how the touchpad is used. The translating surface has a small displacement requirement compared with inertial approaches—this can lead to reduced power consumption and manufacturing benefits. In some embodiments, the motion of the touchpad can be oriented at an angle in the x-y plane. Some disadvantages may include use of a DC motor, which are relatively large, a flexible linkage may need a lot of clearance and may cause friction, and power consumption may be relatively high.

Figure 14:
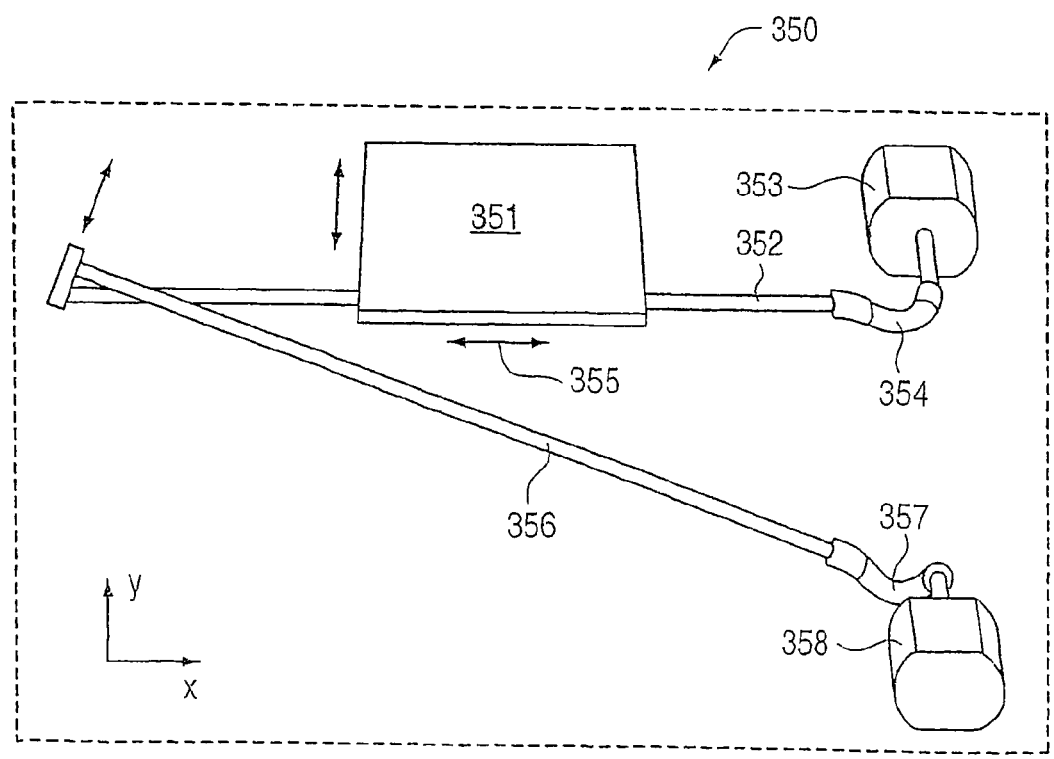
FIG. 14 is a perspective view of an embodiment of a touchpad translated in two directions by rotary actuators.

FIG. 14 illustrates a perspective view of another embodiment 350 of a moving touchpad, in which the touchpad may be moved in both X and Y directions. The touchpad 351 is directly coupled to a first linkage member 351, which is coupled to a rotating shaft of an actuator 353 by a flexible member 354, such as polypropelene. Actuator 353 is grounded to the laptop housing. When actuator 353 rotates its shaft, the flexible member 354 converts the rotary motion to linear motion and translates the linkage member 352 in the x-direction, which in turn translates the touchpad as indicated by arrow 355. At the distal end of the first linkage member 354, a second linkage member 356 is coupled, e.g. by a flexible coupling.

A second actuator 358, grounded to the laptop housing, is coupled to the other end of the second linkage member 356 by a flexible member 357, where the axis of rotation of the rotating shaft of the actuator 358 is substantially the same as the axis of rotation of the actuator 353. The rotary force output by the rotating shaft of the actuator 358 is converted to a linear force by the flexible member 357. This linear force causes the second linkage member 356 to move linearly along its length, which in turn causes the first linkage member 352 to pivot approximately about its end near actuator 353 along the y-axis and cause the touchpad 351 to move approximately along the y-axis. The actuators 353 and 358 can be, for example, DC motors or any other type of actuator, e.g. linear actuators can also be used, as described below in FIGS. 15-17. The linkage members can be made of any suitable material, e.g. carbon fiber. Preferably, very little energy is absorbed by the grounded structure or by unwanted deformations in the linkage assembly.

Thus, the mechanism decouples the x- and y-motions; by activating actuator 353, x-axis motion is provided, and by activating actuator 358, y-axis motion is provided; both x- and y-axis motion can be provided by activating both motors simultaneously. Both actuators can be driven either together (common mode) or differentially (differential mode) to achieve pure X or Y movement without binding the linkage parts. Furthermore, any combination of drive current will produce a resultant force along any arbitrary axis with the same fidelity and lack of binding.

One embodiment may use firmware for rapid evaluation and output of X and Y forces, e.g. software running on a local controller such as a microprocessor, or running off the host CPU. In some embodiments, such firmware may be too complex, so that alternatively, a mechanism with an electronic way of switching between the two principle feedback axes can be used. In one embodiment, the two DC motors can be connected in a series circuit with switch that reverses the current through one of the two motors.

In the embodiment of FIG. 14, the user may feel the difference between x- and y-directional forces when moving a finger or object on the touchpad in the x-direction. There is haptic value in: having the correlation or alignment of tactile feedback with finger/cursor motion; in some cases, alignment can boost the haptic signal-to-noise ratio. For example, moving the cursor right to left over icons or buttons may feel better and more like real buttons to the user when the feedback is directed horizontally along the x-axis. Less power may be required overall if the feedback is aligned with the cursor direction instead of being omnidirectional or misaligned. In some cases, a weaker aligned haptic effect may be more meaningful than a stronger misaligned effect.

The touchpad surface with enhanced texture moves relative to a fixed surrounding surface with enhanced texture. The enhanced texture is more rough, corrugated, or otherwise textured, allowing a stronger user contact.

In some other embodiments, the touchpad surface can be comprised of interdigitated surface features that move relative to each other in x- and/or y-directions. For example, two halves of a touchpad can be driven by actuator(s) to move relative to each other.

In other embodiments, other actuators can be used to move the touchpad, touchscreen, or other touch device in the z-direction. For example, piezo-electric actuators, voice coil actuators, or moving magnet actuators can be directly coupled to the touchpad or touchscreen to provide direct motion of the touch surface. Piezo-electric actuators are described with reference to copending patent application Ser. No. 09/487,737. Also, the touchpad surface can be comprised of a fixed tactile surface and a reference surface, where the reference surface can displaced along the z-axis with respect to the fixed tactile surface.

Figure 15A:
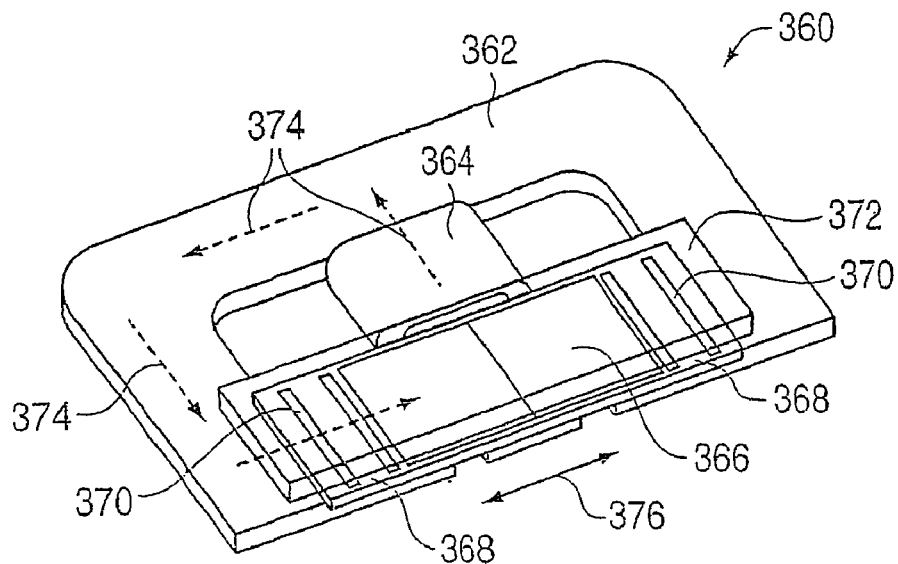
FIGS. 15a and 15b are perspective views of a first embodiment of a flat E-core actuator suitable for translating a touchpad or a separate surface.
Figure 15B:
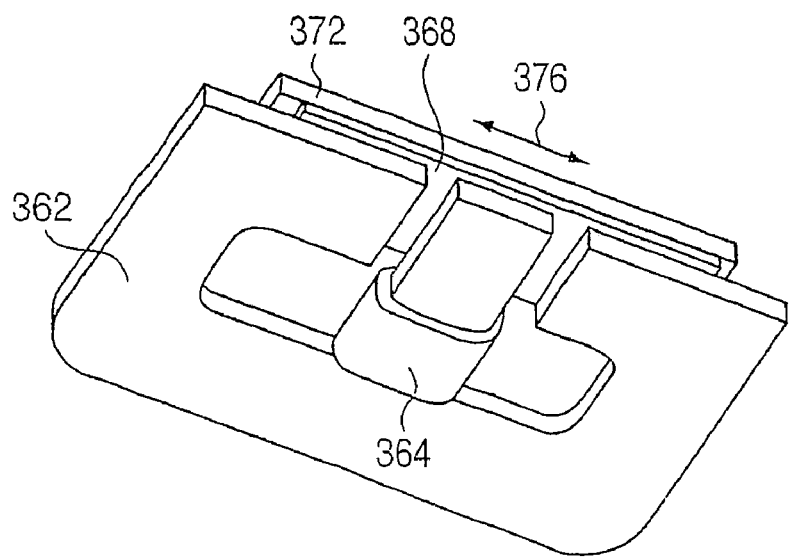
Figure 15C:
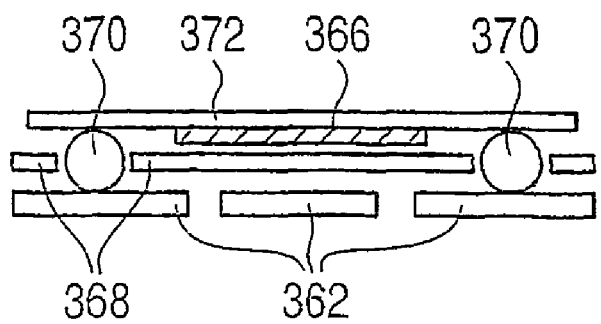
FIG. 15c is a side view of the actuator of FIGS. 15a-15b.

FIGS. 15a and 15b are perspective views of the top side and bottom side, respectively, of a different embodiment of a novel "flat-E" actuator 360 for use in translating a touchpad. FIG. 15c is a side view of the actuator 360. Actuator 360 is designed to be very flat and thus may be more appropriate to function within a flat assembly that can be inherently part of the touchpad, touchscreen, or other similar input device. "E-core" actuator topology provides an excellent actuator using minimal magnet material and delivers good force and bandwidth. One disadvantage of the moving magnet actuator is the large depth required ("E" core ferromagnetic piece width can be traded for height to some extent, perhaps reducing the overall depth of the actuator).

Actuator 360 presents a inventive embodiment of an "E" core that can be used to translate the touchpad (or alternatively to translate a separate surface, as in the embodiments of FIGS. 9-14). A folded over, flat 3-D embodiment, shown in FIGS. 15a-15b, that may behave substantially like a 2-D case, but with more leakage and non uniform flux at the poles.

Figure 15D:
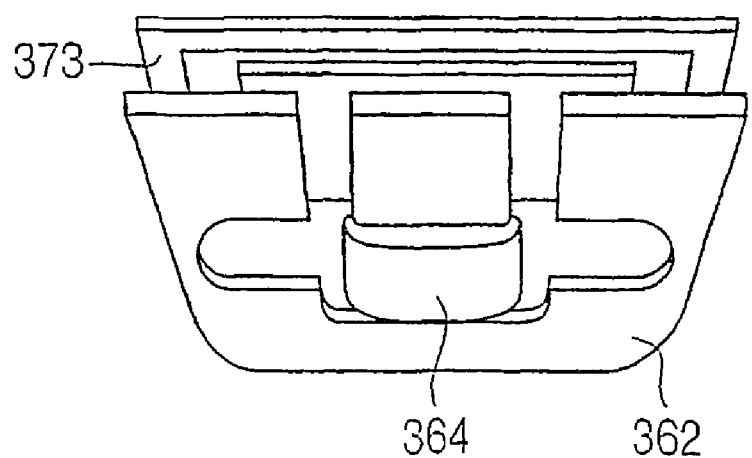
FIG. 15d is a perspective view of the actuator of FIGS. 15a-15b coupled to a touchpad.

Actuator 360 includes a ferromagnetic piece 362 shaped as an "E", which can be made of a metal such as a ferrous metal or carbon steel plate, and can be a single piece of metal or a lamination. A coil 364 of wire is wound about the central pole of the "E" of the ferromagnetic piece 362. A floating plastic cage 368 can be positioned on the ferromagnetic piece 362 and can include two or more rollers 370 positioned in apertures in the cage and oriented so that the rollers roll about axes parallel to the axis passing through the coil 364 about which the coil is wound. The cage can be plastic and is floating, i.e. unattached to other components, to allow the rollers to roll. A two-pole magnet 366 is positioned above the poles of the ferromagnetic piece 362 and cage 368 so that there is an air gap between magnet and ferromagnetic piece. The magnet 366 is coupled to the underside (in the orientation of the figures; other orientations are possible) of a backing steel piece 372 which is positioned on top of and contacting the rollers 370. The rollers thus set the nominal magnetic gap between the magnet and the ferromagnetic piece 362. The backing steel piece 372 can be rigidly coupled to the touchpad 373, as shown in FIG. 15d, so that the touchpad, steel piece 372, and magnet 366 can translate relative to the ferromagnetic piece 362. For example, the magnet may in some embodiments be a two pole bonded neodymium wafer, and the steel parts may be stamped from single sheets about 1 mm thick. Additional rollers or foam can be used to support the end of the ferromagnetic piece opposite the magnet 366. The magnet, cage, and backing piece are located to the side of the "E" poles rather than at the front edge as in other E-core type actuators; this allows the actuator to be made very flat for laptop and other portable device applications.

In operation, an electrical current is flowed through the coil 364, which causes magnetic flux to flow through the ferromagnetic piece in the direction of arrows 374. In reaction; the steel plate 372 moves in a direction along the axis indicated by arrow 376 (the direction is dependent on the direction of the current in the coil). The rollers 370 rotate to allow the steel plate 372 and magnet 366 to translate relative to the ferromagnetic piece 362. The floating cage 368 keeps the rollers from moving in undesired directions as they rotate. Also, the magnetic attractive normal forces which occur between ferromagnetic piece 362 and magnet 366 are reacted with the rollers 370. Other Flat-E related embodiments can include flexure and knife-edge suspensions to react (allow motion from) magnetic normal forces.

The flat E actuator embodiments described herein can be used to translate the touchpad (or touchscreen) or a separate surface member above or to the side of the touchpad. For example, two flat E actuators can be used in a configuration similar to that of FIG. 9 to drive the touchpad or surface member in two axes, x and y.

The actuator 360 can be made very thin in comparison with other actuators, e.g. the assembly can be made approximately 3 or 4 mm thick, less than half as thick as other "E" core actuators. The magnetics design can be iterated for optimal performance. Linearity and detent forces can be traded for thickness.

Advantages include a planar, thin geometry, which is suitable for laptops, PDA, and other portable devices. The moving magnet approach does not require a large air gap so it may be more attractive for laptop haptic feedback. An "E" core prototype was 10 mm.times.20 mm.times.8 mm and is smaller than most DC motors with equivalent force and power consumption. Furthermore, it is a direct drive configuration, so no transmission is required between actuator and touchpad. Efficient, low cost, and easy to manufacture components allow the actuator to be produced cheaply. The actuator is simple to integrate with existing touchpad PCB's and modules. One disadvantage is that magnetic attractive normal forces exist, which may necessitate a suspension. Rollers and/or flexure and knife edge suspensions can be used in some embodiments to react magnetic normal forces.

The actuator 360 generally provides good bandwidth. Larger (e.g., >1 mm) displacements can be achieved. Those embodiments employing foam to support the opposite end of the ferromagnetic piece have a return spring having a low spring constant, mostly from the foam suspension operated in shear mode. Audible noise may also be reduced by using the foam and/or rollers. While the haptic performance is good, the displacement of the surface is small enough so that when the user is moving a finger over the touchpad to move the cursor over the desktop, the surface displacement does not noticeably affect the cursor motion.

Figure 16A:
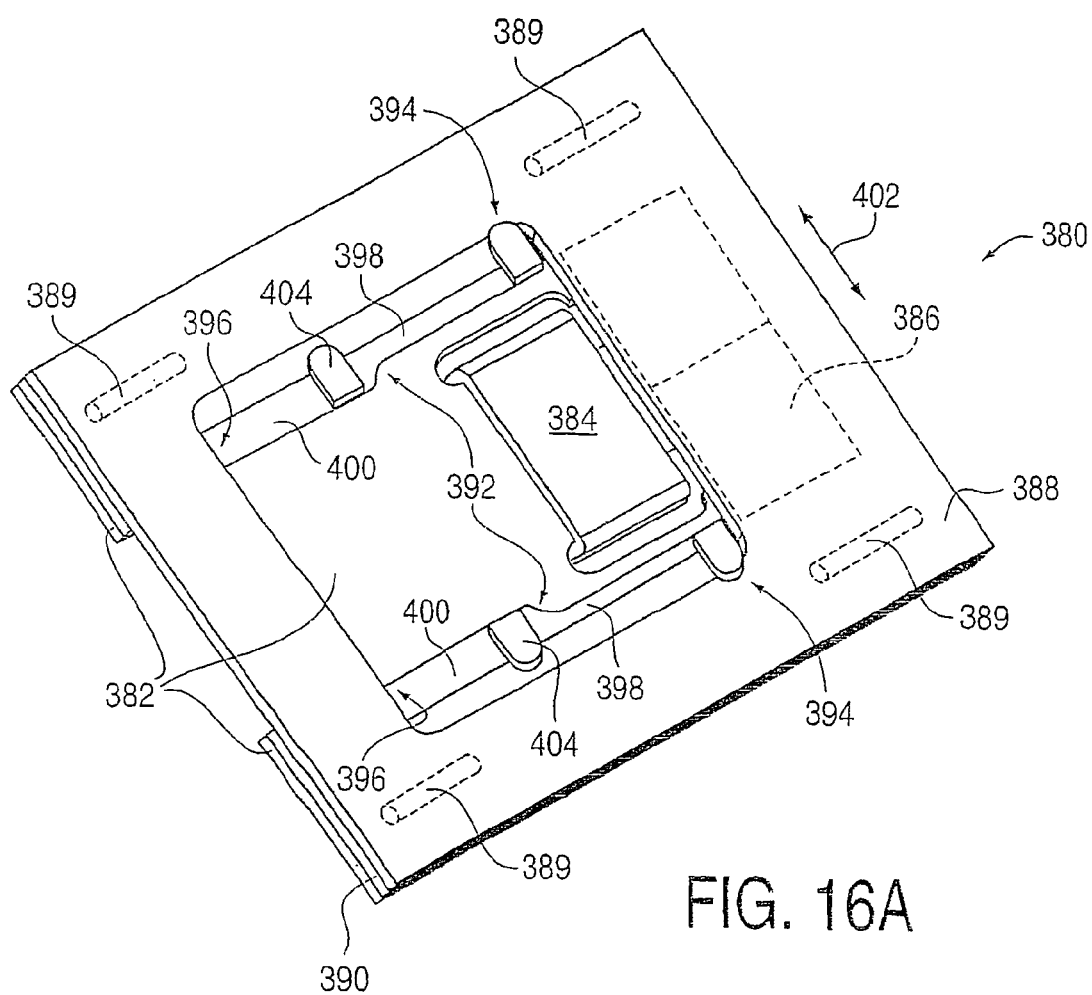
FIGS. 16a and 16b are top and bottom perspective views of another embodiment of a flat E-core actuator.
Figure 16B:
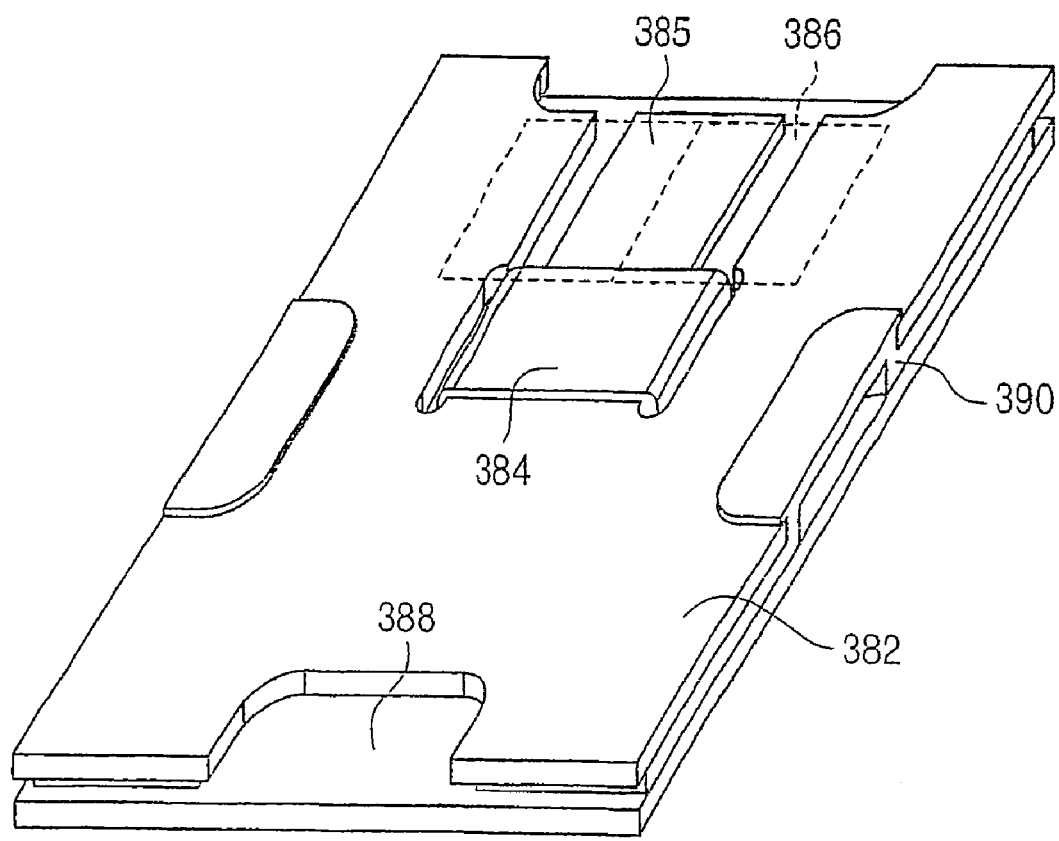

FIGS. 16a and 16b are perspective views of the top side and bottom sides of another embodiment 380 of the "flat-E" actuator of FIGS. 15a-15c. A ferromagnetic piece 382 (or a lamination, in other embodiments) includes an approximate "E" structure and has a coil 384 wound around the E center pole 385. A two-pole magnet 386 is positioned across the E center pole 385 such that a gap is provided between ferromagnetic piece 382 and magnet, similarly to the embodiment 360. A metal plate 388 (e.g., steel) is coupled to magnet 386 and is provided parallel to the ferromagnetic piece and magnet. A cage 390 can be provided as the middle layer, where rollers 389 (shown as dashed lines) can be positioned within apertures in the cage 390 and allow the plate 388 to slide laterally with respect to the ferromagnetic piece and magnet. A touchpad or touchscreen (not shown) can be rigidly coupled to the top of plate 388, with piece 382 grounded. In alternate embodiments, the touchpad or touch screen can be coupled to the piece 382 with plate 388 grounded.

Embodiment 380 also includes a flexible suspension, which can be coupled to the middle layer plastic cage 390 and can include two linkages 392 that are thus effectively coupled between the steel plate 388 and the ferromagnetic piece 382. The linkages 392 contact the steel plate 388 at ends 394 and are coupled to the cage layer 390 at ends 396 (or molded with the cage layer as a single plastic piece). Each linkage includes a thinner portion 398 and a thicker portion 400.

In operation, a current is flowed through coil 384 and the magnetic forces resulting from the current and magnet 386 cause the plate 388 (and the touchpad) to move as indicated by axis 402. The suspension including linkages 392 prevents the plate 388 from skewing due to magnetic normal forces and any other forces. Each linkage 392 flexes to accommodate the motion of the plate 388, where the thinner members 398 flex first, and the thicker members 400 flex if the limits of flex are reached for members 398. The thinner-thicker structure allows spring centering to operate until the thicker (stiffer) beams are engaged, which provide a softer feeling stop to motion. The final limit to motion is caused by either of the stops 404 hitting the inner edge of the plate 388.

The flexible suspension described above effectively allows lateral desired motion of the plate and touchpad, but prevent motion in any other direction. This creates a much more stable motion of the plate 388 and does not allow the plate 388 to drift in its position over time. Furthermore, the suspension provides a desirable spring centering force on the plate 388 and touchpad, allowing the touchpad to move to the center of its range of motion when the user stops touching and forcing the touchpad.

FIGS. 17a-17g are views illustrating another flat-E actuator touchpad embodiment 420 that miniaturizes this type of actuator and provides fabricated surface mount devices that take advantage of existing lead frame and over molding manufacturing technologies. Such small scale devices can be wave soldered onto the touchpad module and can work in parallel to provide suitable stroke and force for touchpad translation (or for z-axis forces in alternate embodiments).

Figure 17A:
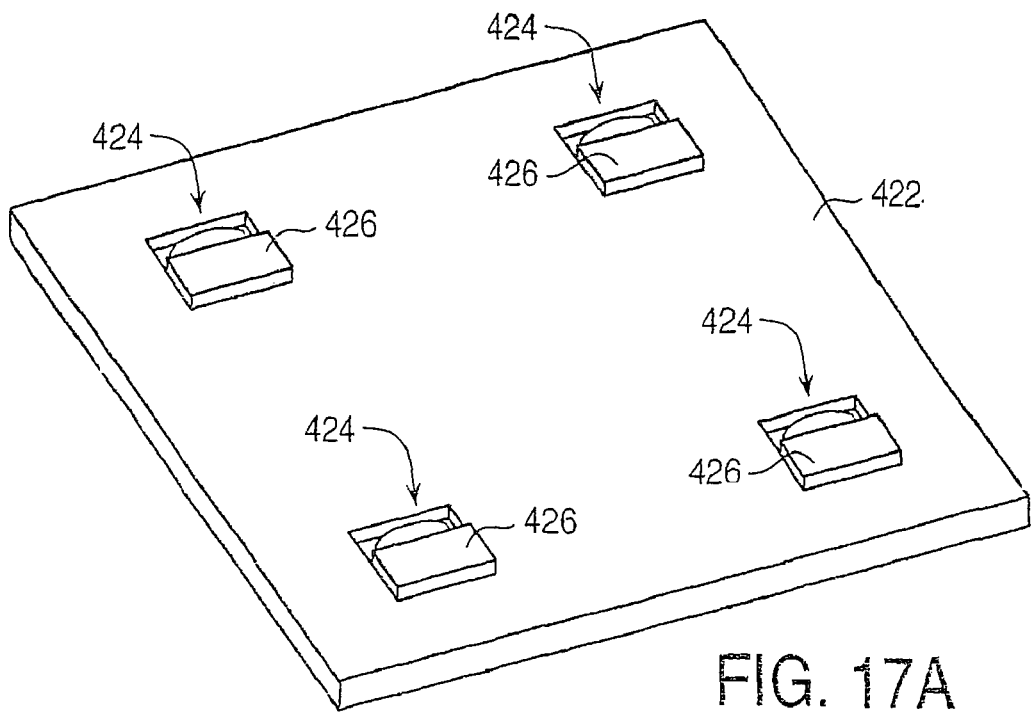
FIGS. 17a-17b are perspective and top views of surface-mounted E-core actuators.
Figure 17B:
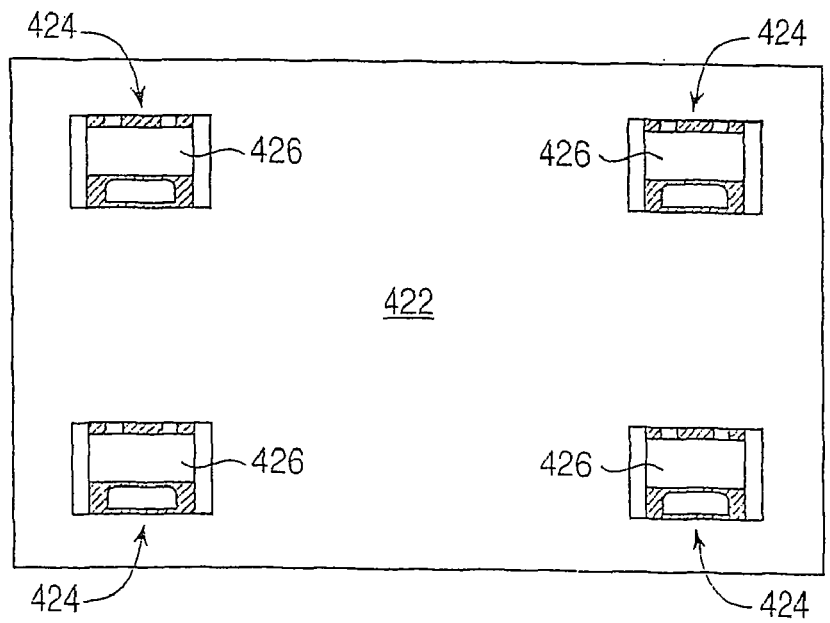
Figure 17C:
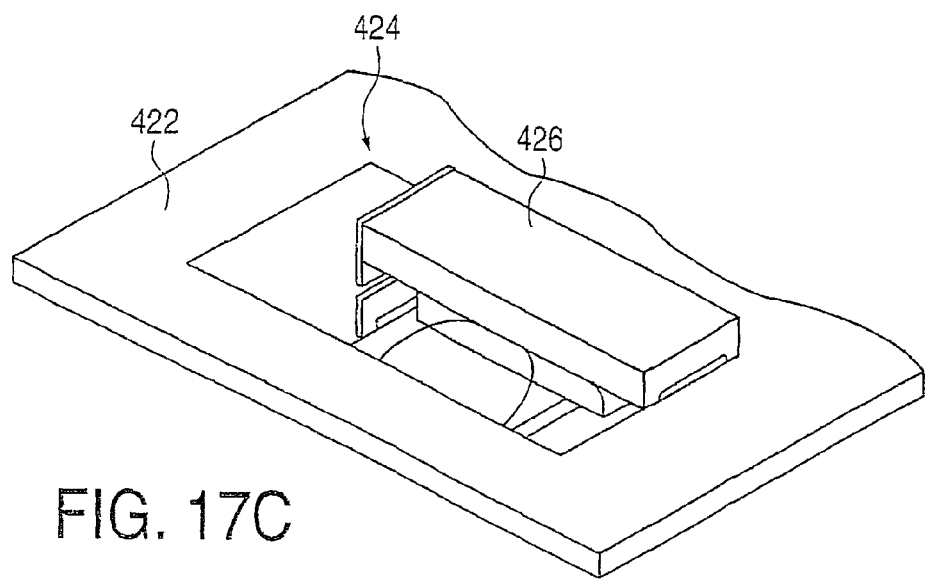
FIGS. 17c-17g are perspective and side views of the E-core actuators of FIGS. 17a-17b.

FIGS. 17a-17c illustrate a top view of a PCB 422 which includes multiple Flat-E actuators 424. An actuator 424 can be positioned at each corner of the PCB 422 as shown. More or less actuators than shown can alternatively be placed in other configurations. The use of multiple actuators 422 can provide greater magnitude forces and allow each actuator 422 to have a lower force output and cost. In one embodiment, the PCB 422 is a separate PCB that is grounded to the housing of the laptop. The touchpad (e.g., including its own PCB different from PCB 422) is then coupled to the moving portions of the actuators, e.g., to the pads 426 shown in FIG. 17a. In another embodiment, the PCB 422 is the touchpad, and the moving portions of the actuators are coupled to a grounded surface in the laptop, such as the housing. In such an embodiment, the actuators 424 can be hidden from the user by a lip of housing that extends around the perimeter of the touchpad, leaving the center area of the PCB 422 exposed to the user.

Figure 17D:
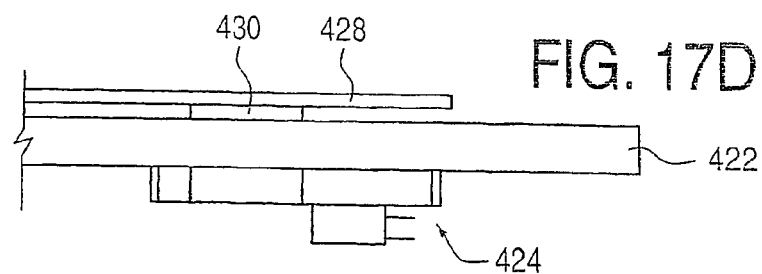

FIG. 17d is a side elevational view of one end of a PCB 422, separate from the touchpad, that includes the flat-E actuators 424. The touchpad/PCB member 428 is coupled to the moving portions 430 of the actuators 424.

Figure 17E:
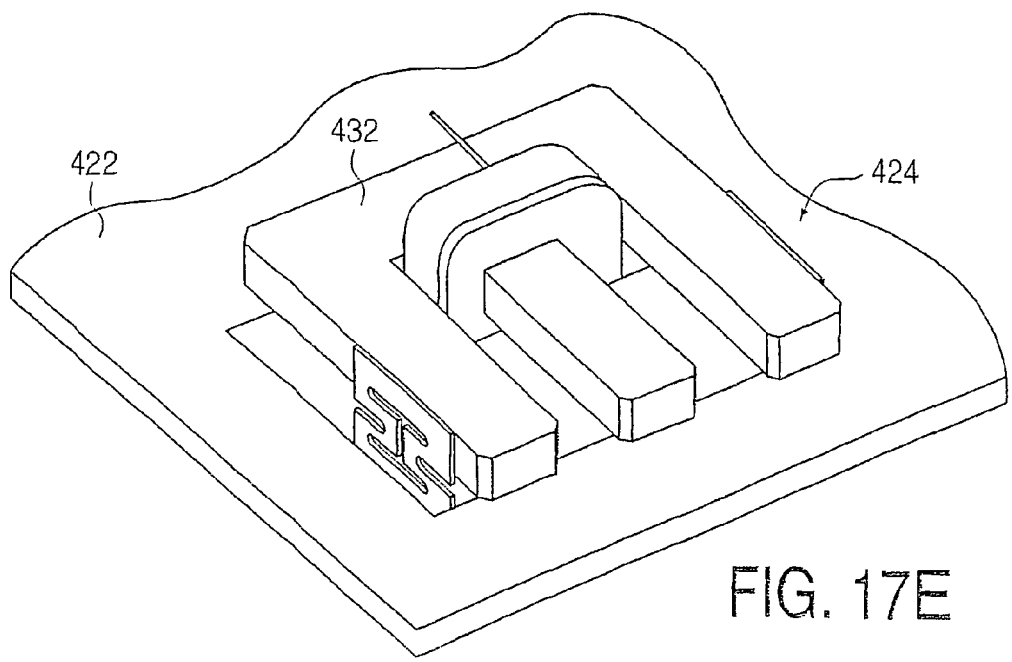

FIG. 17e is a perspective view illustrating one embodiment of the underside of the PCB 422 shown in FIG. 17a, where the flat-E actuators 424 have been surface mounted to the underside of the PCB 422. This can be done as "hand-placed" components, or preferably using automatic surface mount technology placement equipment. The "E" ferromagnetic piece 432 can be grounded to the PCB 422 so that the magnet and steel backing plate of the actuator move.

Figure 17F:
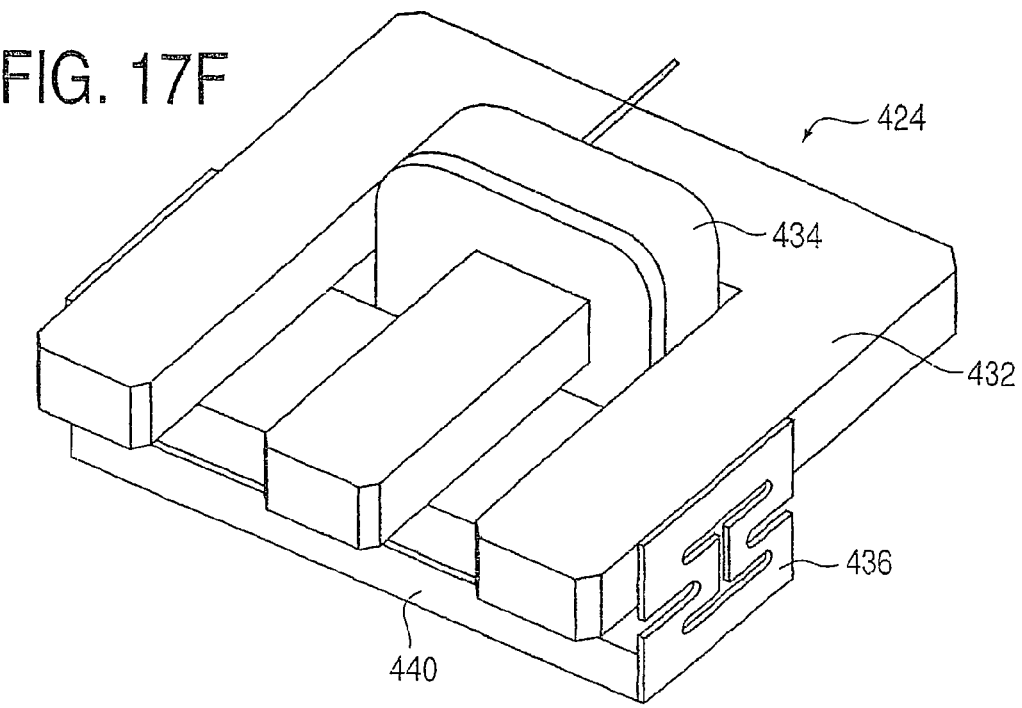
Figure 17G:
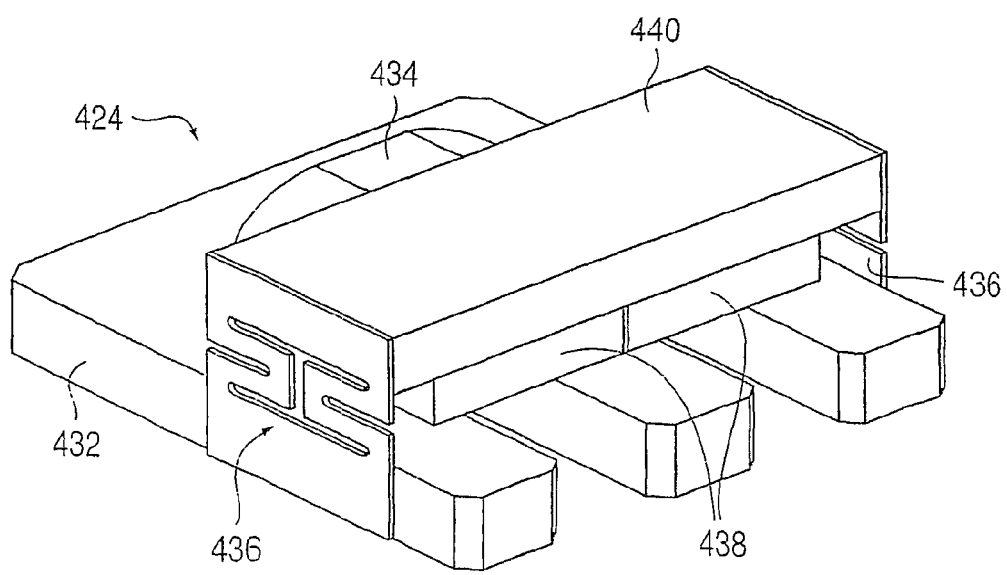

FIGS. 17*f* and 17*g* are perspective views illustrating top and bottom views, respectively, of the flat-E actuator 424 which has 3 poles and can operate similarly to the flat-E actuators described above. Ferromagnetic piece 432 is shaped like an "E" and has a coil 434 wrapped about the center pole. Flexures 436 allow the magnet 438 and steel backing plate 440 to move relative to the ferromagnetic piece 432 and coil 434. The touchpad (not shown) can be coupled to the steel backing piece 440 and the E-laminate piece 432/coil 434 can be grounded, as in the embodiments of FIGS. 17*a*-17*e*. Alternatively, the backing piece 440 and magnet 438 can be grounded and the touchpad can be coupled to a moving ferromagnetic piece 432.

A flat-E actuator as described above can be used to translate touchpad modules or palm surfaces directly. In the described embodiments, the total thickness of the flat-E actuator can be about 3 mm or less. Flat-E magnetic assemblies that can be integrated into the an existing touchpad product line represent a preferred embodiment in terms of size, manufacturability and economy of scale.

In other embodiments, other moving magnet actuator designs, such as described in copending application Ser. No. 09/608,130, and other voice coil actuator designs, such as described in U.S. Pat. Nos. 6,166,723 and 6,100,874, can be used. Voice coil actuators may be thicker since the coil is positioned in a relatively large magnetic gap. Moving magnet actuators typically have smaller inherent air gaps.

In other embodiments, other types of input surfaces or display screens can be similarly translated using any of the actuators described herein. For example, a clear surface such as the input sensing device(s) covering a display screen of a personal digital assistant (PDA) or a touch screen on a monitor or CRT, can be similarly translated in the X and/or Y directions (parallel to the screen surface) to provide haptic feedback. One application for such clear screen translation is ATM machines, where the user typically inputs information on a touch screen. Haptic feedback can make such input more accessible and easy for people with below-average vision. Haptic feedback can indicate when the user's finger is over a graphically-displayed button, or can identify particular displayed buttons with different haptic sensations. This can be useful in many ATM applications since there is not a cursor that is moved; haptic feedback can thus be useful to indicate to the user that a button has been pressed, e.g. a small vibration is output when a button is activated. Haptic feedback may also assist users in noisy environments, such as in areas with high vehicular traffic, where sound may not be easily heard by the user.

The embodiments described herein can also provide haptic feedback in an embodiment where the user is using a stylus or other object to input data on the touchpad, touch screen, or input area. The haptic sensations can be transmitted to the user from the touchpad (or other moving surface) and through the stylus or other object.

Other Features

A human factor issue related to haptic feedback in some embodiments may include force overload protection. Ideally, for non-inertial feedback actuators and transmission designs such as the translating surfaces and differential surfaces, it is desired for the actuator to produce large forces with fidelity regardless of the load on the actuator or the position within the actuator travel. Put another way, the finger or hand of the user should not move the actuator against a limit or reach an end of travel condition where half of a vibration cycle is attenuated. For this reason, it is desirable to design actuator and transmission mechanisms that are inherently decoupled from the user loading. An example of this would be an E-core actuator with very high spring centering provided by a stiff suspension, as in the embodiment of FIG. 16*a*-16*b*. A forceful actuator can overcome this spring force easily, and the forces of a finger dragging on a touchpad surface are a small percentage of full scale actuator output. A weaker actuator may require a more compliant suspension, and this would allow the user interaction to interfere with oscillations and create non-linear output.

Another human-factor-related issue with haptic feedback in some embodiments can be audibility. The use of palm rest surfaces and inertial actuator assemblies, for example, causes sound that is the unavoidable side effect of a haptic sounding board. Loaded surfaces, such as when the user is touching the housing or touchpad, radiate sound poorly, and still transmit forces quite well. Thus, in some embodiments, a load measuring device can be used to determine when the user's hands are present on moving surfaces to allow forces to be output only when such hands are present.

To save costs when providing haptic functionality to a laptop touchpad or other similar input device, the existing sound electronics within the laptop, PDA, or other device can be utilized in some embodiments. For example, the existing sound analog output (e.g. digital-to-analog converter) and the sound power amplifiers can drive the actuator used for haptic feedback for the touchpad or other laptop component as described above, without having to add an additional microprocessor and/or additional power electronics. A notch filter or other pickoff from the sound signal can be used to provide the haptic feedback signal. For example, haptic effect control signals can be provided in the inaudible range of the sound spectrum and filtered so that these control signals can be provided to the haptic actuator, while the remainder of the signal in the audible range is routed to the audio speakers of the laptop. Or, dedicated signals that are outside the audible range and not included with audio signals can be filtered or routed to control the haptic feedback actuator(s).

Furthermore, existing software on many laptops tracks the battery power for the laptop to indicate power level, warn the user, or shutoff the laptop to conserve battery power. This tracking software can be tapped into for haptic feedback applications. For example, if battery power gets below a certain level, the haptic feedback software routines can scale down or even turn off the output forces to the user. This can be accomplished by dropping the magnitude of the forces, or by reducing the types or number of graphical objects in the GUI that have haptic effects associated with them. This can also be accomplished by shortening the duration of haptic effects, e.g. effects that are normally 50 ms can be reduced to 40 ms, etc. Also, a combination of such methods can be used. Finally, some laptop computers have different settings, such as high power, medium power, and low power, which a user can select according to his or her needs, e.g. lower power setting allows the batteries to last longer. The haptic feedback control can link into the setting and be governed by this setting as well. For example, if the user selects low power mode, the haptic feedback controller can adapt as described above to reduce power requirements of the haptic effects.

Figure 18:
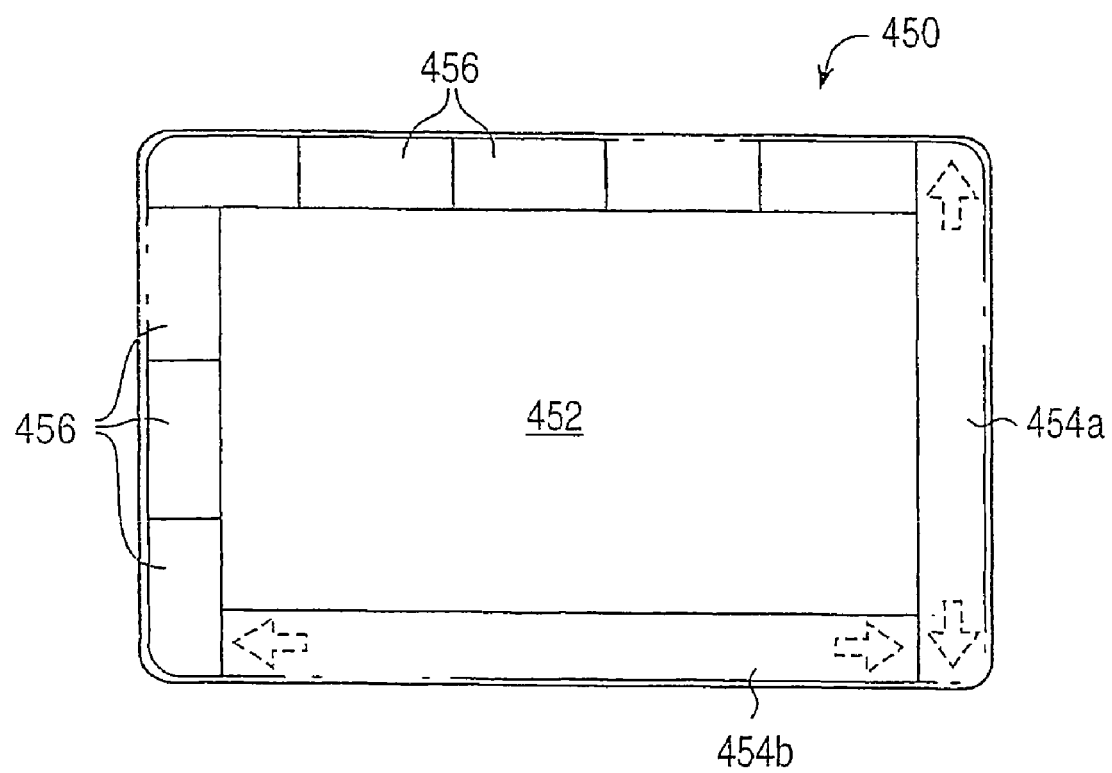
FIG. 18 is a top plan view of an example of a haptic touchpad having different control regions.

FIG. 18 is a top elevational view of a touchpad 450. Touchpad 450 can in some embodiments be used simply as a positioning device, where the entire area of the touchpad provides cursor control. In other embodiments, different regions of the pad can be designated for different functions. In some of these region embodiments, each region can be provided with an actuator located under the region or otherwise physically associated with the region, while other region embodiments may use a single actuator that imparts forces on the entire touchpad 450. In the embodiment shown, a central cursor control region 452 can be used to position a cursor or viewpoint displayed by the laptop computer or other device.

The cursor control region of a touchpad can cause forces to be output on the touchpad based on interactions of the controlled cursor with the graphical environment and/or events in that environment. The user moves a finger or other object within region 452, for example, to correspondingly move the cursor 20. Forces are preferably associated with the interactions of the cursor with displayed graphical objects. For example, a jolt or "pulse" sensation can be output, which is a single impulse of force that quickly rises to the desired magnitude and then is turned off or quickly decays back to zero or small magnitude. The touchpad 450 can be jolted in one direction or as an oscillation in the z-axis or other axis inertially in the inertial haptic feedback embodiments, or the touchpad can be translated in one direction or oscillated one or more times to provide the pulse. A vibration sensation can also be output, which is a time-varying force that is typically periodic. The vibration can cause the touchpad 450 or portions thereof to oscillate back and forth multiple times, and can be out put by a host or local microprocessor to simulate a particular effect that is occurring in a host application.

Another type of force sensation that can be output on the touchpad is a texture force. This type of force is similar to a pulse force, but depends on the position of the user's finger on the area of the touchpad and/or on the location of the cursor in a graphical environment. Thus, texture bumps can be output depending on whether the cursor has moved over a location of a bump in a graphical object. This type of force is spatially-dependent, i.e. a force is output depending on the location of the cursor as it moves over a designated textured area; when the cursor is positioned between "bumps" of the texture, no force is output, and when the cursor moves over a bump, a force is output. This can be achieved by host control (e.g., the host sends the pulse signals as the cursor is dragged over the grating). In some embodiments, a separate touchpad microprocessor can be dedicated for haptic feedback with the touchpad, and the texture effect and be achieved using local control (e.g., the host sends a high level command with texture parameters and the sensation is directly controlled by the touchpad processor). In other cases a texture can be performed by presenting a vibration to a user, the vibration being dependent upon the current velocity of the user's finger (or other object) on the touchpad. When the finger is stationary, the vibration is deactivated; as the finger is moved faster, the frequency and magnitude of the vibration is increased. This sensation can be controlled locally by the touchpad processor (if present), or be controlled by the host. Such texture sensations are described in copending application Ser. No. 09/504,201. Other spatial force sensations can also be output. In addition, any of the described force sensations herein can be output simultaneously or otherwise combined as desired.

Different types of graphical objects can be associated with haptic sensations. Haptic sensations can output on the touchpad based on interaction between a cursor and a window, menu, icon, web page link, etc. For example, a "bump" or pulse can be output on the touchpad to signal the user of the location of the cursor when the cursor is moved over a border of a window. In other related interactions, when a rate control or scrolling function is performed with the touchpad (through use of the cursor), sensations can be output related to the rate control functions. Furthermore, the magnitude of output forces on the touchpad can depend on the event or interaction in the graphical environment, including user-independent events. These force sensations can also be used in games or simulations. These and other haptic sensations are described in U.S. Pat. No. 6,211,861 and copending patent application Ser. No. 09/585,741. Other control devices or grips that can include a touchpad in its housing include a gamepad, mouse or trackball device for manipulating a cursor or other graphical objects in a computer-generated environment; or a pressure sphere or the like.

Some forms of touchpads and touchscreens allow the amount of pressure the user is exerting on the touchpad to be sensed. This allows a variety of haptic sensations to be determined based at least in part on the sensed pressure. For example, a periodic vibration can be output having a frequency that depends on the sensed pressure. Or, the gain (magnitude) of output haptic sensations can be adjusted based on the sensed pressure. Those users that always tend to use the touchpad with more pressure can be allowed to select an automatic magnitude increase that would be in effect constantly.

Other embodiments of touchpads and touchscreens allow the user to enter "gestures" or shortcuts by tracing a symbol on the cursor control region or other region, which is recognized as a command or data by a processor. Haptic sensations can be associated with or dependent on particular gestures. For example, a confirmation of modes can be conveyed haptically with a particular haptic sensation when a mode confirmation gesture is recognized. Characters recognized from gestures also may each have a particular haptic sensation associated with them. In most touchpad embodiments, a user can select a graphical object or menu item by "tapping" the touchpad. Some touchpads may recognize a "tap-and-a-half" or double tap, which is the user doing a tap and then again touching the pad and maintaining the finger or object on the pad while moving the finger. For example, such a gesture can provide a "drag" mode in which objects may be moved with the cursor. When the user is in such a drag mode, a vibration or other haptic sensation can be output to indicate to the user that this mode is active.

As stated above, the touchpad 450 can also be provided with different control regions that provide separate input from the main cursor control region 452. In some embodiments, the different regions can be physically marked with lines, borders, or textures on the surface of the touchpad 450 (and/or sounds from the computer 10) so that the user can visually, audibly, and/or or tactilely tell which region he or she is contacting on the touchpad.

For example, scroll or rate control regions 454*a* and 454*b* can be used to provide input to perform a rate control task, such as scrolling documents, adjusting a value (such as audio volume, speaker balance, monitor display brightness, etc.), or panning/tilting the view in a game or simulation. Region 454*a* can be used by placing a finger (or other object) within the region, where the upper portion of the region will increase the value, scroll up, etc., and the lower portion of the region will decrease the value, scroll down, etc. In embodiments that can read the amount of pressure placed on the touchpad, the amount of pressure can directly control the rate of adjustment; e.g., a greater pressure will cause a document to scroll faster. The region 454*b* can similarly be used for horizontal (left/right) scrolling or rate control adjustment of a different value, view, etc.

Particular haptic effects can be associated with the control regions 454*a* and 454*b*. For example, when using the rate control region 454*a* or 454*b*, a vibration of a particular frequency can be output on the touchpad. In those embodiments having multiple actuators, an actuator placed directly under the region 454*a* or 454*b* can be activated to provide a more localized tactile sensation for the "active" (currently used) region. As a portion of a region 454 is pressed for rate control, pulses can be output on the touchpad (or region of the touchpad) to indicate when a page has scroll by, a particular value has passed, etc. A vibration can also be continually output while the user contacts the region 454a or 454b.

Other regions 456 can also be positioned on the touchpad 450. For example, each of regions 456 can be a small rectangular area, like a button, which the user can point to in order to initiate a function associated with the pointed-to region. The regions 456 can initiate such computer functions as running a program, opening or closing a window, going "forward" or "back" in a queue of web pages in a web browser, powering the computer 10 or initiating a "sleep" mode, checking mail, firing a gun in a game, cutting or pasting data from a buffer, saving a file to a storage device, selecting a font, etc. The regions 456 can duplicate functions and buttons provided in an application program or provide new, different functions.

Similarly to regions 454, the regions 456 an each be associated with haptic sensations; for example, a region 456 can provide a pulse sensation when it has been selected by the user, providing instant feedback that the function has been selected. For example, a haptic sensation such as a pulse can be output when the user "taps" a finger or object on a region 456, 452, or 454 to make a selection. Similar to physical analog buttons that provide a range of output based on how far the button is pushed, one or more regions 456 can be an analog-like button by providing a proportional, stepped, or analog output based on the pressure the user is exerting on the touchpad.

Furthermore, the same types of regions can be associated with similar-feeling haptic sensations. For example, each word-processor related region 456 can, when pointed to, cause a pulse of a particular strength, while each game-related region 456 can provide a pulse of different strength or a vibration. Furthermore, when the user moves the pointing object from one region 454 or 456 to another, a haptic sensation (such as a pulse) can be output on the touchpad 450 to signify that a region border has been crossed For example, a high frequency vibration which quickly decays to zero magnitude can be output when the pointing object enters a designated region. This can be valuable since it provides an indication of the borders to the regions 454 and 456 which the user would not otherwise know. This also allows region reconfiguration of size and/or location and allows the user to quickly learn the new layout haptically. Regions can also be associated with "enclosures" which define areas in a graphical environment and the different haptic sensations which are output when the cursor enters, exits, and is moved within the enclosure and the particular borders having such haptic associations.

In addition, the regions are preferably programmable in size and shape as well as in the function with which they are associated. Thus, the functions for regions 456 can change based on an active application program in the graphical environment and/or based on user preferences input to and/or stored on the computer 10. Preferably, the size and location of each of the regions can be adjusted by the user or by an application program, and any or all of the regions can be completely removed if desired. Furthermore, the user is preferably able to assign particular haptic sensations to particular areas or types of areas based on types of functions associated with those areas, as desired. Different haptic sensations can be designed in a tool such as Immersion Studio™ available from Immersion Corp. of San Jose, Calif.

It should be noted that the regions 454 and 456 need not be physical regions of the touchpad 450. That is, the entire touchpad surface need merely provide coordinates of user contact to the processor of the computer and software on the computer can designate where different regions are located. The computer can interpret the coordinates and, based on the location of the user contact, can interpret the touchpad input signal as a cursor control signal or a different type of signal, such as rate control, button function, etc. (e.g. a driver program can provide this interpreting function if desired). A local touchpad microprocessor, if present, may alternatively interpret the function associated with the user contact location and report appropriate signal or data to the host processor (such as position coordinates or a button signal), thus keeping the host processor or software ignorant of the lower level processing. In other embodiments, the touchpad 450 can be physically designed to output different signals to the computer based on different regions physically marked on the touchpad surface that are contacted by the user; e.g. each region can be sensed by a different sensor or sensor array.

Any of those embodiments described herein which provide haptic feedback to the finger or object of the user that contacts the touchpad or touchscreen may be used with the regions of touchpad 450.

While this subject matter has been described in terms of several preferred embodiments, it is contemplated that alterations, permutations, and equivalents thereof will become apparent to those skilled in the art upon a reading of the specification and study of the drawings. For example, many of the features described in one embodiment can be used interchangeably with other embodiments. Furthermore, certain terminology has been used for the purposes of descriptive clarity, and not to be limiting.

What is claimed is:

1. A method of outputting haptic feedback comprising:
sensing movement along a touch screen, wherein the movement is sensed with a sensor coupled to the touch screen;
comparing the sensed movement with a predetermined gesture;
recognizing a first symbol based on the comparison between the sensed movement and the predetermined gesture;
outputting a haptic feedback to the touch screen via an actuator coupled to the touch screen, wherein the actuator outputs the haptic feedback based on the recognized first symbol; and
outputting a second haptic feedback different from the haptic feedback based on a recognized second symbol, wherein the recognized second symbol is different than the recognized first symbol.

2. The method of claim 1, wherein the recognized symbol comprises a character.

3. The method of claim 1, wherein outputting the haptic feedback comprises outputting the haptic feedback in a direction substantially parallel to a surface of the touch screen.

4. The method of claim 1, wherein outputting the haptic feedback comprises outputting the haptic feedback in a direction substantially perpendicular to a surface of the touch screen.

5. The method of claim 1, wherein the wherein the actuator comprises one or more of: an inertial linear actuator or an inertial rotary actuator.

6. The method of claim 5, wherein the actuator is coupled to the touchscreen via a flexure.

7. A device, comprising:
a touch screen;
an actuator coupled to the touch screen;
a sensor coupled to the touch screen, the sensor configured to sense movement along the touch screen; and a processor coupled to the sensor, the processor configured to:
  compare the sensed movement with a predetermined gesture;
  recognize a first symbol based on the comparison between the sensed movement and the predetermined gesture;
  cause a haptic feedback to be output to the touch screen via the actuator, wherein the actuator outputs the haptic feedback based on the recognized first symbol; and
  cause a second haptic feedback to be output via the actuator, the second haptic feedback different from the haptic feedback based on a recognized second symbol, wherein the recognized second symbol is different than the recognized first symbol.

8. The device of claim 7, wherein the recognized first symbol comprises a character.

9. The device of claim 7, the processor further configured to:
  cause the haptic feedback to be output in a direction substantially parallel to a surface of the touch screen.

10. The device of claim 7, the processor further configured to:
  cause the haptic feedback to be output in a direction substantially perpendicular to a surface of the touch screen.

11. The device of claim 7, wherein the device comprises one or more of: a laptop computer, a handheld computing device, or a wearable computing device.

12. The device of claim 7, wherein the actuator comprises one or more of: an inertial linear actuator or an inertial rotary actuator.

13. The device of claim 12, wherein the actuator is coupled to the touch screen via a flexure.

* * * * *